United States Patent [19]

Ootsuka

[11] Patent Number: 5,774,754
[45] Date of Patent: Jun. 30, 1998

[54] CAMERA CAPABLE OF PREVIEWING A PHOTOGRAPHED IMAGE

[75] Inventor: Hiroshi Ootsuka, Toyokawa, Japan

[73] Assignee: Minolta Co., Ltd., Osaka, Japan

[21] Appl. No.: 856,728

[22] Filed: May 15, 1997

Related U.S. Application Data

[63] Continuation of Ser. No. 427,560, Apr. 24, 1995, abandoned.

[30] Foreign Application Priority Data

Apr. 26, 1994 [JP] Japan .................................... 6-088650
May 24, 1994 [JP] Japan .................................... 6-109520

[51] Int. Cl.[6] .......................... G03B 29/00; G03B 17/24; G03B 13/02
[52] U.S. Cl. ......................... 396/380; 396/435; 396/436; 396/383; 396/378; 316/374
[58] Field of Search .................................. 396/313, 435, 396/436, 374, 378, 380, 383, 213

[56] References Cited

U.S. PATENT DOCUMENTS

| 4,704,022 | 11/1987 | Nozawa et al. .......................... 354/219 |
| 4,742,369 | 5/1988 | Ishii et al. ................................ 354/106 |
| 4,837,633 | 6/1989 | Parra ........................................ 396/374 |
| 4,860,037 | 8/1989 | Harvey ...................................... 354/21 |
| 4,903,056 | 2/1990 | Kamikubota et al. ................... 354/219 |
| 5,051,770 | 9/1991 | Cornuejols .............................. 354/219 |
| 5,122,821 | 6/1992 | Nealon ..................................... 354/106 |
| 5,172,151 | 12/1992 | Yomogizawa et al. ................. 354/219 |
| 5,296,884 | 3/1994 | Honda et al. ............................ 354/106 |
| 5,335,029 | 8/1994 | Itoh et al. ................................. 354/106 |
| 5,382,508 | 1/1995 | Ikenoue ................................... 354/159 |
| 5,486,893 | 1/1996 | Takagi ..................................... 354/410 |

FOREIGN PATENT DOCUMENTS 4-349448 12/1992 Japan .
5-61115 3/1993 Japan .
5-199441 8/1993 Japan .

Primary Examiner—Safet Metjahic
Assistant Examiner—Michael Dalakis
Attorney, Agent, or Firm—Sidley & Austin

[57] ABSTRACT

A camera includes a photographic recording device which records an image of an object on a photosensitive recording medium; an image pick-up device which picks up an image of the object to generate an image signal; a display device which displays a monitor image based on the image signal generated by the image pick-up device; a photographing information setting device which sets photographing information for an image to be recorded on the photosensitive recording medium; and a display controller which controls the display device to display a monitor image in accordance with the set photographing information.

14 Claims, 62 Drawing Sheets

FIG. 15A  FIG. 15B
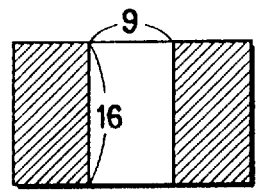
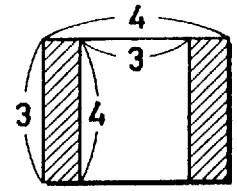
FIG. 16
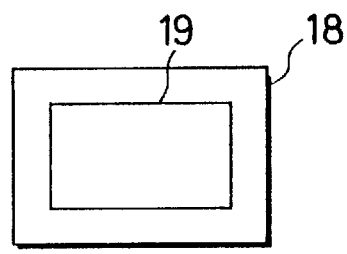
FIG. 17
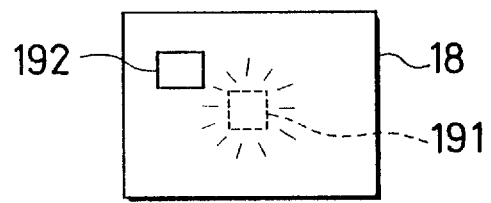

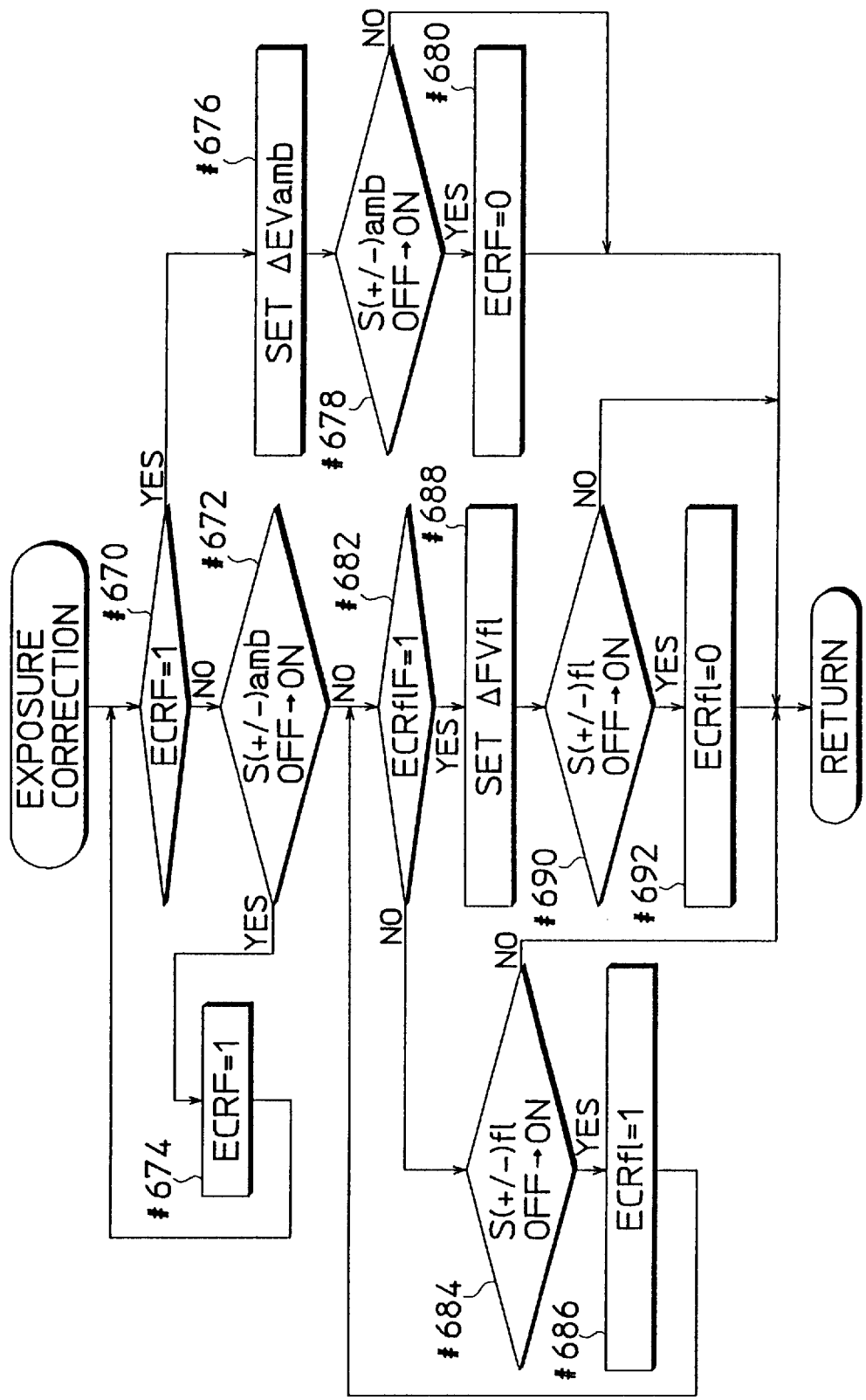

DAYTIME NATURAL LIGHT

MORNING/ EVENING NATURAL LIGHT

CLOUDY NATURAL LIGHT

TUNGSTEN LIGHT

DAYLIGHT TYPE

TUNGSTEN TYPE

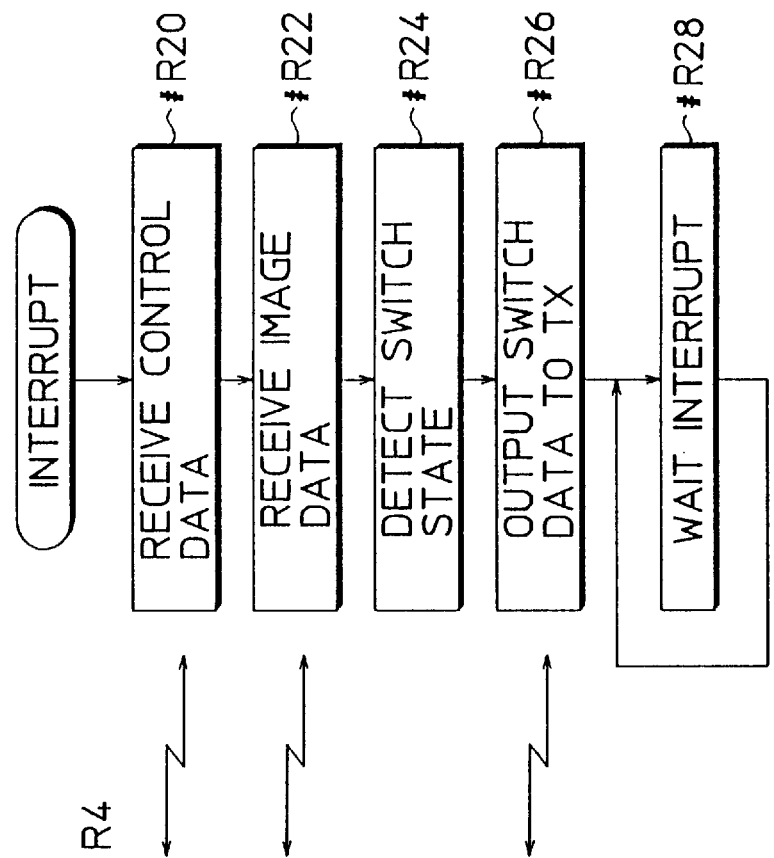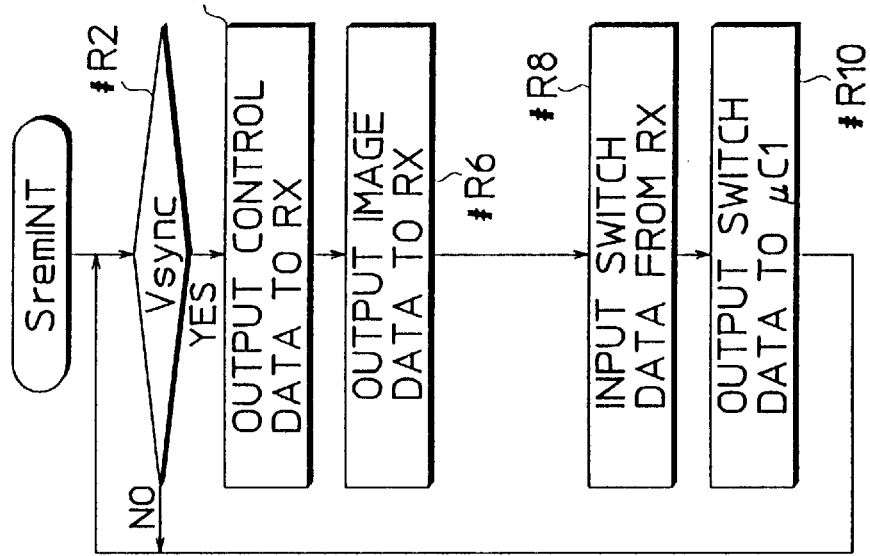

CAMERA CAPABLE OF PREVIEWING A PHOTOGRAPHED IMAGE

CROSS REFERENCE TO RELATED APPLICATION

This is a continuation of U.S. patent application Ser. No. 08/427,560 filed Apr. 24, 1995, now abandoned.

BACKGROUND OF THE INVENTION

This invention relates to a camera in which photographing conditions set when photographing an object are recorded in an information recording area of a photosensitive medium such as a film and the photographed image is developed in accordance with the recorded data and, particularly to a camera suitable to confirm an image when changing the photographing conditions.

Japanese Unexamined Patent Publication No. 5-61115 discloses a camera which is capable of writing information concerning photographing operations such as photographing mode, the number of prints to be made, in a magnetic information recording area in correspondence with a frame in which an image is recorded during each photographing operation. This camera is further provided with data display means for displaying the written data and means for changing these data if necessary and writing the data obtained after the change in the information recording area.

With this conventional camera, whether or not the data needs to be changed is discriminated based on the displayed data, and the data is changed if necessary. Operators have changed the data on the basis of their experiences without confirming how the reproduced image looks like after the change. Accordingly, there are cases where the change makes an image in a final picture look different from the one the operator intended to obtain. In order to obtain intended pictures, the operators are obliged to have skill. Thus, this camera has not been practically satisfactory.

SUMMARY OF THE INVENTION

It is an object of the present invention to provide a camera which has overcome the problems residing in the prior art.

It is another object of the present invention to provide a camera which enables an operator to confirm or check how a reproduced image looks after data concerning a photographing operation is changed, so that a desired picture can always be obtained even if the photographing information is changed.

The present invention is directed to a camera comprising: a photographic recording device which records an image of an object on a photosensitive recording medium; an image pick-up device which picks up an image of the object to generate an image signal; a display device which displays a monitor image based on the image signal generated by the image pick-up device; a photographing information setting device which sets photographing information for an image to be recorded on the photosensitive recording medium; a display controller which controls the display device to display a monitor image in accordance with the set photographing information.

The camera may be further provided with a photographing information recording device which records the set photographing information on the photosensitive recording medium.

It may be preferable that the photographing information has an aspect ratio of an image to be recorded on the photosensitive recording medium.

It may be appreciated to record the photographing information on the photosensitive recording medium at a portion other than a portion at which an image is recorded. Further, the photographing information may be magnetically recorded on the photosensitive recording medium.

The camera may be further provided with an electronic recording device which records an image of the object on an electronic recording medium. The photographing information setting device is made to further set photographing information for an image to be recorded on the electronic recording medium.

The display device may display a monitor image having an indicia representing an area where the image is recorded at the aspect ratio.

Also, the present invention is directed to a camera comprising: a photographic recording device which records an image of an object on a photosensitive recording medium; an image pick-up device which picks up an image of the object to generate an image signal; a storage device which stores the image signal; a photography data writing and reading device which writes and reads a photography data on and from the photosensitive recording medium; photography data setting device which sets a new photography data desirably; first display device which processes the image signal in accordance with the photography data written on the photosensitive recording medium; a second display device which processes the image signal in accordance with the photography data set by the setting device; and a renewal controller which controls the photography data writing and reading device to replace the stored photography data with the newly set photography data.

The photography data may be written at a portion other than a portion where an image is recorded. The photography data may be magnetically written.

The camera may be further provided with a renewal directing device which activates the renewal controller. It may be preferable that the photography data include at least one of an aspect ratio, an exposure value, and color correction information.

With thus constructed camera, there are provided the photographing information setting device which sets photographing information for an image to be recorded on the photosensitive recording medium, and the display controller which controls the display device to display a monitor image in accordance with the set photographing information. Accordingly, the operator can preview an image in accordance with desirably set photographing information before recording the image on the photosensitive recording medium, and thus obtain improved photographed pictures.

Also, there are provided the photography data writing and reading device, the first display device which processes the image signal in accordance with the photography data written on the photosensitive recording medium, the photography data setting device which sets new photography data, the second display device which processes the image signal in accordance with the newly set photography data, and the renewal controller. The renewal controller controls the photography data writing and reading device to replace the stored photography data with the newly set photography data. This will make it possible for the operator to set a desired photography data, and check or confirm a monitor image reflecting the newly set photography data, and further replace the earlier photography data with the newly set photography data.

These and other objects, features and advantages of the present invention will become more apparent upon a reading of the following detailed description and accompanying drawings.

BRIEF DESCRIPTION OF THE DRAWINGS

FIGS. 15A and 15B show contents displayed on an on-body display unit 24 when the camera is held in a vertical posture in the cases of high vision (H) and normal (N) aspect modes, respectively;

FIG. 16 is a diagram showing a gaze detecting area frame displayed on the monitor;

FIG. 17 is a diagram showing the gaze area being displayed on the monitor;

FIG. 22 is a flowchart showing an interrupt routine executed when a switch S1, a recording start switch or a grip switch is turned on;

FIG. 47 is a flowchart showing a subroutine "Exposure Correction";

FIGS. 65A and 65B are parts of a flowchart showing controls executed in the transceivers TX and RX.

DETAILED DESCRIPTION OF THE PREFERRED EMBODIMENTS OF THE INVENTION

Figure 2:
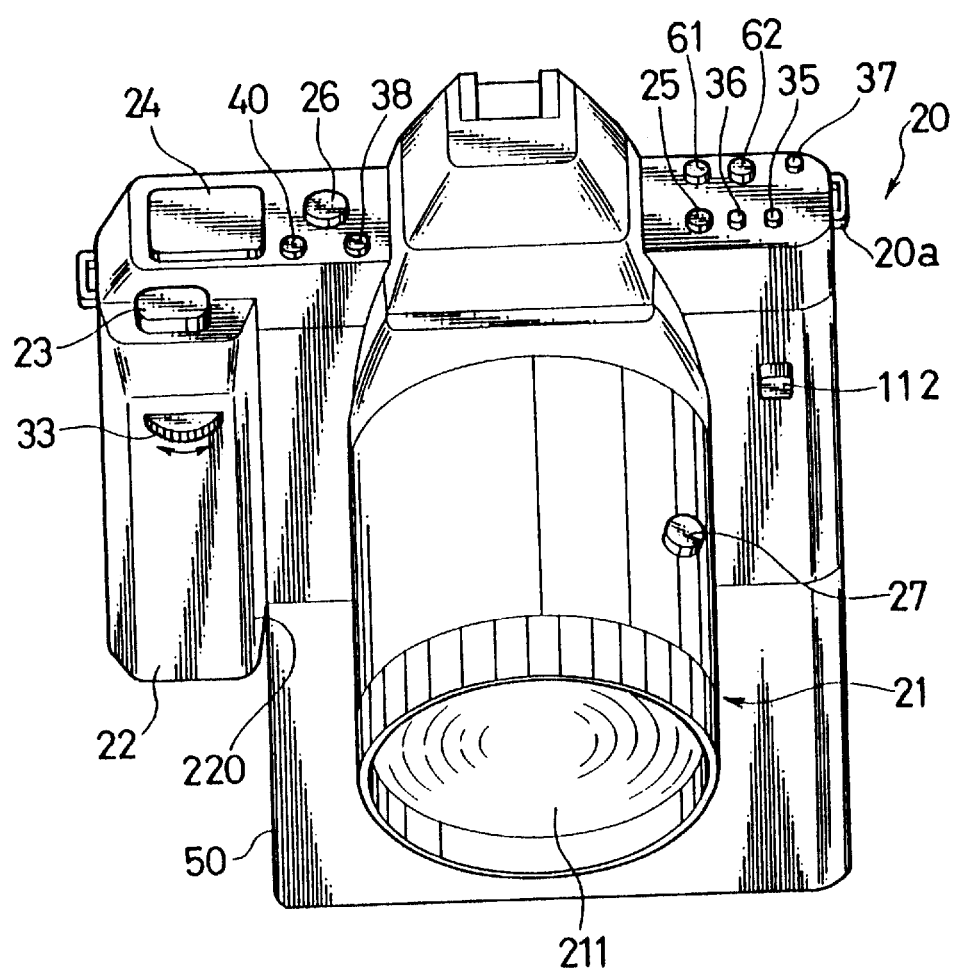
FIG. 2 is a front perspective view showing the external configuration of the camera.
Figure 3:
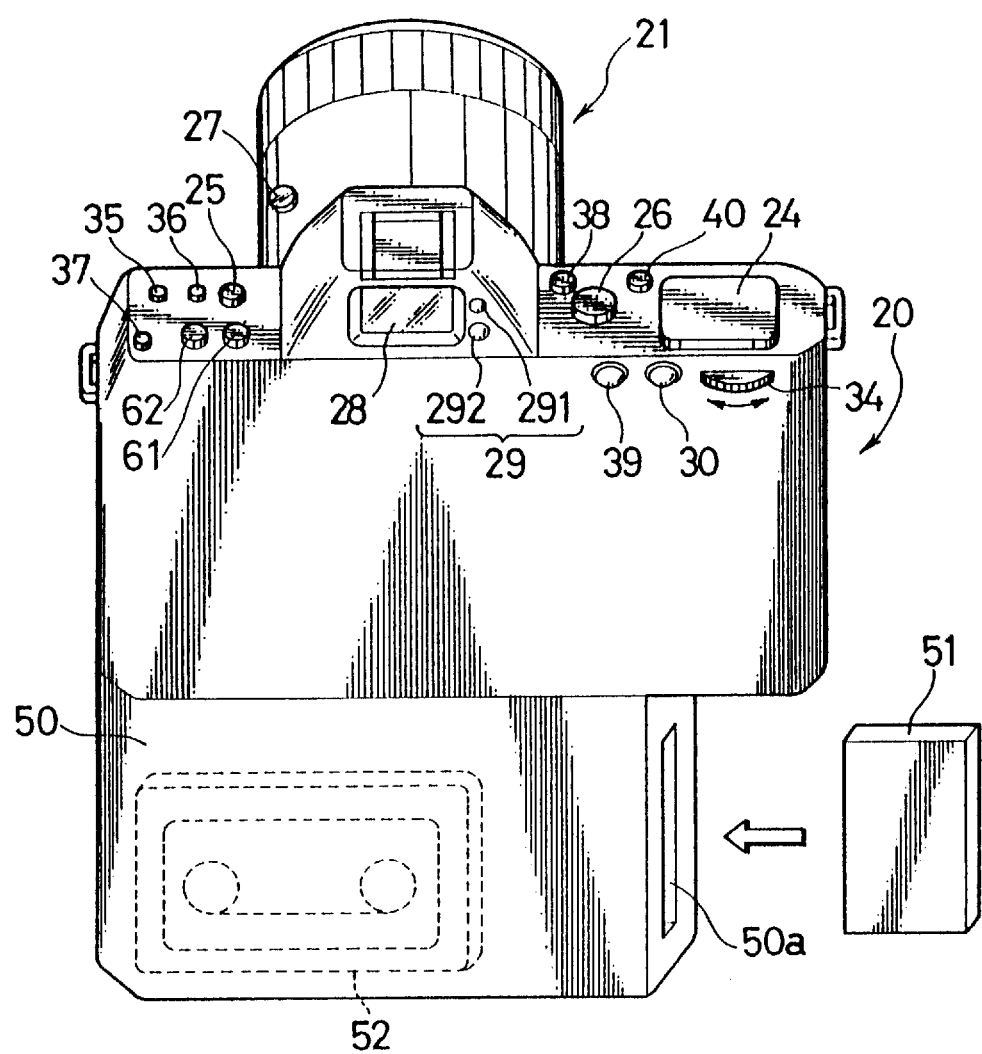
FIG. 3 is a rear perspective view showing the external configuration of the camera.
Figure 4:
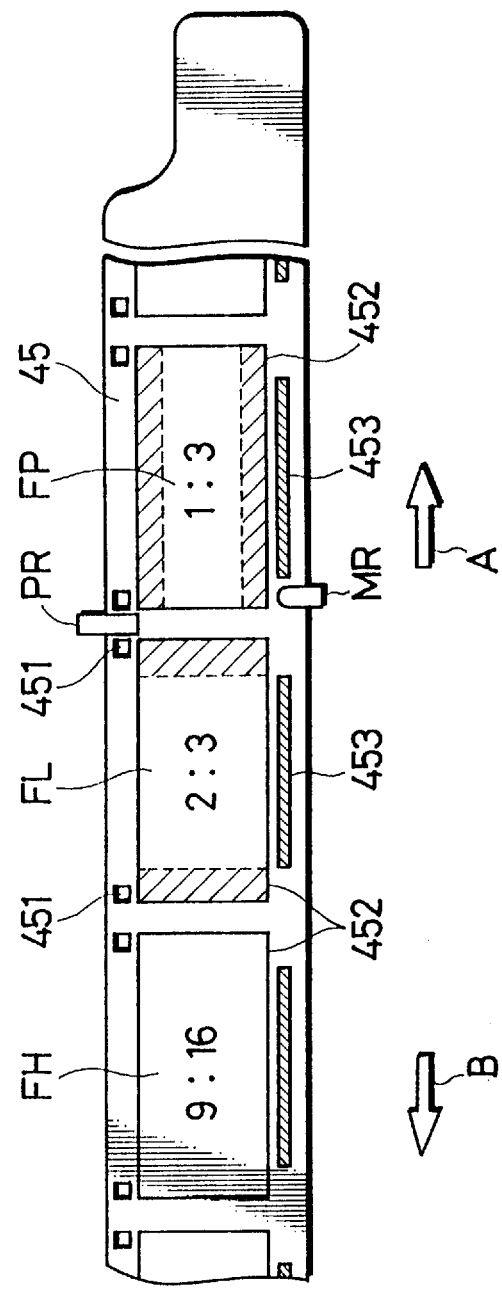
FIG. 4 is a plan view showing an exemplary construction of a film to be mounted on the camera.
Figure 5A:
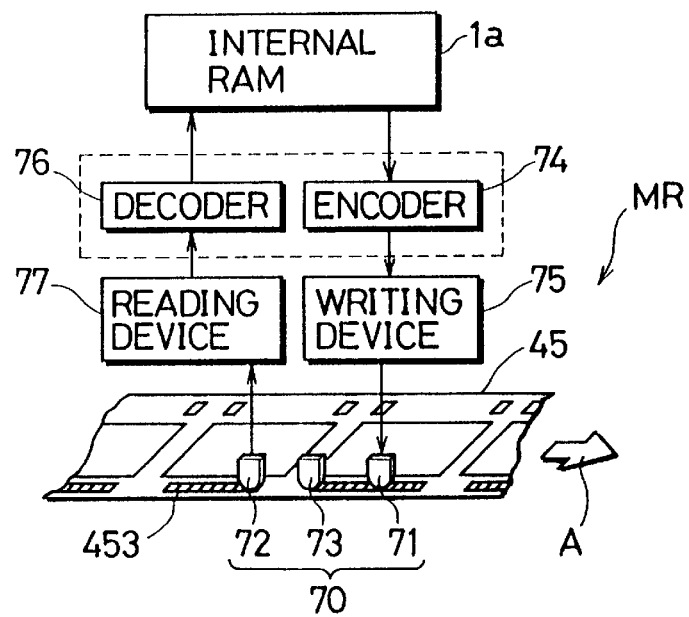
FIGS. 5A and 5B show a construction of a magnetic recording and reproducing means, FIG. 5A being a block diagram of this means, and FIG. 5B being a diagram showing what format data are recorded in a magnetic recording portion.
Figure 5B:
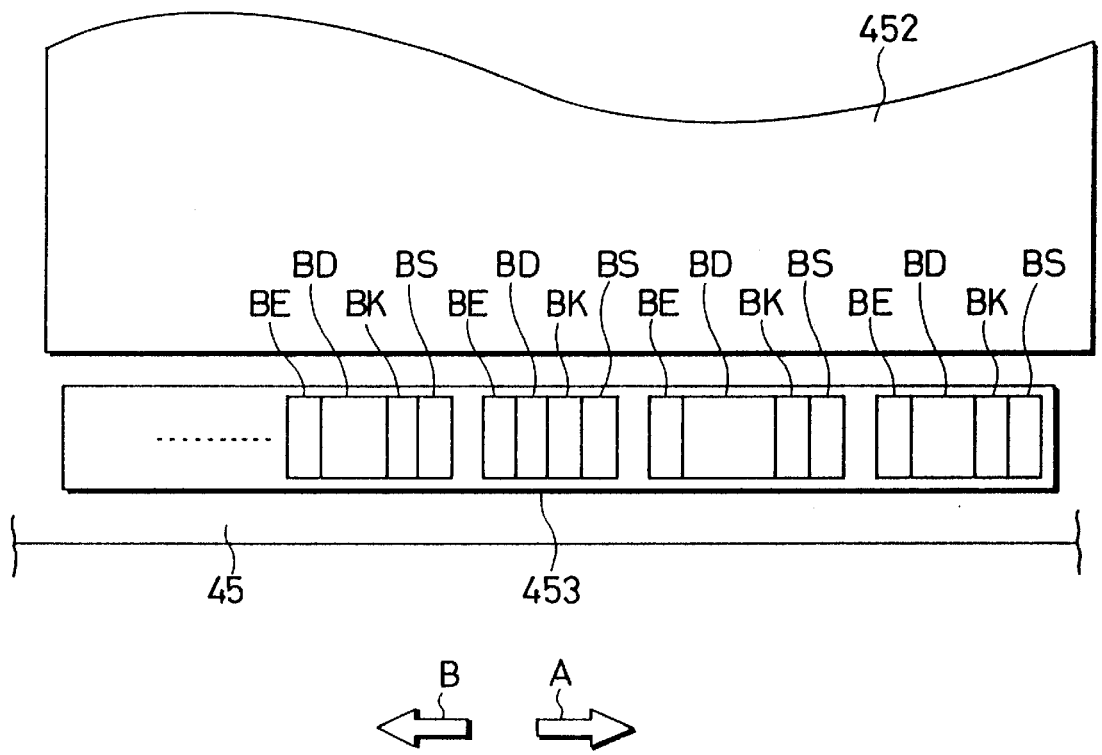
Figure 6:
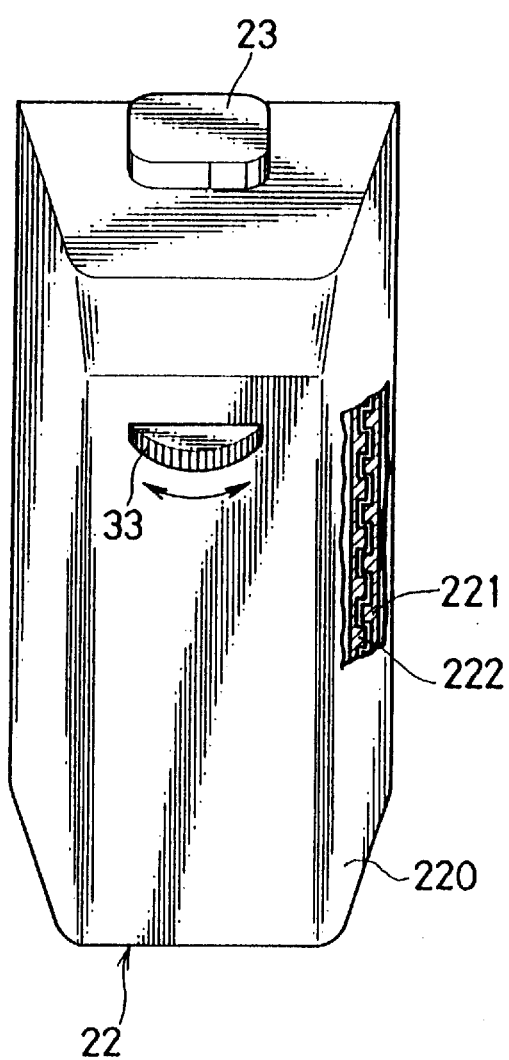
FIG. 6 is a diagram partially in section enlargedly showing a grip of the camera.

FIGS. 2 and 3 are front and rear perspective views of a camera of the present invention, respectively. FIG. 4 is a plan view of a film used in the camera. FIG. 5 is a block diagram of a magnetic recording/reproducing unit MR. FIG. 6 is an enlarged view of a grip 22 of the camera.

This camera comprises a camera main body 20 and an electronic information recorder 50 formed integrally with or detachably from the camera main body 20. The camera main body 20 is provided with a taking lens 21 integrally or interchangeably mounted thereon, and the grip 22 is formed in a position on one lateral side where a camera operator grips this camera main body 20.

A variety of operable members and other members are arranged on the upper surface of the camera main body 20. Indicated at 23 is a release button. When the button 23 is pressed to an intermediate stage, a switch Si for the photography preparation is turned on to start the necessary operations such as the light measurement, exposure calculation and automatic focusing. When the button 23 is fully pressed, a switch S2 is turned on to start an exposure control.

Indicated at 24 is an on-body display unit including, e.g., a liquid crystal panel for displaying a shutter speed, an aperture value, and the like. Indicated at 25 is a display instruction button which, when being operated, sends an instruction signal to cause display data stored in an internal memory (see FIG. 18) provided in the camera main body 20 to be displayed in a monitor 47 including a color liquid crystal panel (see FIG. 18). This button 25 is also operated to send an instruction signal to cause data, obtained after data concerning the photographing conditions such as an aspect ratio, exposure value and color temperature are changed to be renewed in a magnetic recording portion 453. Indicated at 26 is a memory change switch which is operated to change an image stored in a frame memory (see FIG. 18) or the like provided in the main body 20. At the head of the main body 20 is provided a connecting structure on which a flash device (not shown) is mountable according to needs.

The electronic information recorder 50 is disposed in such a position in the lower part of the camera main body 20 as not to hinder a camera operation. The recorder 50 is formed with a mounting portion 50a in which an IC card 51 as an electric memory for electrically recording the still pictures stored in the frame memory of the camera main body 20 is mountable and an unillustrated mounting portion in which a magnetic recording medium 52 such as a magnetic tape or magnetic optical disk which enables the recording of motion images is mountable, and is provided internally with a tape feeding mechanism.

Indicated at 33 is a front control dial which is provided in a suitable position on the front face of the grip 22 and is rotated when a numerical value of a photographing information is changed. Indicated at 34 is a rear control dial which is provided in a suitable position on the back face of the camera main body 20 and functions similarly to the front control dial 33. Switches 35 to 37 are provided on the top face of the camera main body 20. The switch 35 is a color correction switch which is operated to perform a color correction while viewing the monitor 47. The switch 36 is an exposure correction switch which is operated to perform an exposure correction during the photographing operation under the ambient light. The switch 37 is an exposure correction switch which is operated to correct an amount of flash light during a flash firing photographing operation. When the front or rear control dial 33 or 34 is rotated in a state where these switches 35 to 37 are operated, the numerical values of parameters for the corrections are changed. Indicated at 38 is an exposure mode changeover switch which is provided on the top face of the camera main body 20 and is operated to change an exposure mode of the camera, specifically, Program (P) mode, Aperture priority (A) mode, Shutter speed priority (S) mode, and Manual (M) mode. When the front or rear control dial 33 or 34 is rotated while the exposure mode changeover switch 38 is operated, the exposure mode is changed.

Indicated at 39 is a recording start switch which is operated when the motion images are recorded. Indicated at 40 is a photographing mode changeover switch which is operated to change a combination of three photographing modes: a film image photographing mode in which still images are recorded on a photosensitive film, an electronic still image photographing mode in which still images are recorded on the IC card 51 and a motion image photographing mode for recording motion images on the magnetic recording medium 52.

Indicated at 61 is an aspect ratio changeover switch for changing the aspect ratio in the film image photographing mode.

Here, the construction of a film 45 is described with reference to FIG. 4.

The film 45 has two perforations 451 for each frame. The perforations 451 are formed at opposite upper corners of exposure areas 452 of the respective frames are and used to detect a feed amount of the film 45 during the feeding thereof. More specifically, a photoreflector PR is disposed in a position where it faces the perforations 451 during the feeding of the film 45. The frame position of the film 45 is detected based on the position of the perforation 451 detected by the photoreflector PR. In FIG. 4, there are an unillustrated film cartridge on the left side and an unillustrated take-up spool on the right side. The film 45 moves in a direction of arrow A when it is being wound, while moving in a direction of arrow B when it is being rewound.

Below the respective frames in which object images are recorded, there are formed corresponding magnetic recording portions (oblique lined portions) 453. In the magnetic recording portion 453 are recorded data concerning the photographing conditions such as an aspect ratio, an exposure correction value (shutter speed and aperture value), color temperature and, if necessary, other data. There are three modes with respect to aspect: a high-vision mode (H-mode) in which the aspect ratio is 9:16, a normal mode (L-mode) in which the aspect ratio is 2:3, and a panorama mode (Panomode) in which the aspect ratio is 1:3. In laboratories, the magnetic data concerning the aspect mode is read from the magnetic recording portion 453 and prints are made at ratios in conformity with the read aspect ratios.

If the aspect mode is L-mode, a print is obtained by trimming the opposite lateral portions (oblique lined portions in a center frame 452 in FIG. 4) of a print area FH of H-mode which is a basic size and printing only an area FL. If the aspect mode is Pano-mode, a panorama print is obtained by trimming upper and lower portions (upper and lower oblique lined portions of a right frame 452 in FIG. 4) of the print area FH and printing only an area FP.

A film feeding device 5 (see FIG. 1) winds and rewinds the film 45. The feed amount of the film 45 is detected based on the detection of the perforations 451 by the photoreflector PR. The magnetic recording/reproducing means MR (see FIGS. 1 and 5A) includes a head or the like, and records the data concerning the photographing operation in the magnetic recording portions 453 corresponding to the respective frames 452 of the film 45 while the film 45 is being wound by the film feeding device 5.

The construction of the magnetic recording/reproducing device MR is described with reference to FIGS. 5A and 5B. FIG. 5A is a block diagram of this means, and FIG. 5B is a diagram showing in which format data are recorded in a magnetic recording portion.

Figure 1:
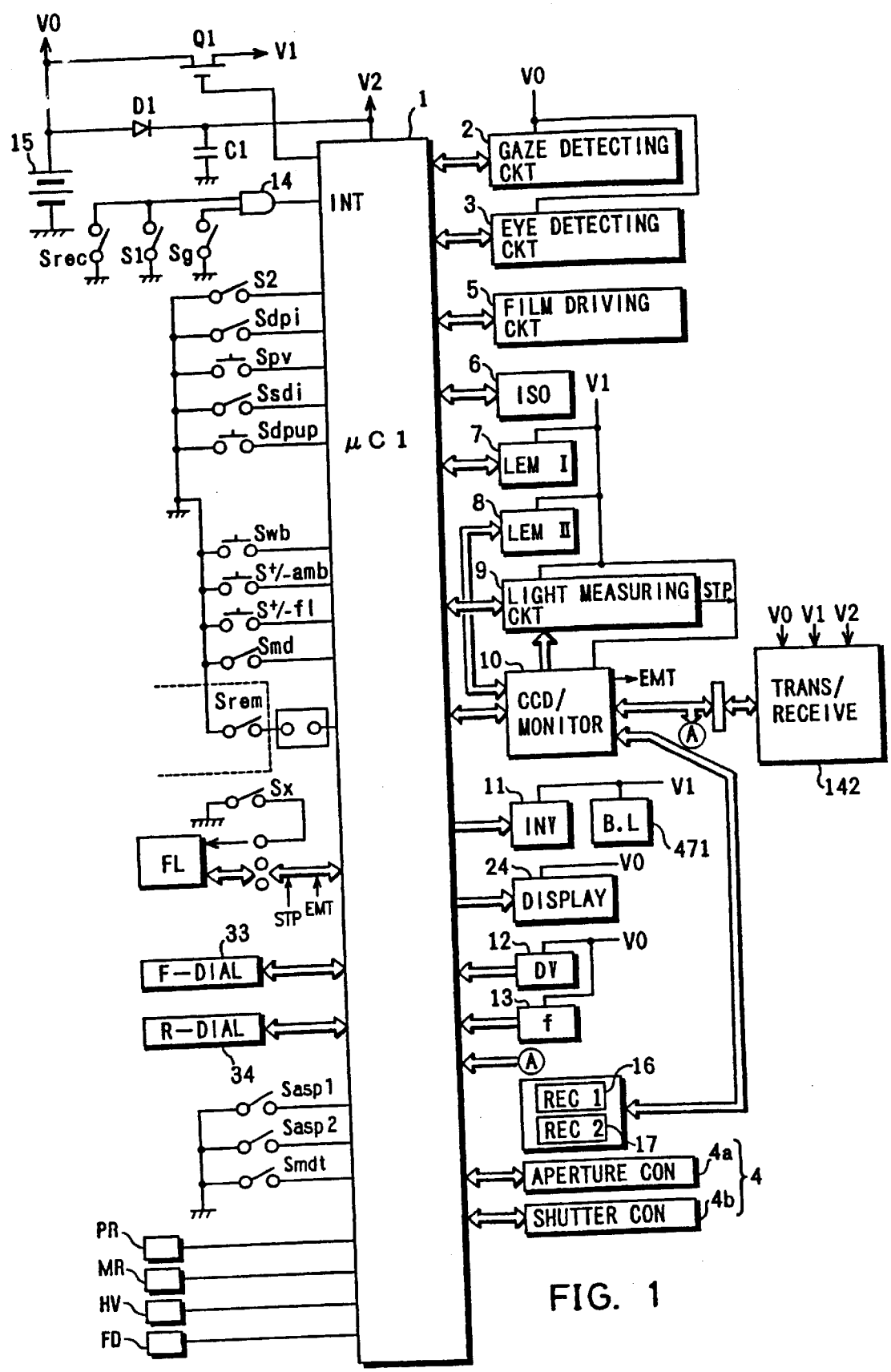
FIG. 1 is a circuit block diagram of a main body of a camera according to the invention.

Indicated at 1a is an internal RAM included in a microcomputer ($\mu$C1) 1 shown in FIG. 1. Data obtained when the various switches and operable members are operated are stored in the RAM 1a. A head unit 70 includes a write head 71, a read head 72 and an erase head 73. As shown in FIG. 5A, these heads are so disposed as to face the magnetic recording portions 453 of the film 45 being fed. The recording portion 453 is such that a plurality of different data are recordable by the block in the film feeding direction for each frame of the film 45. Each block consists essentially of a start bit BS, a data type discrimination bit BK, a data section BD including a specified number of bits, and an end bit BE.

An encoder 74 encodes a write data while adding an error correction code thereto, and a writing device 75 introduces the data input from the encoder 74 to the write head 71, thereby causing the write head 71 to write in the magnetic recording portion 453. A decoder 76 decodes the data read by a reading device 77 and performs an error correction using the error correction code. In renewing the data, the erase head 73 erases the data of the frame to be renewed when the film is rewound.

The write and read heads 71 and 72 are commonly used. This makes the construction simpler. Further, it may not be particularly necessary to provide the erase head 73 because the data can be renewed by overwriting by the use of the write head 71. Since the error correction code is added to the data, the data can be properly read even if a part of a signal is missing due to an abnormality such as a drop-out.

Indicated at 62 is an aspect mode changeover switch for changing the aspect mode to a high vision (H) mode or a normal (N) mode in the electronic still image photographing mode or the motion image photographing mode.

Further, a microphone 112 for picking up sounds is provided in a specified position on the front face of the camera main body 20.

A preview switch 27 is provided in a suitable position on the outer surface of the taking lens 21. This switch 27 is operated to display an object image picked up through an aperture set at a control aperture value in the monitor 47.

As shown in FIG. 3, a viewfinder 28 for the monitor 47 is provided in an upper part of the backside of the camera main body 20. In a position near the viewfinder 28, there is provided an eye sensor 29 including a light emitter 291 such as an LED and a light receiver 292 such as a silicon photocell (SPC), the emitter 291 and the receiver 292 being disposed adjacent to each other. The eye sensor 29 is adapted to detect whether or not the camera operator is viewing through the viewfinder 28. The light emitted from the light emitter 291 is reflected by the face or the eye of the camera operator viewing through the viewfinder 28 and the reflected light is sensed by the light receiver 292. In this way, the eye detection is conducted. The eye detecting circuit is generally designated by reference number 3 in FIG. 1.

Indicated at 30 is a gaze area setting switch for setting and resetting a gaze area within an angle of view which is determined in response to the gaze of the camera operator detected by a gaze detecting circuit 2 to be described later.

The grip 22 is externally covered with a cover 220 made of resilient rubber. As shown in FIG. 6, conductive patterns 221 and 222, which are insulated each other, are opposed in the interior of the grip 22. Between the cover 220 and the conductive patterns 221, and 222 is arranged a conductive rubber (not shown). When the camera operator pressingly touches the external cover 220 of the grip 22 so as to hold the camera fast, the conductive patterns 221, and 222 become conductive each other through the conductive with rubber. With this construction, the grip 22 serves as a grip switch Sg.

Figure 7A:
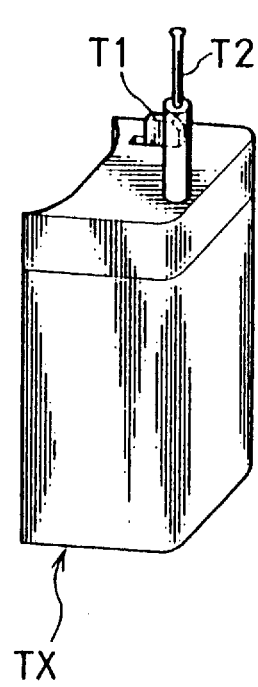
FIGS. 7A, and 7B are diagrams showing the exteriors of transceivers TX and RX for transmitting and receiving image data, respectively.
Figure 7B:
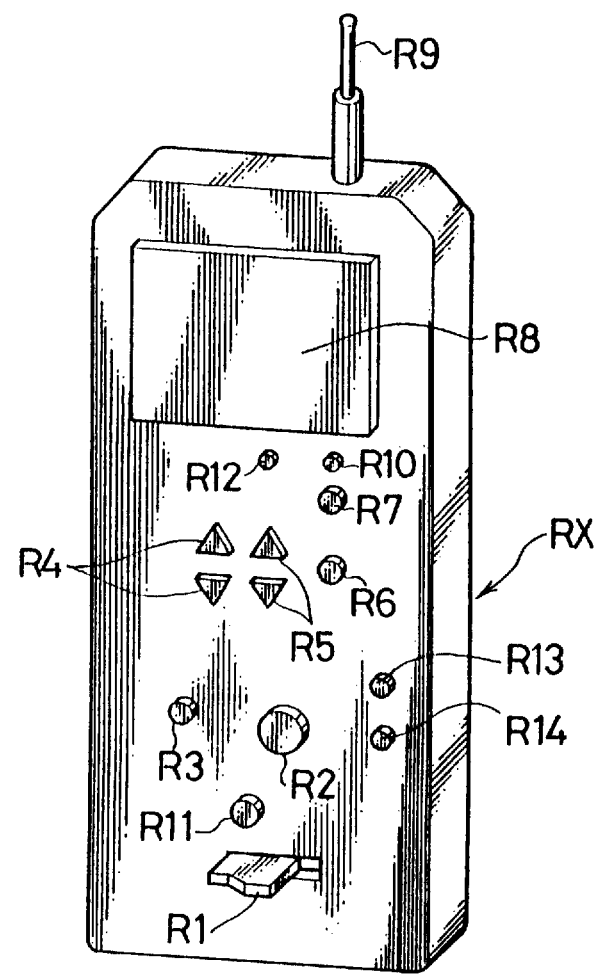
Figure 8:
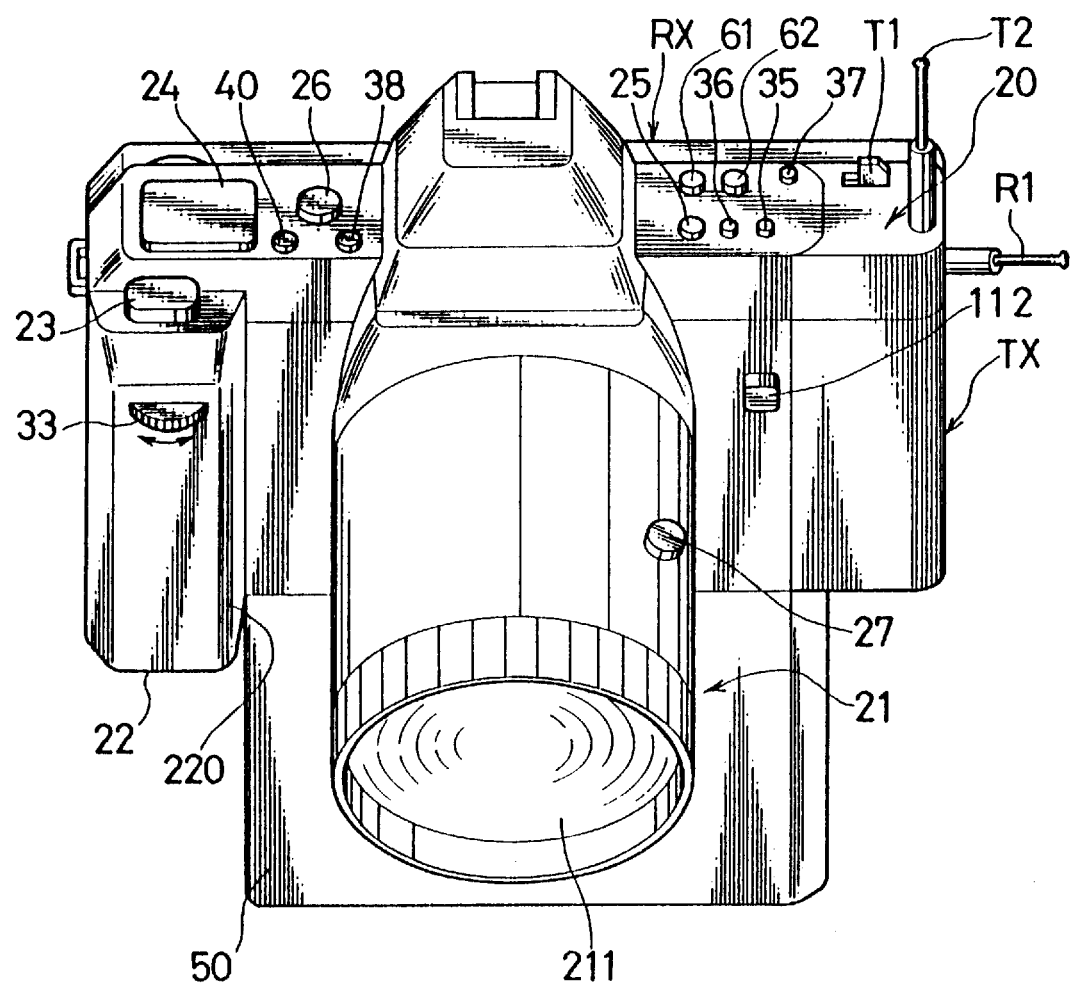
FIG. 8 is a front perspective view showing a main body of the camera when the transceivers TX and RX are mounted thereon.
Figure 9:
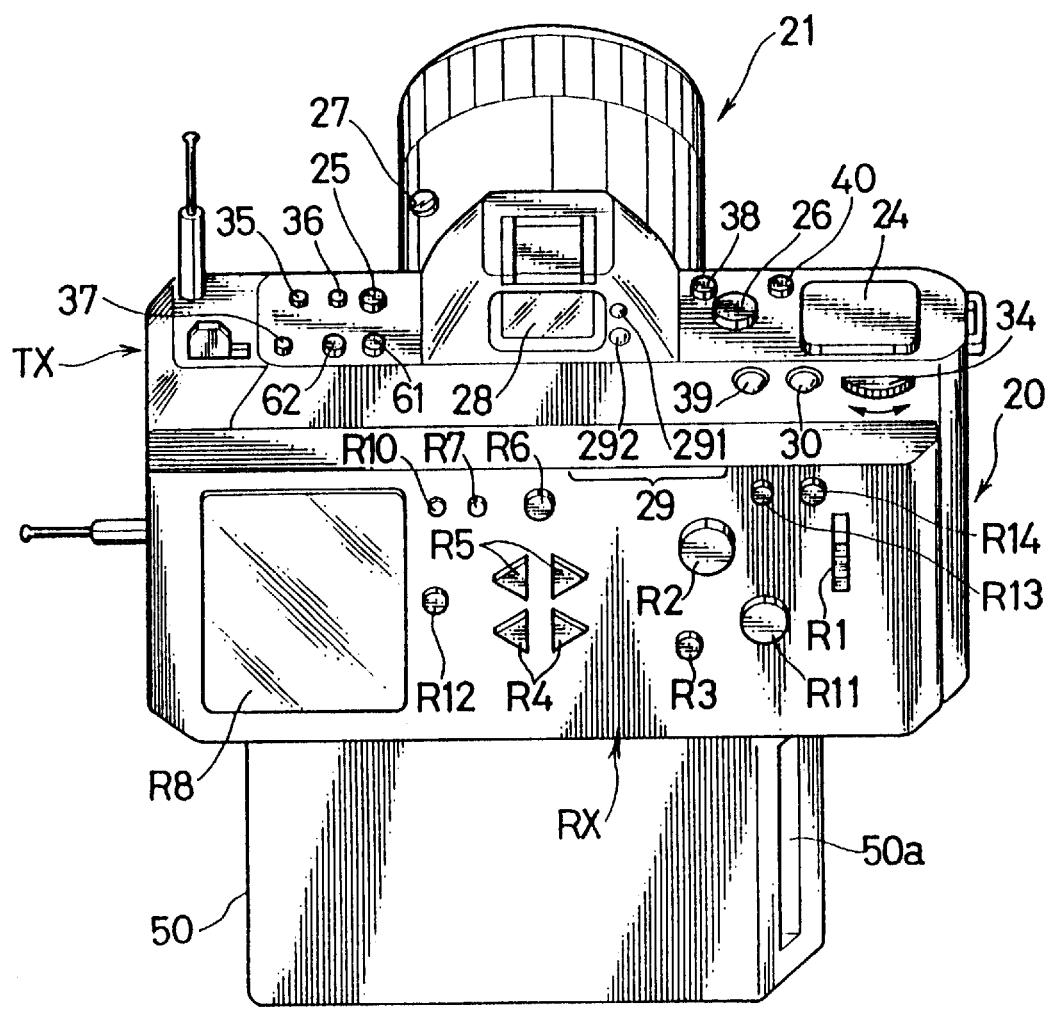
FIG. 9 is a rear perspective view showing the camera main body when the transceivers TX and RX are mounted thereon.

FIGS. 7A and 7B are diagrams respectively showing the exterior of transceivers TX and RX for transmitting and receiving an image data. FIG. 7A shows the transceiver TX on the camera main body side and FIG. 7B shows the transceiver RX for conducting a remote control. These transceivers TX and RX are mountable on the camera main body 20 in consideration of the portability. FIGS. 8 and 9 are front and rear perspective views respectively showing the camera main body 20 when the transceivers TX and RX are mounted thereon. A left side face of the transceiver TX is so formed as to conform to the right side face of the camera main body 20 when viewed from the front. These side faces are connected with each other through a holding member so that the transceiver TX is detachably mounted on the camera main body 20. The transceiver RX is detachably mounted on the back face of the camera main body 20 through an unillustrated holding member while being held horizontally.

Each of the transceivers TX and RX includes switches and other operable members corresponding to the switches and the like operable at the camera main body side. More specifically, indicated at T1 is a switch which is operated to conduct a remote control through the transceiver TX, and at T2 is an antenna through which signals are transmitted to and received from the transceiver RX. In the transceiver RX, indicated at R1 is a power supply switch; at R2 a release button corresponding to the release button 23; and at R3 an exposure mode changeover switch corresponding to the exposure mode changeover switch 38. Indicated at R4 are up- and down-switches corresponding to the front control dial 33; at R5 up- and down-switches corresponding to the rear control dial 34; at R6 a preview switch corresponding to the preview switch 27; at R7 an exposure correction switch under the ambient light corresponding to the exposure correction switch 36; at R8 a two-dimensional color liquid crystal display which functions similar to the monitor 47; R9 an antenna for transmitting and receiving signals to and from the transceiver TX; and R10 an exposure correction switch under the flash light which corresponds to the exposure correction switch 37. When the transceiver RX is mounted on the camera main body 20, the camera operator is allowed to view an image to be photographed which is displayed on the color liquid crystal display R8 of the transceiver RX without viewing through the viewfinder 28. Indicated at R11 is a recording start switch corresponding to the photographing mode changeover switch 40 and at R12 a photographing mode changeover switch corresponding to the photographing mode changeover switch 40.

Indicated at R13 is a switch, corresponding to the switch 61, for changing the aspect mode when the film image photographing mode is set. Indicated at R14 is a switch, corresponding to the switch 62, for changing the aspect mode when the electronic still image photographing mode or the motion image photographing mode is set.

A control for the transceivers TX and RX will be described later.

Figure 10:
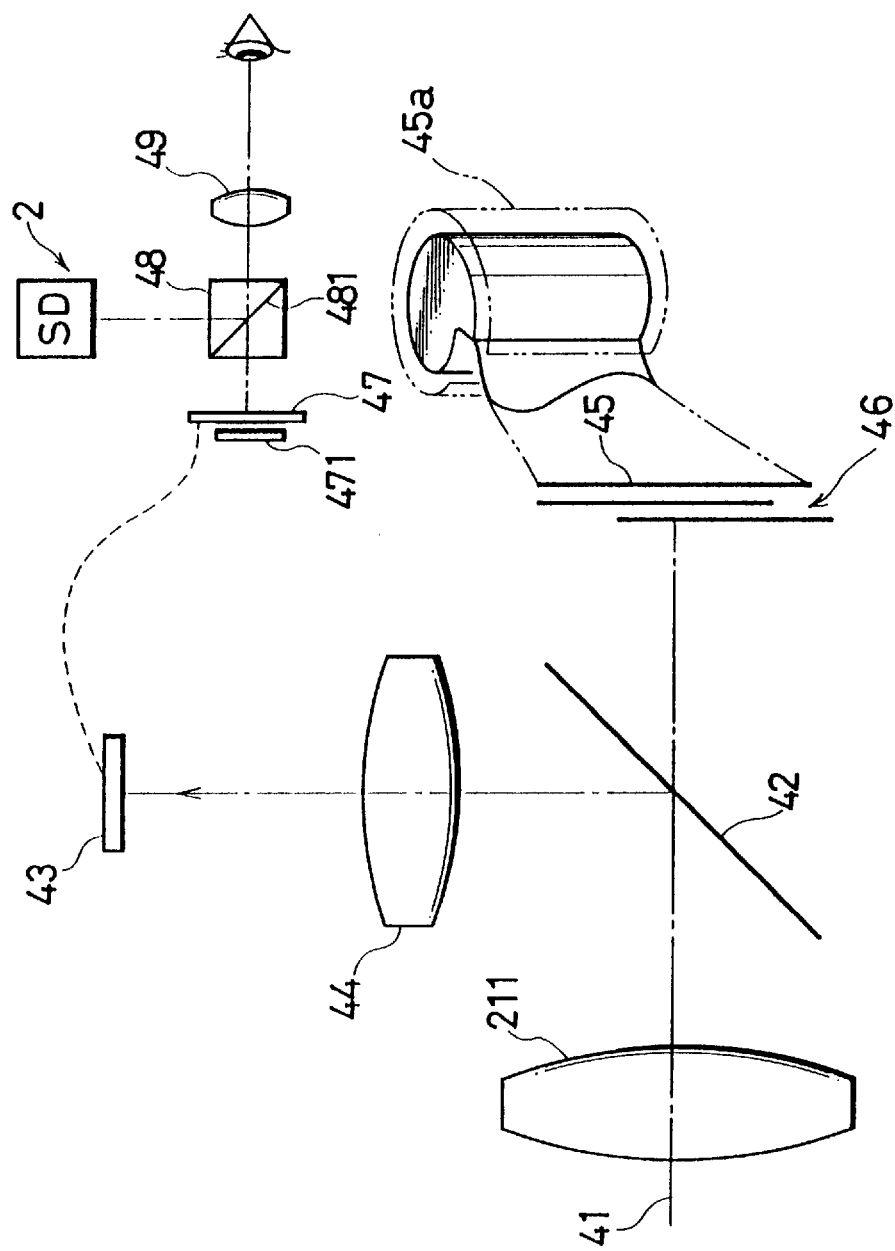
FIG. 10 is a diagram showing the internal construction of a taking lens unit and an optical system provided in the camera main body.

FIG. 10 is a diagram showing the internal construction concerning a taking lens unit 211 and an optical system provided in the camera main body 20.

In the camera main body 20 is disposed a mirror 42 for separating a part of a beam fixed relative to an optical axis 41 of the taking lens 211. This mirror 42 is an extremely thin semitransparent pellicle mirror and is adapted to introduce a part of a beam of light transmitted through the taking lens 211 to a CCD 43 by way of a small optical system 44. The CCD 43 acting as an area sensor performs the focus condition detection (AF), light measurement and flash light adjustment to be described later. The mirror 42 is also fixed during the photographing operation to introduce a light image transmitted through the taking lens 211 to a photosensitive film 45 such as a silver-halide film, by way of a focal plane shutter disposed in front of the film 45. The film 45 is accommodated in a loading chamber 45a defined in the camera main body 20.

The CCD 43 includes solid-state photoelectric conversion elements arrayed in a matrix. On the front face of the CCD 43, color filters of red (R), green (G) and blue (B) are disposed in correspondence with the photoelectric conversion elements so as to pick up a color image from the light image transmitted through the semitransparent mirror 42.

Figure 11A:
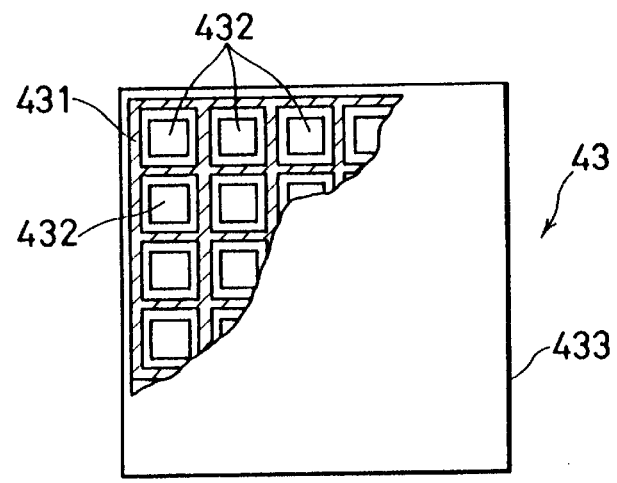
FIG. 11A is a partially broken plan view of a CCD provided in the camera main body.
Figure 11B:
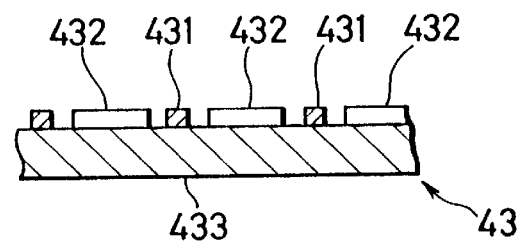
FIG. 11B is a sectional view of a part of the CCD.
Figure 11C:
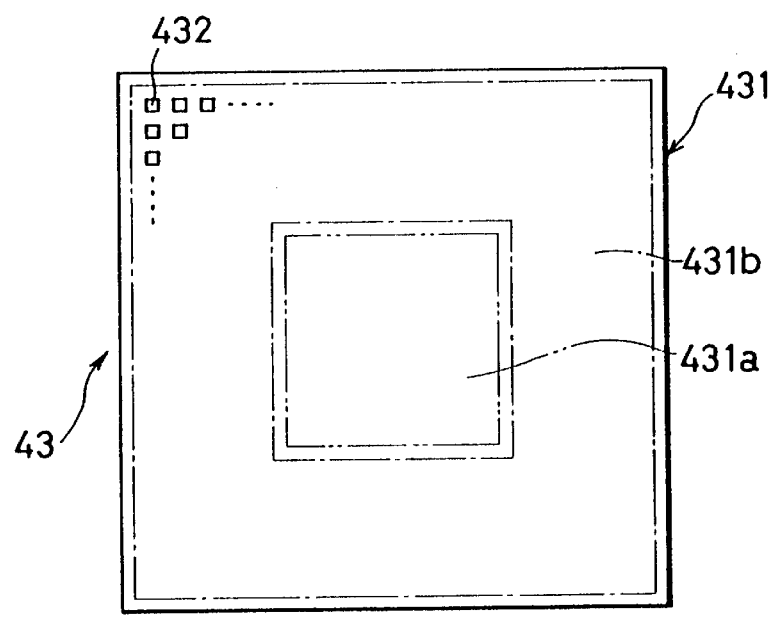
FIG. 11C is a plan view showing a relationship of areas defined in the CCD.

FIGS. 11A, 11B and 11C show an exemplary construction of the CCD 43. In FIGS. 11A and 11B, indicated at 431 is a grating-like photosensitive layer. The layer 431 is mounted on an insulating film 433. Also, photosensitive pixels 432 are mounted on the insulating film 433 in openings defined by the layer 431. The grating-like photosensitive layer 431 is electrically separated from the photosensitive pixels 432. As shown in FIG. 11C, the photosensitive layer 431 is divided into a plurality of sections. For example, the layer 431 is divided into two sections: a central section 431a and a peripheral section 431b, thereby forming a light measurement (metering) pattern. In accordance with light measurement signals from the sections 431a and 431b, the metering is switched among different metering modes such as a center spot metering and an average metering. The CCD 43 is divided into fifteen electrically connected areas and is used for the light measurement as well as the flash light adjustment. With this construction, the light incident upon the photosensitive pixels 432 out of the light incident upon the CCD 43 is photoelectrically converted and stored by the respective photosensitive pixels 432. The stored electric charges are transferred and read as an image data. On the other hand, the light incident upon the photosensitive layer 431 is converted into light measurement signals in the respective areas corresponding to the brightness of the entire image and these light measurement signals are output.

Referring back to FIG. 10, the monitor 47 includes a two-dimensional color LCD whose aspect ratio is set at 9:16 or the like and displays an image picked up by the CCD 43 or an image stored in a frame memory to be described later. This monitor 47 is capable of displaying specified marks, photographing conditions such as a shutter speed TV and an aperture value AV, the frame line representing the selected aspect ratio, a specific color, etc. in a superimposed manner in addition to the images. Indicated at 471 is a back light as a light source for the monitor 47. Indicated at 49 is an eye-piece lens which allows the camera operator to view an image displayed in the monitor 47 through the viewfinder 28.

An optical member 48 has a surface 481 by which a spot light used to detect the gaze is reflected and through which a light representative of the image from the monitor 47 is transmitted.

The gaze detecting circuit 2 is provided to detect the gaze of the camera operator viewing through the viewfinder 28, and includes an infrared LED, a semitransparent mirror for changing a return optical path from a forward one, and an infrared area sensor. The infrared area sensor is divided into areas AR1 to AR16 (see FIG. 12). The use of the infrared ray is intended to avoid the influence of the sunlight. The gaze of the camera operator is determined in accordance with upon which gaze area in the infrared area sensor the light projected from the infrared LED and reflected by the eye of the camera operator falls. The above detection may be made using a known gaze detection method which uses a first Purkinje image or first and fourth Purkinje images, or other known method.

Figure 12:
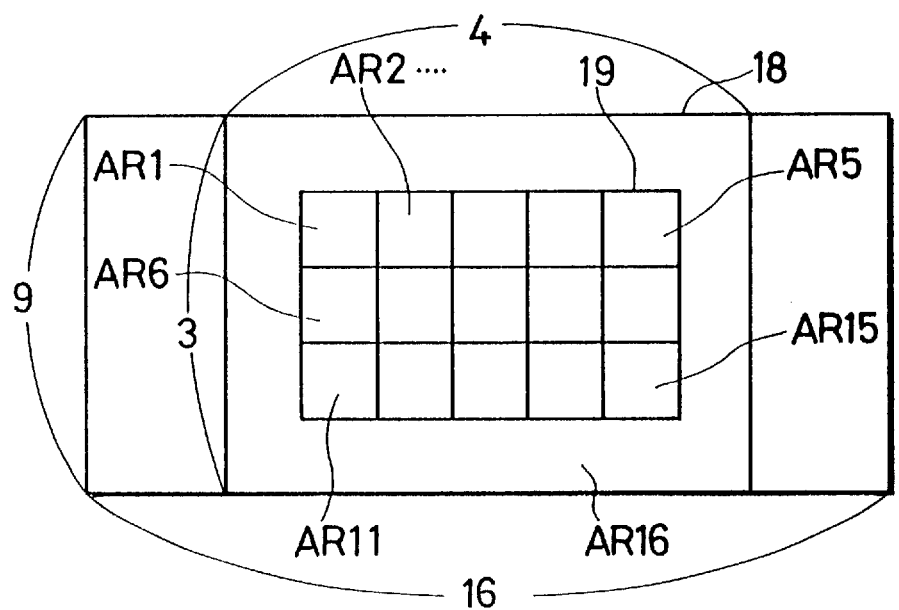
FIG. 12 is a diagram showing gaze areas and positions of AF sensor areas and AE sensor areas corresponding to the gaze areas.

FIG. 12 show gaze areas and positions of an AF sensor area and an AE sensor area corresponding to the gaze areas. Indicated at 18 is a frame indicative of a photographing field and at 19 a gaze detection area frame.

As shown in FIG. 12, the gaze detection area frame 19 is adapted to show a range within which the gaze detection is possible. The frame 19 is positioned substantially in the center of the frame 18 and within an area defined by the frame line representing the N-mode when the motion image photographing mode is set. The area enclosed by the frame 19 is divided into 3 rows and 5 columns, thereby forming fifteen gaze areas. An area represented by the center row in the area defined by the frame 19 substantially represents the aspect ratio in the Pano-mode when the film image photographing mode is set. This is because, when the Pano-mode is set, the light measurement, AF and flash light adjustment can be properly performed using this central row. Accordingly, the gaze detection is conducted by determining upon which one of the 1st to 15th gaze areas (AR1 to AR15) the light reflected by the eye of the camera operation has fallen. An area AR16 is an area defined between the frame 18 and the frame 19.

Areas AF1 to AF15 (not shown) used for the focus condition detection are so set as to correspond to the gaze areas AR1 to AR15. Areas AE1 to AE15 (not shown) used for the light metering detection are so set as to correspond to the gaze areas AR1 to AR15.

Figure 13:
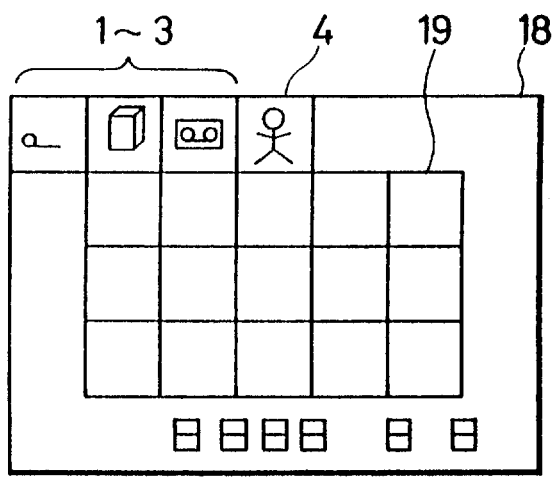
FIG. 13 is a diagram showing characters such as marks which can be displayed on a monitor.

FIG. 13 is a diagram showing marks and the like which can be displayed on the monitor 47. On the monitor 47, there can also be displayed the gaze detection area frame 19 and the frames defining the gaze areas AR1 to AR16. Below the frame 19, there are provided a display area of four columns for displaying a shutter speed TV and another display area of two columns for displaying an aperture value AV. On the left side of the area above the frame 19, there are provided display areas for displaying the set modes, i.e., the photographing modes 1 to 3 and post-operation confirmation display mode 4. The photographing mode 1 is a film photographing mode, the photographing mode 2 is an electronic still photographing mode, and the photographing mode 3 is a motion image photographing mode.

Figure 14:
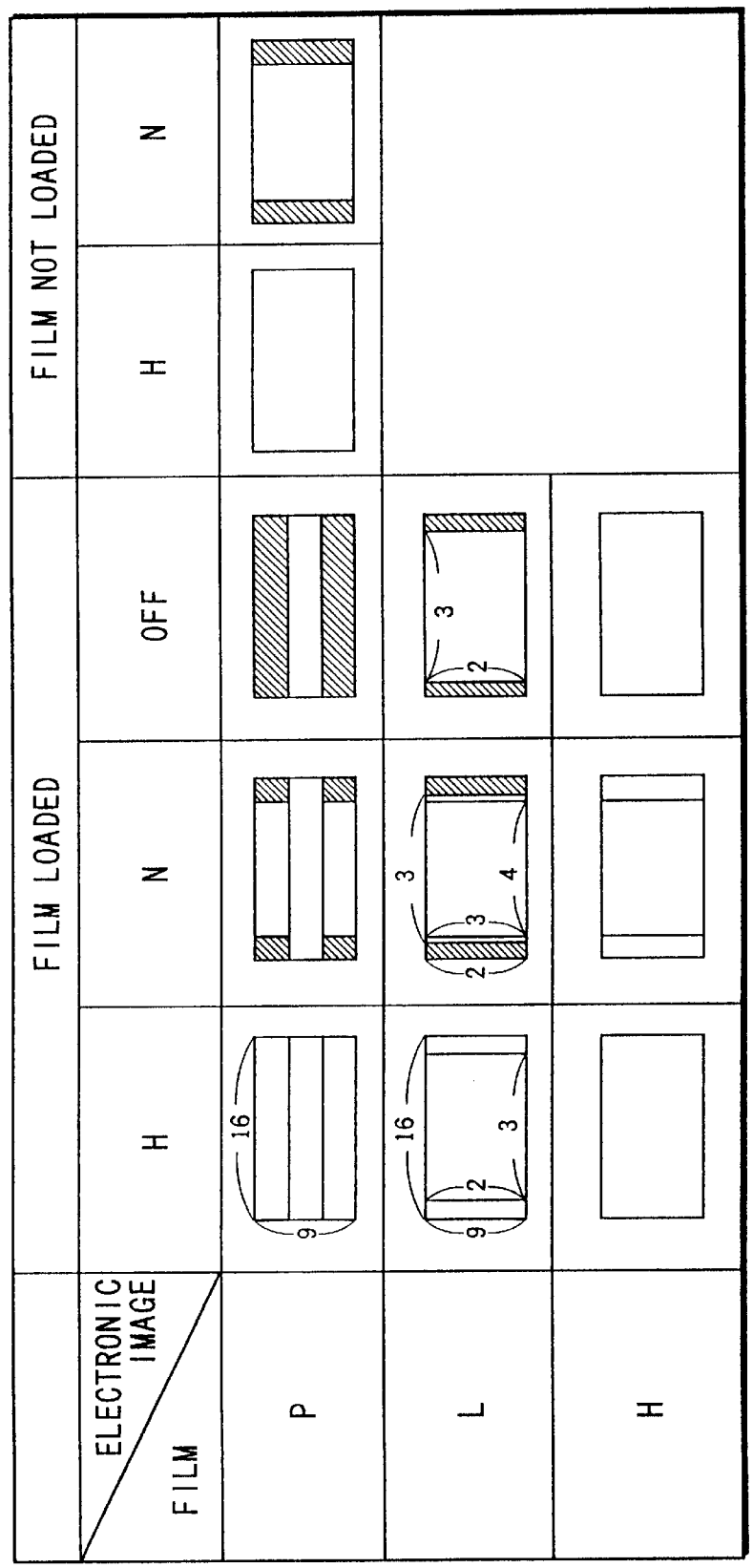
FIG. 14 is a chart showing how an aspect ratio is displayed on a monitor in a film image photographing mode, an electronic still image photographing mode and a motion image photographing mode.

FIG. 14 is a chart showing how the aspect ratio is displayed on the monitor 47 in the film image photographing mode, the electronic still image photographing mode and the motion image photographing mode. In the uppermost horizontal row of this chart, there are written H-mode, N-mode and Off-mode in the electronic still image photographing mode or the motion image photographing mode. In the chart are shown these aspect modes in two cases where the film is loaded and not loaded. In the leftmost vertical column of this chart, there are the aspect modes in the film photographing mode. The presence of the film can be detected by a film sensor FD (see FIG. 1) such as an optical sensor provided in the film loader or a mechanical switch. The sensor FD is provided in the camera main body 20.

In the presence of the film, the following displays are made within the frame 18 when the aspect mode in the motion image or electronic still image photographing mode is H-mode. If the aspect mode in the film photographing mode is Pano-mode, two horizontal frame lines are displayed within the frame 18. An area defined by these two frame lines is an area to be developed when a panorama picture is to be made. If the aspect mode in the film photographing mode is L-mode, two vertical frame lines are displayed at positions corresponding to the aspect ratio of 2:3. If the aspect Code in the film photographing mode is H-mode, no frame lines are displayed within the frame 18. It should be noted that the picked up images are displayed within the frame 18.

In the presence of the film, the following displays are made within the frame 18 when the aspect mode in the motion image or electronic still image photographing mode is N-mode. If the aspect mode in the film photographing mode is Pano-mode, two vertical frame lines for indicating the N-mode in which the aspect ratio is 3:4 and two horizontal frame lines for indicating the Pano-mode are displayed, and non-displayable areas, i.e., four corner portions (oblique lined areas) within the frame 18 are displayed with a specified color (can also be no color). The display of the image is prohibited in the non-displayable areas. If the aspect mode in the film photographing mode is L-mode, two vertical frame lines for indicating the L-mode in which the aspect ratio is 2:3 are displayed, and areas outside of these vertical frame lines (oblique lined areas) are displayed with a specified color (can also be no color). The display of the image is prohibited in the non-displayable areas. If the aspect mode in the film photographing mode is H-mode, two vertical frame lines for indicating the aspect ratio of 3:4 are kept displayed within the frame 18.

In the presence of the film, the following displays are made within the frame 18 when the aspect mode in the motion image or electronic still image photographing mode is Off-mode, vertical and horizontal frame lines for indicating the display areas corresponding to the respective aspect modes in the film photographing mode are displayed. Areas outside the display area (oblique lined areas) are displayed with a specified color (can also be no color). The display of the image in these areas is prohibited. If the aspect mode in the film photographing mode is H-mode, no frame line is displayed within the frame 18.

On the other hand, in the absence of the film, no frame lines are displayed when the motion image and the electronic still image photographing mode is H-mode and two vertical frame lines for indicating the aspect ratio of 3:4 are displayed when they are N-mode. Areas outside these frame lines (oblique lined areas) are displayed with a specified color (can also be no color).

In this way, by displaying the frame lines and the specified areas with the specified color in accordance with the respective modes, the aspect ratio in the film photographing mode and the aspect ratio in the electronic still or the motion image photographing mode can be confirmed only by viewing the monitor 47.

The display made on the monitor 47 does not change according to the posture of the camera, but a display in conformity with the posture is made on the on-body display unit 24. FIGS. 15A and 15B show contents displayed on the on-body display unit 24 when the camera is held in a vertical posture in the cases of the H- and N-modes, respectively. The vertical or horizontal posture of the camera is automatically detected by a posture detecting device HV (see FIG. 1) constructed as follows. A specified amount of conductive liquid is filled in a T-shaped tube having an electrode at each of its three ends. This tube is disposed on a vertical plane when the camera is held in a normal posture. The vertical or horizontal posture is automatically and electrically detected by detecting between which electrodes an electrical connection is established. The image processing is applied in accordance with this detection result and the processed image is displayed within the frame of the on-body display unit 24 shown in FIG. 15.

Only the set photographing mode(s) is/are displayed. For example, if only the motion image photographing mode 3 is selected, the mark representing the magnetic storage medium 52 is displayed. On the other hand, if the photographing modes 1 to 3 are all selected, the marks indicating them are displayed. The mark indicating the post-operation confirmation display mode 4 is displayed when the still image display mode is selected. In the state that the specific modes are not selected, i.e., the film photographing mode (hereinafter referred to as a silver-halide still image photographing mode) and the electronic still image photographing mode are not selected, if the switch S1 is turned on, the marks indicating these unselected photographing modes 1 and 2 blink.

When the silver-halide still image photographing mode and the electronic still image photographing mode are selected, the shutter speed TV and the aperture value AV are displayed regardless of whether or not the photographing is performed. On the other hand, when neither of these modes is selected, i.e., when only the motion image photographing mode is selected, neither the shutter speed TV nor the aperture value AV is displayed. In this way, since unnecessary displays are not made, the screen looks simple and power can be saved.

FIG. 16 shows a state where the gaze detection area frame 19 is displayed on the monitor 47 and FIG. 17 shows a state where the gaze area is displayed on the monitor 47. More specifically, the gaze detection area frame 19 is displayed as shown in FIG. 16 in accordance with the gaze detection result. The detected area AR is displayed as shown in FIG. 17. In FIG. 17, the area AR currently detected by the gaze detecting circuit 2 is indicated by a broken lined frame 191 and is displayed. The area AR manually set by means of the gaze area setting switch out of the detected areas AR is indicated by a solid lined frame 192 and is displayed. When the frames 191 and 192 overlap, they are, for example, displayed. The AF operation and the AE operation including the flash light adjustment are applied to the area AR indicated by the solid lined frame 192.

A CCD/monitor/recorder unit 10 includes the CCD 43, a microcomputer (μC2) 100 for processing an image signal picked up by the CCD 43, a frame memory or like storage device for storing the processed image, the monitor 47 for color-displaying the image, a recorder 16 for controlling the recording of the electronic still image, and a recorder 17 for storing the motion images. The unit 10 will be described in detail later.

An inverter 11 (indicated at INV in FIG. 1) is a dc-to-ac inverter for converting a dc voltage V1 into an ac voltage of a specified level so as to supply an ac voltage to the back light 471 when the monitor 47 is an LCD. An encoder 12 (indicated at DV in FIG. 1) includes a bit mark member carrying bit marks for coding, for example, positions, and a reader for reading the information represented by each bit on the bit mark member. The bit mark member and the reader are arranged at a stationary side and a rotatable side of the taking lens unit 21 so as to be opposed to each other, respectively. The encoder 12 outputs a distance information corresponding to a projected amount of the taking lens unit 21 as a coded data. An encoder 13 (indicated at f in FIG. 1) includes a bit mark member and a reader similar to the encoder 12. These members are arranged at the stationary side and a side of a zooming lens of the taking lens unit 21, respectively. The encoder 13 outputs an focal length information as a coded data. An AND circuit 14 has one input terminal thereof connected to the switch S1 and the other input terminal thereof connected to the grip switch Sg. An output terminal of the AND circuit 14 is connected to an interrupt terminal INT of the microcomputer 1.

A transmitting/receiving unit 142 transmits the picked up image data and various control data to the transceiver RX and receives signals, from the transceiver RX, which are generated by operating various switches of the transceiver RX. The microcomputer 1 controls transmission and reception of the signals.

Further, indicated at PR is a photointerrupter, at MR a magnetic recording/reproducing device, at HV a vertical/horizontal posture detector, and at FD a film sensor for detecting the presence of the film.

There will be described next various switches.

S1: The switch Si is turned on when the release button 22 is pressed to the first stage, thereby starting various operations such as the AE and AF operations to prepare for the photographing operation.

S2: The switch S2 is turned on when the release button 22 is pressed to the second stage, thereby starting an exposure control to carry out the photographing operation.

Sdpi: The switch Sdpi is provided to display a still image stored in the frame memory during the photographing operation, and corresponds to the display instruction button 25 shown in FIG. 2.

Spv: The switch Spv is provided to display on the monitor 47 the image picked up through the aperture of the diaphragm set at a control aperture value, and corresponds to the preview switch 27 shown in FIG. 2.

Ssdi: The switch Ssdi is provided to set and reset the gaze area detected by the gaze detecting circuit 2, and corresponds to the gaze area setting switch 30 shown in FIG. 3.

Sdpup: The switch Sdpup is provided to change sequentially the images stored in the display memories, and corresponds to the memory change switch 26 shown in FIG. 2.

Swb: The switch Swb corresponds to the color correction switch 35 shown in FIG. 2. A blue color correction is made when the switch Swb is operated together with the front control dial 33, whereas a red color correction is made when it is operated together with the rear control dial 34.

Sx: The switch Sx is turned on when a travel of a front blind of the focal plane shutter is completed, thereby starting the flash firing.

S(±)amb: This switch corresponds to the exposure correction switch 36 shown in FIG. 2 and is provided to carry out the exposure correction.

S(±)fl: This switch corresponds to the exposure correction switch 37 and is provided to carry out the exposure correction by adjusting the amount of flash light.

Smd: The switch Smd corresponds to the exposure mode changeover switch 38 shown in FIG. 2 and is provided to change the exposure mode.

Srem: The switch Srem is provided to change the control by the transceiver RX to the control by the camera main body 20, and vice versa. An on- or off-signal of the switch Srem is input to the microcomputer 1 when the switch T1 (i.e., the switch Srem) is operated upon mounting the transceiver TX on the camera main body 20.

Srec: The switch Srec is operated to record motion images and corresponds to the recording start switch 39 shown in FIG. 2. When this switch is turned on, the interrupt routine is carried out and the recording is started.

Smdt: The switch Smdt corresponds to the photographing mode changeover switch 40 shown in FIG. 2 for changing the photographing mode. By operating the switch Smdt, one of the seven available photographing modes can be set to be described later.

Sasp1: The switch Sasp1 is operated to change the aspect mode when the film image photographing mode is set and corresponds to the switch 61 shown in FIG. 2.

Sasp2: The switch Sasp2 is operated to change the aspect mode when the electronic still image photographing mode or the motion image photographing mode is set and corresponds to the switch 62 shown in FIG. 2. The aspect mode is changed by operating the front or rear control dial 33 or 34 after operating the switch Sasp1 or Sasp2.

Figure 18:
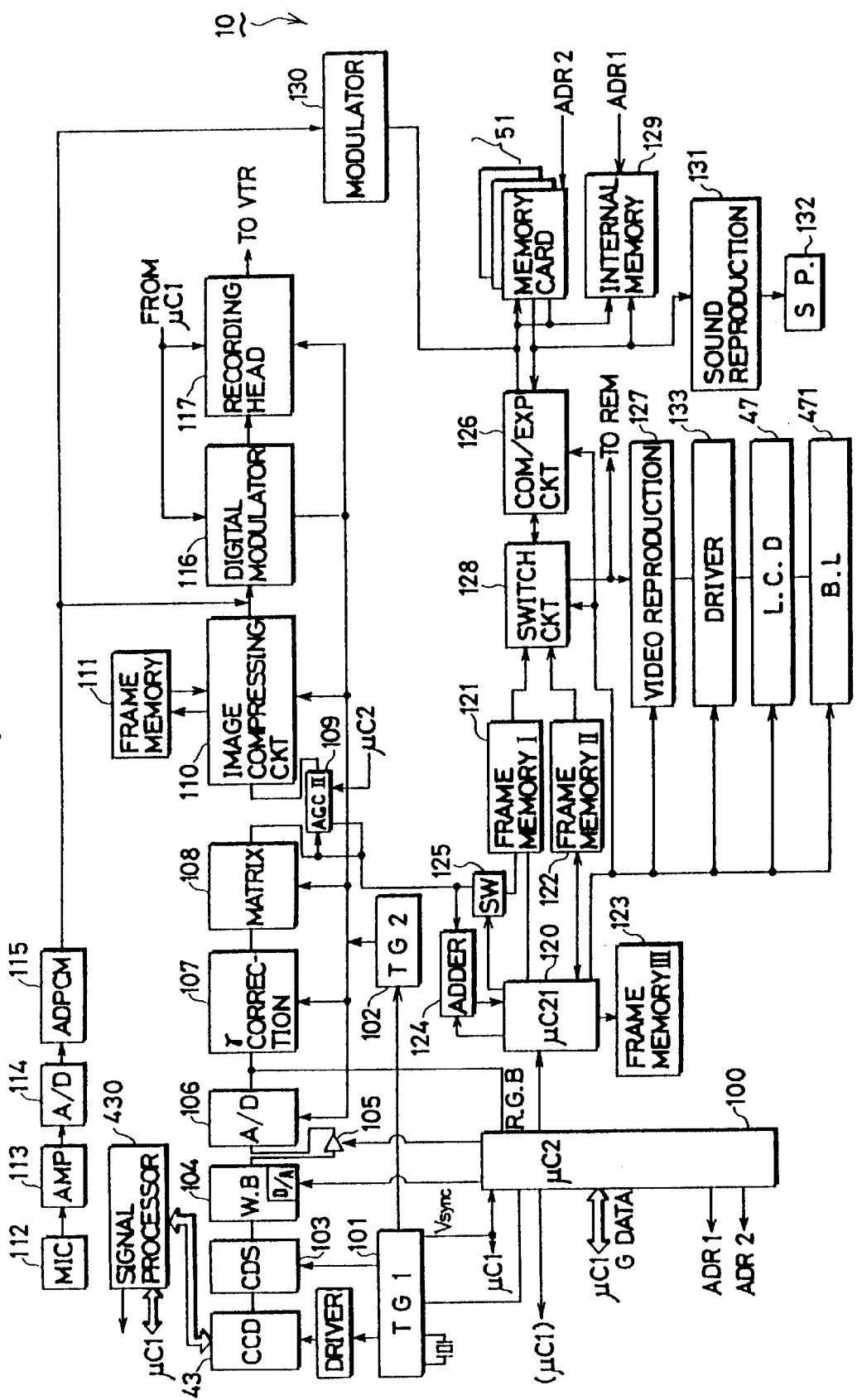
FIG. 18 is a circuit construction diagram of a CCD/monitor/recorder unit.

FIG. 18 is a detailed circuit construction diagram of the CCD/monitor/recorder unit 10. In terms of functions, the unit 10 is roughly divided into sections of picking up images, processing the signals, processing the images, recording the images, and displaying the images. The recording section is so constructed that both motion and still images can be recorded. The microcomputer 100 sends command signals and control signals to respective circuits in the unit 10 (i.e., signals ADR1 and ADR2) and conducts suitable data communication with the microcomputer 1 (i.e., G DATA) upon receipt of a command from the microcomputer 1. A microcomputer (μC21) 120 is adapted to process the image data and to change the frame 18 according to the photographing mode and the aspect mode as shown in FIG. 14.

The CCD 43 is connected with a signal processor 430 for extracting signals used to conduct the light measurement and the flash light adjustment. The signal processor 430 is also connected with the light measuring/flash light adjusting circuit 9 in the camera main body 20 and is adapted to transfer the light measurement data and the flash light adjustment data in the form of a STP signal.

A timing signal generator 101 (hereinafter, referred to as TG1 101) outputs, upon receipt of the control signal from the microcomputer 100, a variety of timing signals to the specified circuits in the image picking up section and the signal processing section. A timing signal generator 102

(hereinafter, referred to as TG2 102) outputs, upon receipt of a timing signal from the TG1 101, specified timing signals to the specified circuits in the image processing section. A correlative double sampling (CDS) circuit 103 applies a correlative double sampling to the color image signals of R, G and B of the signal representing the picked up image which is read from the CCD 43, so as to remove noises. A white balance (WB) circuit 104 applies a white balance correction in accordance with the data from the microcomputer 100. A gain controller I (AGCI) 105 controls a gain in accordance with a signal from the microcomputer 100. An analog-to-digital (A/D) converter 106 converts the input analog image signal into a digital image signal. A γ correction circuit 107 applies a γ correction to the image signal. A matrix circuit 108 converts the color image signals of R, G and B to which the γ correction was applied into a Y-signal and a color difference signal. A gain controller (AGCII) 109 controls a gain in accordance with a signal from the microcomputer 100. An image compressing circuit 110 applies an image compression to a received motion image signal, for example, in accordance with the MPEG standard. A frame memory 111 is a dual-port RAM capable of performing data input and data output simultaneously. The frame memory 111 is used to temporarily store the data during the data compression in the image compressing circuit 110.

An audio microphone (MIC) 112 has a receiver disposed in a suitable position on the front face of the camera so as to efficiently collect ambient sounds and performs a specified mixing to a sound signal. The audio signal output from the MIC 112 is pulse-modulated in an ADPCM circuit 115 after being amplified in an amplifier 113 and A/D converted in an A/D converter 114.

A digital modulator 116 converts the image signal from the image compressing circuit 110 and the audio signal from the ADPCM circuit 115 into signals of a specified format so that these signal can be recorded. Upon receipt of a data concerning whether the camera is held in a vertical or horizontal posture (posture data) and the aspect mode from the microcomputer 100, the digital modulator 116 converts the received signal into an image signal which can be displayed as shown in FIGS. 15A or 15B.

A recording head 117 records the signals of the converted format on the magnetic recording medium 52. The recording of the signals on the magnetic recording medium 52 is controlled in accordance with a control signal from the microcomputer 1. Known driving mechanisms such as those used for the recording on a magnetic tape can be used as driving mechanisms to carry out the recording which are provided near the recording head 117.

Frame memories 121 and 122 are each a dual-port RAM capable of performing data input and data output simultaneously. The image data are written in and read from these memories. The frame memory 121 stores a raw image data, whereas the frame memory 122 stores the image data obtained by applying the image processing to the raw image data by means of the microcomputer 120. An adder 124 adds the raw image data from the frame memory 121 and the image signal from the matrix circuit 108. A switch (SW) 125 operates to control the writing of the image signal from the matrix circuit 108 in the frame memory 121 and the feeding thereof to the adder 124. An image compression/expansion circuit 126 applies a specified image compression to the image signals from the frame memories 121 and 122 in accordance with the JPEG standard. A video image reproducing circuit 127 converts the image signals from the frame memories 121 and 122 into signals which can be displayed. A switch circuit 128 selectively outputs the image signals from the frame memories 121 and 122 to the image compression/expansion circuit 126 and to the video image reproducing circuit 127. A memory 129 is an internal image memory and has a capacity for recording a specified number of frames of image. Audio signals are sent by way of a modulator 130 and a sound reproducing circuit 131 to a loudspeaker 132 disposed in a suitable position on the surface of the camera main body 20, in which the audio signals are reproduced. A driver 133 makes the image signal from the video image reproducing circuit 127 into an image signal which can be displayed on the monitor 47.

Figure 19:
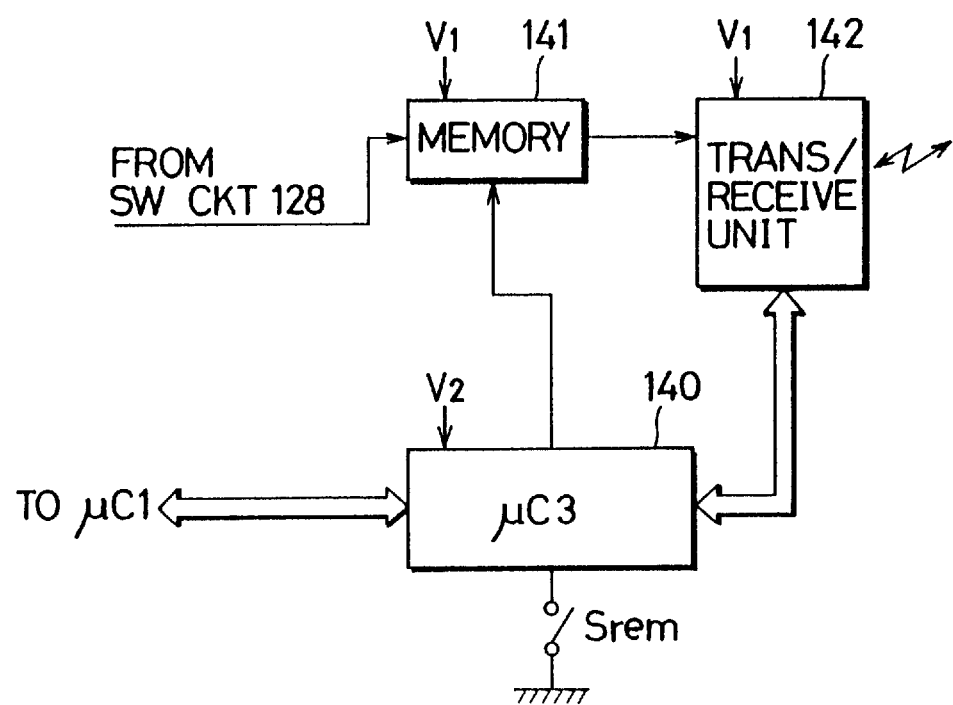
FIG. 19 is a block diagram of the transceiver TX.

FIG. 19 is a block diagram of the transceiver TX. When the transceiver TX is mounted on the camera main body 20, unillustrated power supply terminals from a power source 15 (FIG. 1) of the camera main body 20 and the transceiver TX are connected, thereby enabling the power $V_1$ to be supplied from the camera main body 20 to the transceiver TX. The power source produces power at voltages $V_0$, $V_1$, $V_2$ at various terminals via various circuit including diode D1, transistor $Q_1$ and capacitor $C_1$ as shown in FIG. 1. A microcomputer ($\mu$C3) 140 controls respective elements of the transceiver TX, transmits and receives signals to and from the microcomputer 1. A memory 141 is a dual-port RAM capable of performing data input and data output simultaneously. The memory 141 receives and stores the image data output from the switch circuit 128. The image data is written in and read from the memory 141. A transmitting/receiving unit 142 transmits the image data and the control data to a transmitting/receiving device of the transceiver RX and receives the operation data therefrom.

Figure 20:
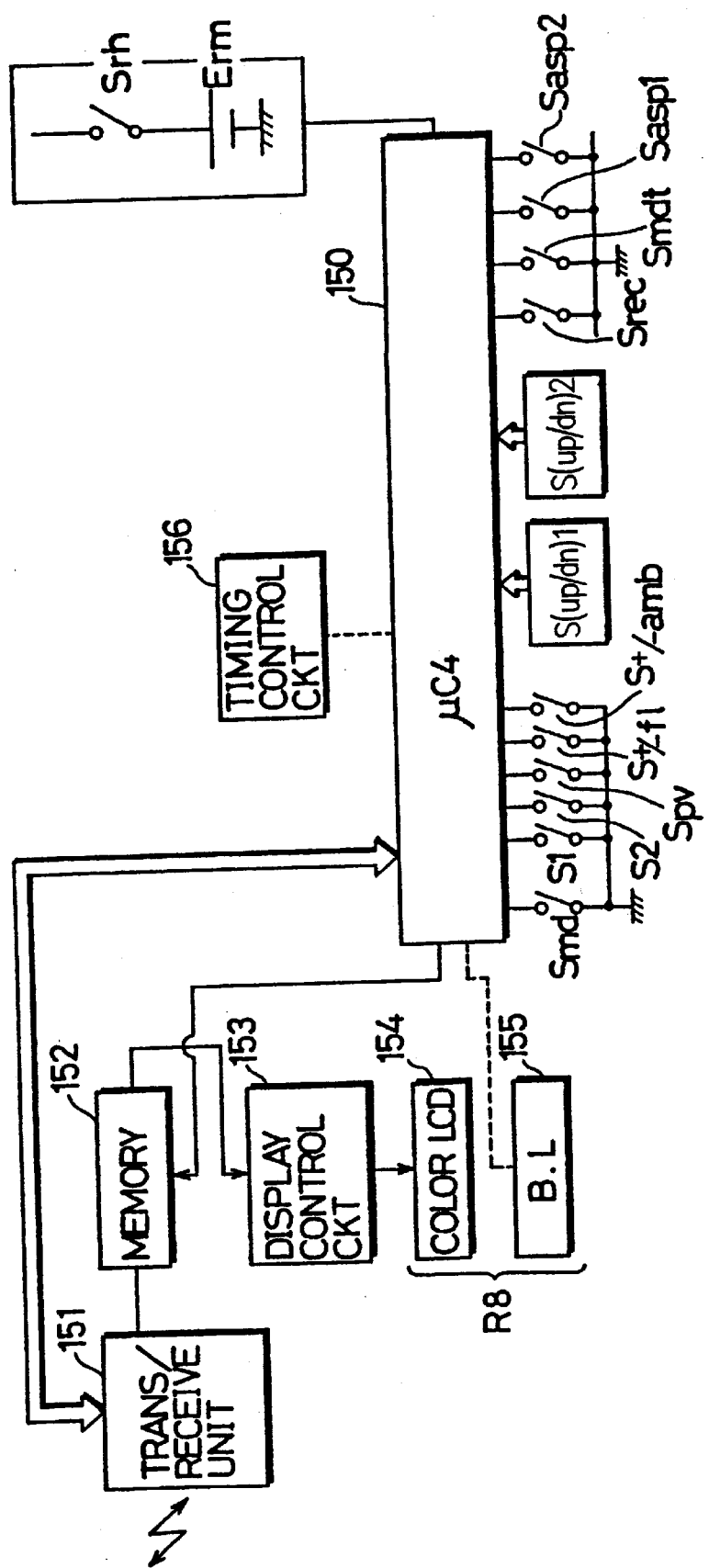
FIG. 20 is a block diagram of the transceiver RX.

FIG. 20 is a block diagram showing the transceiver RX. A microcomputer ($\mu$C4) 150 controls respective elements of the transceiver RX. A transmitting/receiving device 151 receives the image data and the control data from the transceiver TX of the camera main body 20 and transmits the operation data thereto. The received image data are written in a memory 152 and are repeatedly output to a display control circuit 153. The image data are then output to a color LCD 154 constituting a liquid crystal display R8 similar to the case in the camera main body 20, and are displayed as still images. A timing control circuit 156 generates and sends a timing signal used to measure timings for the signals which cause the respective circuits to operate. Indicated at 155 is a back light (BL) for projecting light to the color LCD 154.

Various switches will be described next.

Srh: The switch Srh, corresponding to a power supply switch R1, is turned on and off to allow and interrupt power supply Erm.

Smd: The switch Smd corresponds to the exposure mode changeover switch R3.

S1, S2: The switches S1, S2 correspond to the release button R3. An exposure preparation is started when the release button R3 is pressed halfway, and the exposure control is conducted when the button R3 is pressed all the way.

Spv: The switch Spv corresponds to the preview switch R6.

S(±)fl: The switch S(±)fl corresponds to the exposure correction switch R10.

S(±)amb: The switch S(±)amb corresponds to the exposure correction switch R7.

S(up/dn)1: The switch S(up/dn)1 corresponds to the up- and down-switches R4.

S(up/dn)2: The switch S(up/dn)2 corresponds to the up- and down-switches R5.

Srec: The switch Srec is a motion image recording start switch and corresponds to the recording start switch R11.

Smdt: The switch Smdt is a photographing mode changeover switch and corresponds to the photographing mode changeover switch R12.

Sasp1, Sasp2: These switches are operated to change the aspect mode and correspond to the switches R13 and R14, respectively.

Figure 21:
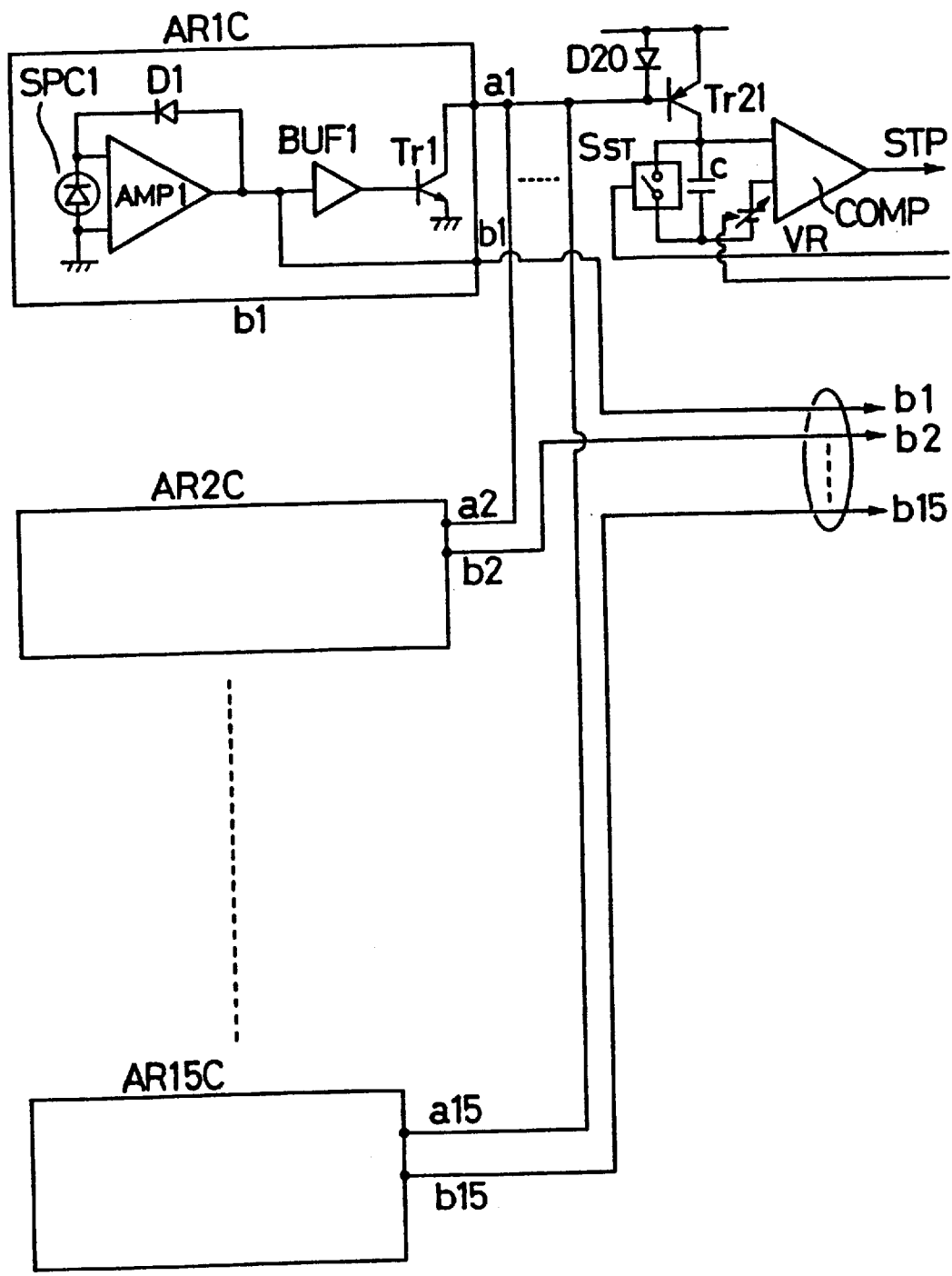
FIG. 21 is an internal circuit diagram of a light measurement/flash light adjustment circuit.

FIG. 21 is an internal circuit diagram of the light measuring/flash light adjusting circuit 9.

Indicated at AR1C to AR15C are light measuring circuits corresponding to the areas AR1 to AR15. Since these circuits are constructed identically, description will be given only on the AR1C. Indicated at SPC1 is a light measuring (flash light adjusting) element which expresses one of the fifteen areas of the CCD 43 as a circuit. The element SPC1 is connected between input terminals of an operational amplifier AMP1. A diode D1 is provided between an output terminal of the operational amplifier AMP1 and one of the input terminals thereof to perform logarithmic compression. Indicated at BUF1 is a buffer which has an output terminal connected to a transistor Tr1 for expanding the compressed signal. A collector of the extension transistor Tr1 is connected to an output terminal a1 while the output terminal of the operational amplifier AMP1 is connected to an output terminal b1. The light measuring circuit AR1C operates as follows. The light measuring (flash light adjusting) element SPC1 outputs a current corresponding to the light incident thereupon. This output current is compressed by the diode D1 and is output to the microcomputer 1 as a light measurement signal through the output terminal b1. On the other hand, the light measurement signal is fed through the buffer BUF1 to the transistor Tr1 to be expanded therein. The expanded signal is input to a base of a transistor Tr21 through the output terminal a1. The transistor Tr21 has an emitter connected to a constant voltage supply, a collector connected to a capacitor C for charging, and a base connected to a cathode of a diode D20 which is connected to the constant voltage supply. To the base of the transistor Tr21 are input all the output currents from output terminals a1, a2, . . . , a15 of the light measuring circuits AR1C to AR15C. The average light adjustment of flash is performed in all areas AR1 to AR15, by supplying a current equal to the input current signal to the capacitor C. Indicated at Sst is a flash light adjustment start switch which is turned off when the flash light adjustment is started, at VR a variable voltage supply whose reference voltage is variable according to the film sensitivity, and at COMP a comparator which outputs an emission stop signal STP by inverting its output when a charging voltage of the capacitor C becomes in excess of the reference voltage of the variable voltage supply VR. After the start of the exposure, the capacitor C is charged by the current from the transistor Tr21. When the charging voltage becomes in excess of the reference voltage, the emission stop signal STP is output on the assumption that a proper exposure has been attained, so as to stop the firing of the flash device.

The operation of the camera will be described hereafter. With the reference to FIGS. 22 to 53, a control executed by the microcomputer 1 will be described.

Various flags will be first described. TABLE 1 below shows contents of states when the respective flags are set or reset.

TABLE 1

| FLAG | SET | RESET |
|---|---|---|
| SGRF | GAZE DETECTED | |
| TMF | TIMER ON | TIMER COMPLETED |
| RSTF | AREA CANCELED | |
| ARF | AREA DESIGNATED | |
| AFEF | IN-FOCUS CONDITION ATTAINED | IN-FOCUS CONDITION NOT ATTAINED |
| SREMF | REMOTE MODE ON | NORMAL PHOTOGRAPHING MODE |
| MDTF | PHOTOGRAPHING MODE BEING SET | |
| MDF | EXPOSURE MODE BEING SET | |
| ECRF | EXPOSURE CORRECTION BEING SET | |
| ECRfcF | EXPOSURE CORRECTION BY FLASH LIGHT BEING SET | |
| WBF | WHITE BALANCE CORRECTION BEING SET | |
| RECF | RECORDING MODE ON | |
| 2ndF | 2nd PHOTOGRAPHING DURING PREVIEW FOR FLASH LIGHT ADJUSTMENT | |
| PVF | PREVIEW MODE ON | |
| DPIF | STILL IMAGE BEING DISPLAYED | |
| MEXPF | OBTAIN A STILL IMAGE BY REPEATING THE IMAGE PICK-UP EVERY 1/60 SECOND | |
| EXPF | EXPOSURE ON (CCD) | |
| EXENF | EXPOSURE CONTROL COMPLETED | |
| 1stF | INDICATE LAST EXPOSURE BY CCD DURING EXPOSURE OF PICKING UP IMAGE EVERY 1/60 SECOND | |
| DPIF | STILL IMAGE DISPLAY MODE ON | |
| DP1stF | INDICATE THAT DISPLAY CONTROL II HAS ONCE BEEN CONDUCTED IN STILL IMAGE DISPLAY MODE | |
| ASP1F | INDICATE THAT THE ASPECT RATIO IS BEING CHANGED IN FILM IMAGE PHOTO. MODE | |
| ASP2F | INDICATE THAT THE ASPECT RATIO IS BEING CHANGED IN ELE. STILL IMAGE PHOTO. MODE OR ANIM. IMAGE PHOTO. MODE | |

Figure 22:
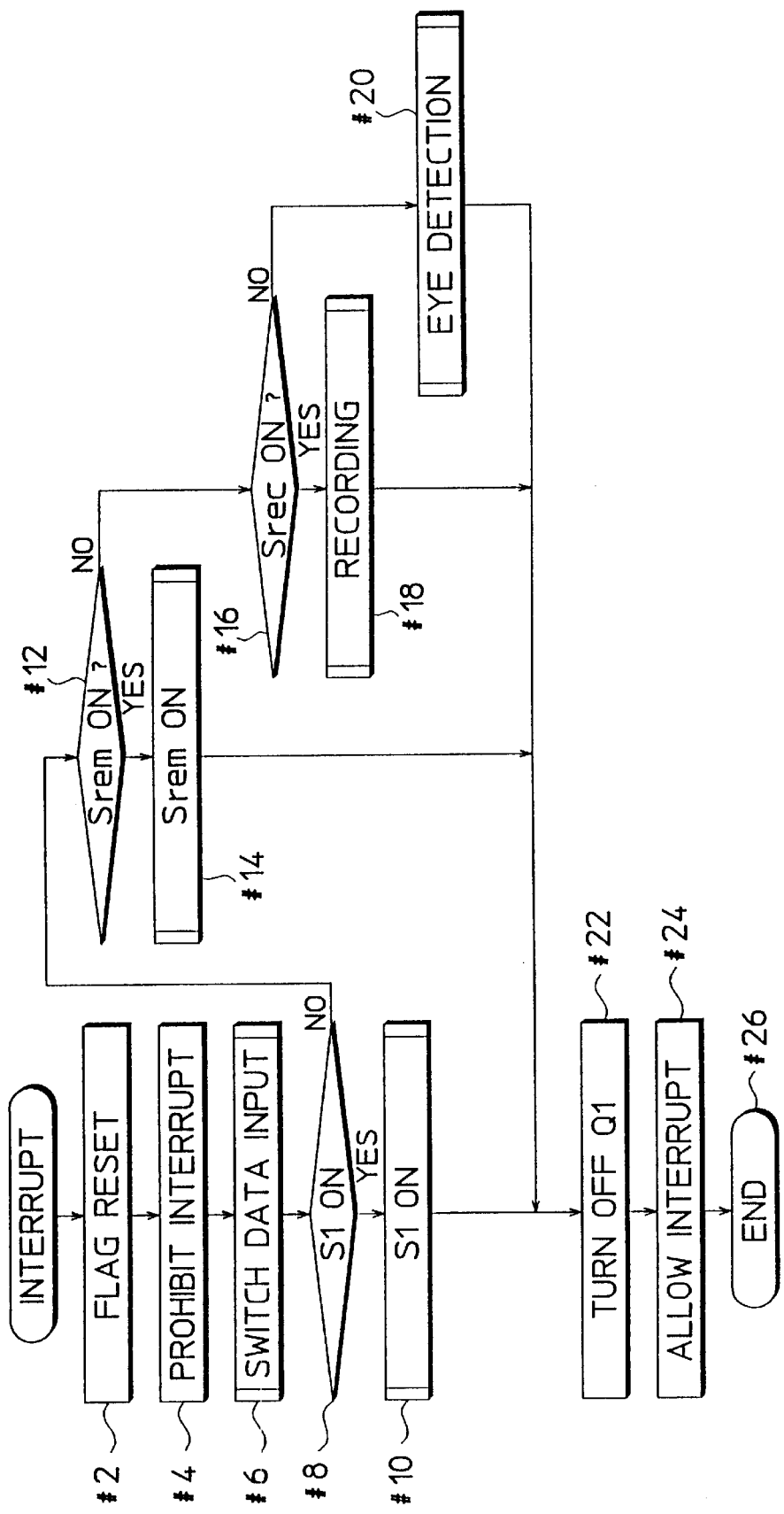

FIG. 22 is a flowchart showing an interrupt routine executed when the switch S1, the recording start switch Srec or the grip switch Sg is turned on.

When the interruption is made, the microcomputer 1 resets all the flags (Step #2) and prohibits any interruption to this routine (Step #4). Subsequently, data concerning the various switches are input (Step #6). In other words, a subroutine "Switch Data Input" is carried out to execute a control according to the operated switches.

Figure 23:
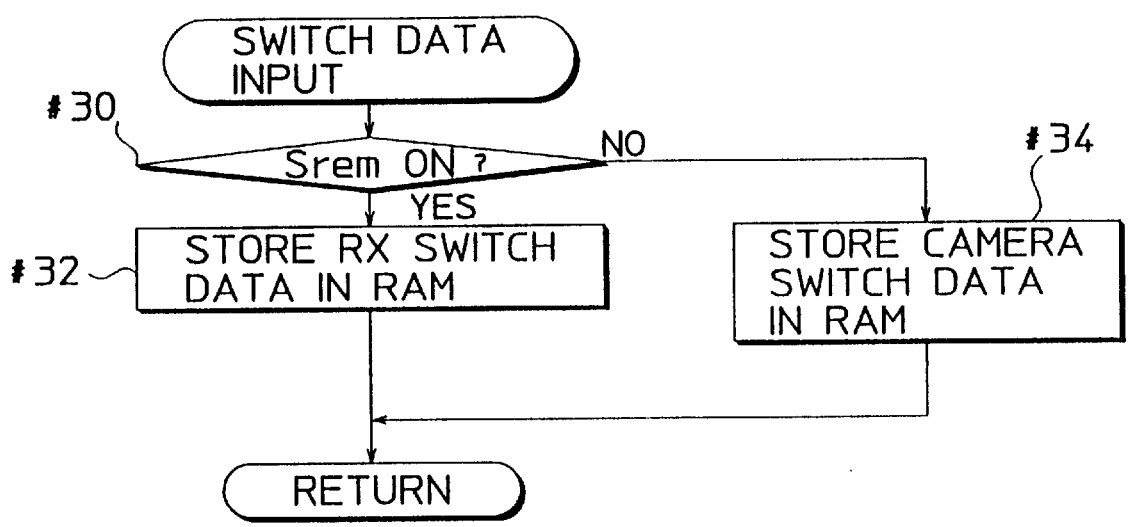
FIG. 23 is a flowchart showing a subroutine "Switch Data Input"

FIG. 23 is a flowchart showing the subroutine "Switch Data Input."

It is first discriminated whether the transceiver TX is mounted on the camera main body 20 and the switch Srem is turned on (Step #30). If the switch Srem is on, the switch data transmitted from the transceiver RX are stored in an internal RAM 1a of the microcomputer 1 (Step #32) since the remote control is executed. If the switch Srem is off, the states of all the switches provided in the camera main body 20 are monitored and the monitoring results are stored in the internal RAM 1a (Step #34) and this subroutine returns. All the detections of the states of the switches hereafter are made based on the stored contents of the internal RAM.

Referring back to FIG. 22, it is discriminated based on the switch data stored in the internal RAM 1a whether this interruption is made by turning on the switch S1 (Step #8). If the switch S1 has been turned on, this routine proceeds to a subroutine "S1 ON (Step #10)." On the other hand, unless the switch S1 is off, it is discriminated whether the switch Srem of the transceiver TX is on (Step #12). If the switch Srem is on, a subroutine "Srem ON" is executed (Step #14). If the switch Srem is off, it is discriminated whether the switch Srec is on (Step #16). If the switch Srec is on, a subroutine "Recording" is executed (Step #18). If the switch Srec is off, a subroutine "Eye Detection" is executed (Step #20) and then this routine proceeds to Step #22. In Step #22, the transistor Q1 is turned off to stop the power supply to the CCD/monitor/recorder unit 10 and the like. This routine ends (Step #26) after allowing an interrupt to this routine (Step #24).

Figure 24:
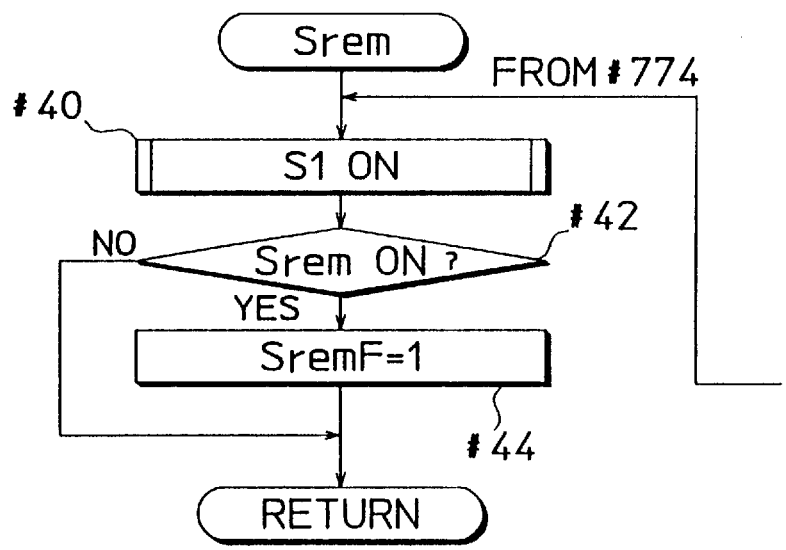
FIG. 24 is a flowchart showing a subroutine "Srem"

FIG. 24 is a flowchart showing the subroutine "Srem." The subroutine "Si ON" is first executed (Step #40), and it is discriminated whether the switch Srem of the transceiver TX is on (Step #42). This subroutine returns after resetting a flag SremF indicative of the ON-state of the switch Srem (Step #44) if the switch Srem is on, while returning directly if the switch Srem is off.

Figure 25:
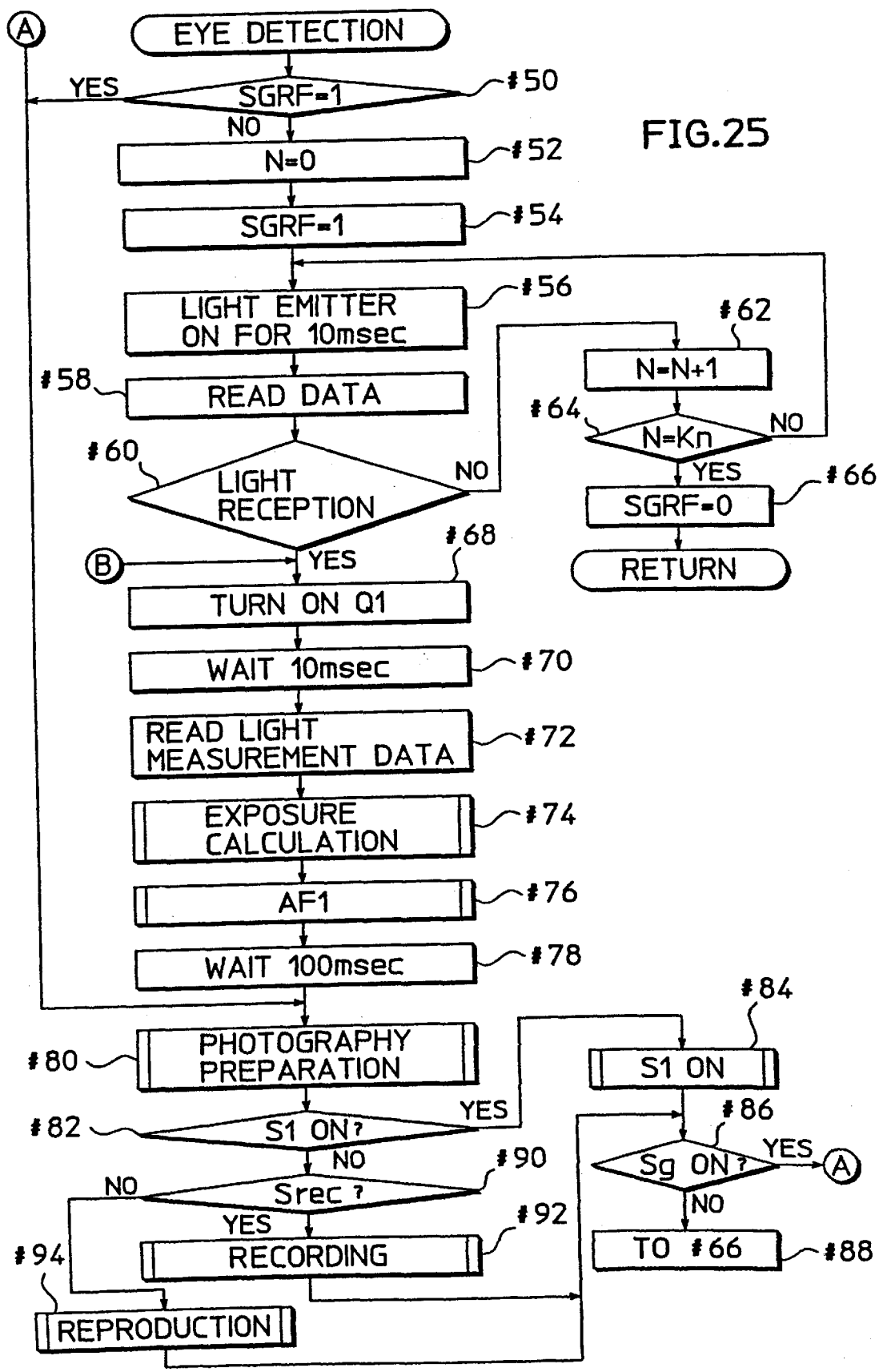
FIG. 25 is a flowchart showing a subroutine "Eye Detection"

FIG. 25 is a flowchart showing the subroutine "Eye Detection."

It is first discriminated whether the eye detection has been conducted by checking the state of an eye flag SGRF (Step #50).

Unless the eye detection has been conducted, a count value N for measuring a time is reset to "0" (Step #52) and the eye flag SGRF is set to indicate that this subroutine has been carried out for the eye detection (Step #54). Then, the microcomputer 1 turns the light emitter 291 of the eye sensor 29 on for 10 msec. (Step #56) and a data from the light receiver 292 during this period is read (Step #58). The presence or absence of the light reception data is then discriminated (Step #60). If no light reception data is detected, the count value N is incremented by one (Step #62) and it is discriminated whether N=Kn (Step #64). Kn is a value corresponding to 2 seconds. If N=Kn, the eye flag SGRF is reset on the assumption of the lapse of 2 seconds (Step #66) and this subroutine returns. On the other hand, this subroutine proceeds to step #56 if N≠Kn.

If the light reception data is detected (Step #60), it is judged that the camera operator is viewing through the viewfinder 28 and the transistor Q1 is turned on to supply the power to various circuits (Step #68). After waiting for 10 msec. until the light measuring/flash light adjusting circuit 9 is stabilized (Step #70), the light measurement data is read (Step #72). The exposure calculation is performed based on the light measurement data obtained in Step #72 (Step #74) and a provisional focal condition detection AF1 is carried out based on exposure calculation result (Step #76). Thereafter, this routine waits for only 100 msec. (Step #78).

Figure 26:
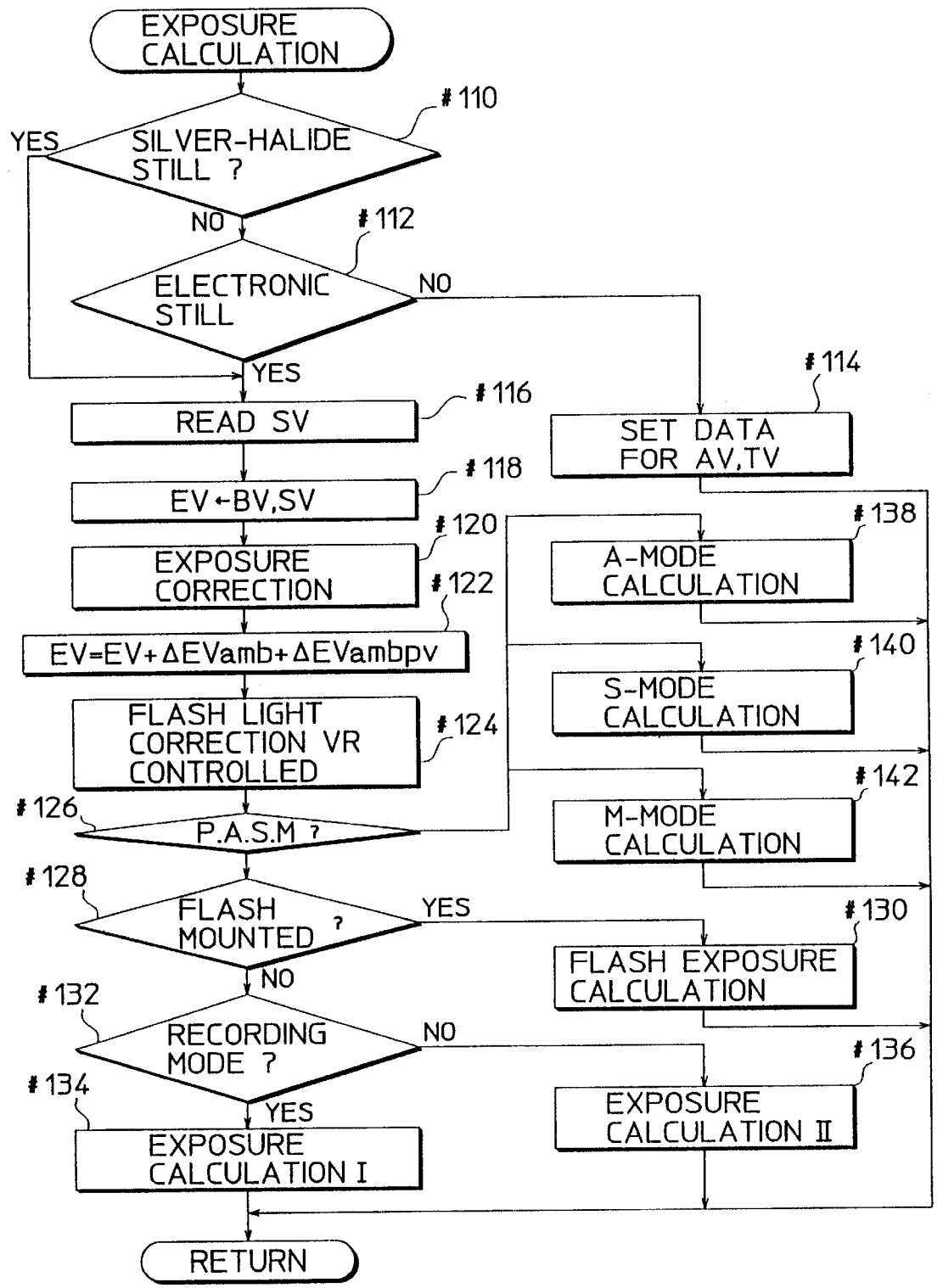
FIG. 26 is a flowchart showing a subroutine "Exposure Calculation"

FIG. 26 is a flowchart showing a subroutine "Exposure Calculation."

First in this subroutine, it is discriminated whether the set photographing mode is one of the silver-halide still image photographing mode and the electronic still image photographing mode (Steps #110 and #112). If the set photographing mode is neither of these two modes, this subroutine returns without performing the exposure calculation after setting a data for prohibiting the display of the aperture value AV and the shutter speed TV is set (Step #114). On the other hand, this subroutine proceeds to Step #116 if the set photographing mode is either the silver-halide still image photographing mode or the electronic still image photographing mode. In Step #116, the film sensitivity SV of the loaded film is read by the film sensitivity reading circuit 6. A light measurement value BV is added to the read film sensitivity SV to obtain an exposure value EV (Step #118) and the exposure correction is executed (Step #120). Further, the exposure value EV is recalculated by adding a present exposure correction amount $\Delta$EVamb and an exposure correction amount $\Delta$EVambpv during the preview to the obtained exposure value EV (Step #122). The exposure correction amounts $\Delta$EVamb and $\Delta$EVambpv are both to the ambient light. Then, an amount of flash light {($\Delta$EVfl) +($\Delta$EVflpv)} corrected during this exposure correction and the preview is corrected. In correcting the flash light amount, i.e., an amount of flash light adjustment, the variable voltage supply VR is feedback controlled (Step #124). However, the amount of light to be emitted from the flash device may be adjusted based on this correction amount.

Subsequently, the exposure mode is discriminated (Step #126). If a P-mode is set, it is discriminated whether the flash device is mounted on the camera main body 20 (Step #128). If the flash device is mounted, an exposure calculation for the flash firing photographing operation is performed based on the exposure value so as to obtain the aperture value AV and the shutter speed value TV (Step #130). If the flash device is not mounted, it is discriminated whether the recording mode is set (Step #132). If the recording mode is set, an exposure calculation I under the ambient light is performed to calculate the aperture value AV and the shutter speed value TV (Step #134). If the recording mode is not set, an exposure calculation II under the ambient light is performed to calculate the aperture value AV and the shutter speed value TV (Step #136).

Figure 27:
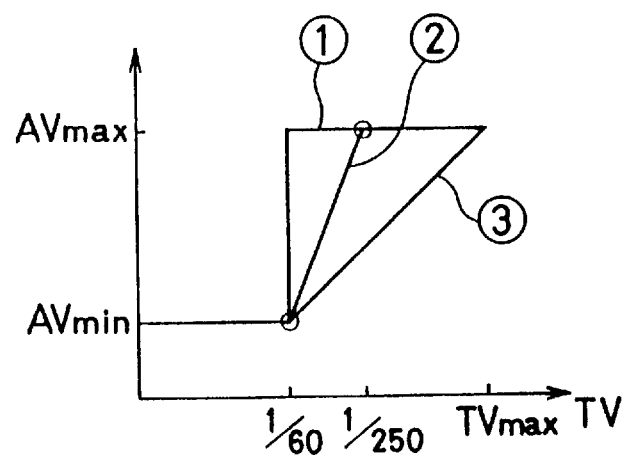
FIG. 27 is a graph showing program lines.

FIG. 27 is a graph showing program lines defining relationship between the aperture value AV and the shutter speed value TV. In this graph, the exposure calculations I and II under the ambient light are indicated by the program lines ②  and ③, respectively. The program line ① represents that the shutter speed is set at 1/60 second between the minimum and maximum aperture values and varies with the brightness at the minimum and maximum aperture values. The program line ① is designed to synchronize with a field (screen scanning) cycle of a television scanning, and is used to control the aperture value AV and the shutter speed value TV during the photography preparation and the record of the motion images. At the maximum aperture value, a control is executed such that the shutter speed can be increased up to 1/250 second. The value 1/250 second is set as a limit shutter speed which enables the motion images to be suitably displayed on television. The program line ③ is used to photograph still images and is such that the aperture value and the shutter speed change according to the brightness at the same rate. A program line for the highspeed photographing, a program line for the portrait photographing which prioritizes an open aperture value, or a program line which sets a depth of field large may be used for the still image photographing. The program line ② is used to photograph still images during the motion image recording. With this program line, the aperture value becomes maximum at the shutter speed of 1/250. This program line is designed to reduce a change in the aperture value when the motion image display mode is switched to the still image photographing mode, to reduce the hand shake and the image shake by increasing the shutter speed, and to realize satisfactory continuity of the motion images. Thus, the shutter speed is limited to $\frac{1}{250}$ second.

If the set exposure mode is A-mode, S-mode, or M-mode, a known exposure calculation is performed to obtain the aperture value AV and the shutter speed value TV to be controlled and/or displayed (Step #138, #140 and #142) and this subroutine returns.

Figure 28:
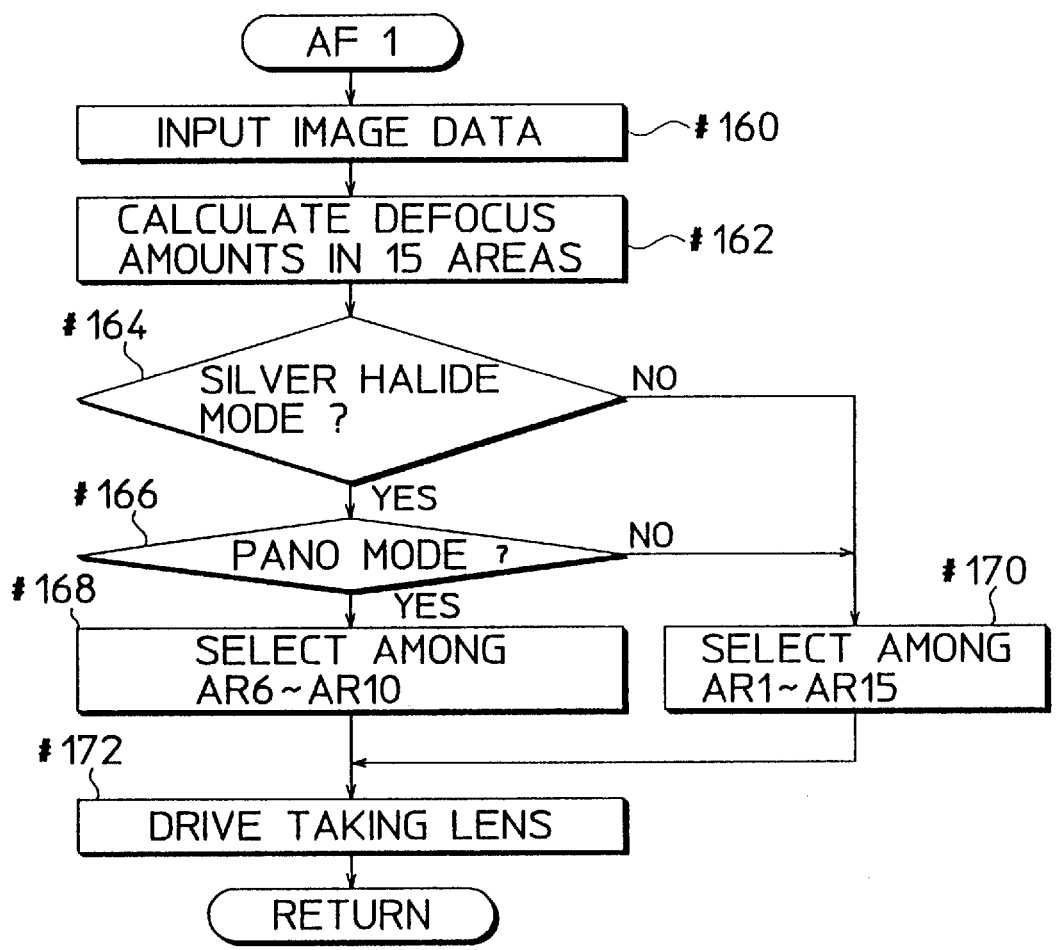
FIG. 28 is a flowchart showing a subroutine "AF1"

FIG. 28 is a flowchart showing the subroutine "AF1." This subroutine is carried out to automatically select a main object when no area is set based on the gaze detection and to drive the taking lens 21 in accordance with a defocus amount in the area selected from the fifteen areas. First, the image data stored in the CCD/monitor/recorder unit 10 is input to the microcomputer 1 in accordance with a reading command signal from the microcomputer 1 (Step #160), and the defocus amounts in the respective fifteen areas is calculated based on the received image data (Step #162). It is then discriminated whether the silver-halide still image photographing mode is set (Step #164). If this mode is set, it is discriminated whether the set aspect mode is Pano-mode (Step #166). If the Pano-mode is set, an object closest to the camera main body 20, among those which fall within the areas AR6 to AR10, is assumed as a main object and the area corresponding to this main object is selected (Step #168). The taking lens 21 is driven based on the defocus amount in the selected area (Step #172) and this subroutine returns. If the silver-halide still image photographing mode is not set or the Pano-mode is not set although the silver-halide still image photographing mode is set, an object closest to the camera main body 20, among those which fall within the areas AR1 to AR15, is assumed as a main object and the area corresponding to this main object is selected (Step #170). The taking lens 21 is driven based on the defocus amount in the selected area (Step #172) and this subroutine returns.

Referring back to FIG. 25, a subroutine "Photography Preparation" is carried out in Step #80.

Figure 29:
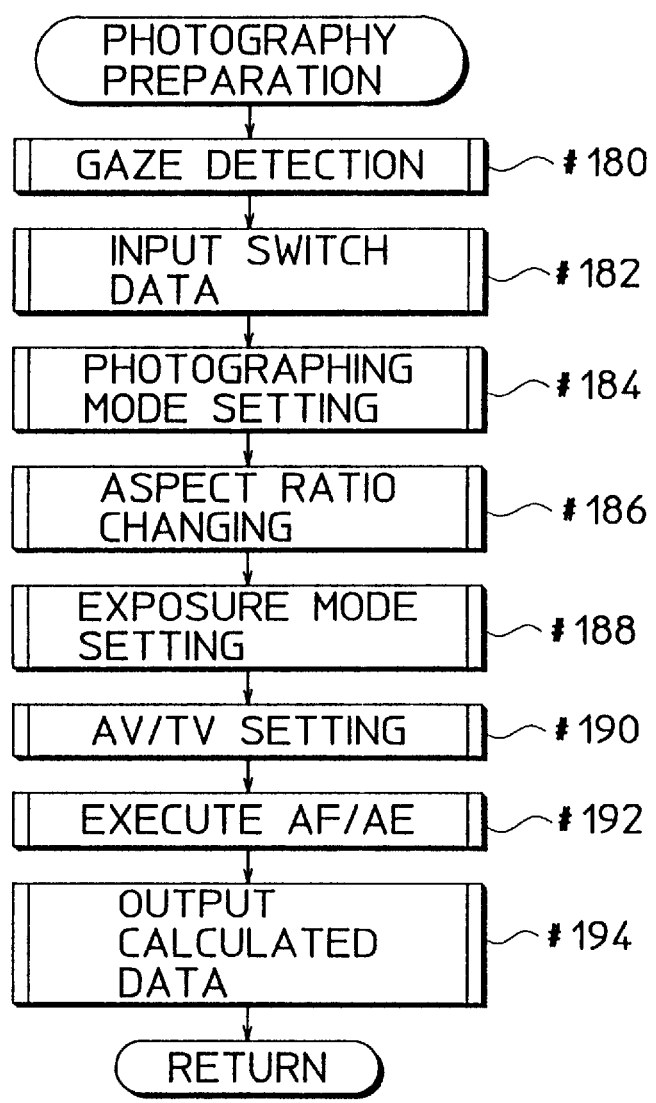
FIG. 29 is a flowchart showing a subroutine "Photography Preparation"

This subroutine is shown in FIG. 29.

First, the gaze detection is made in Step #180 to detect the area for performing the light measurement and the focus condition detection. Subsequently, the switch data used to select various controls are input (Step #182). The photographing mode, the aspect mode, the exposure mode, the aperture value AV and the shutter speed TV are set based on the switch data (Steps #184 to #190). The AF and the AE operations (including the exposure calculation) are carried out in accordance with the selected area, the switch data and the set control values (Step #192). This subroutine returns after the calculated data are output (Step #194).

Figure 30:
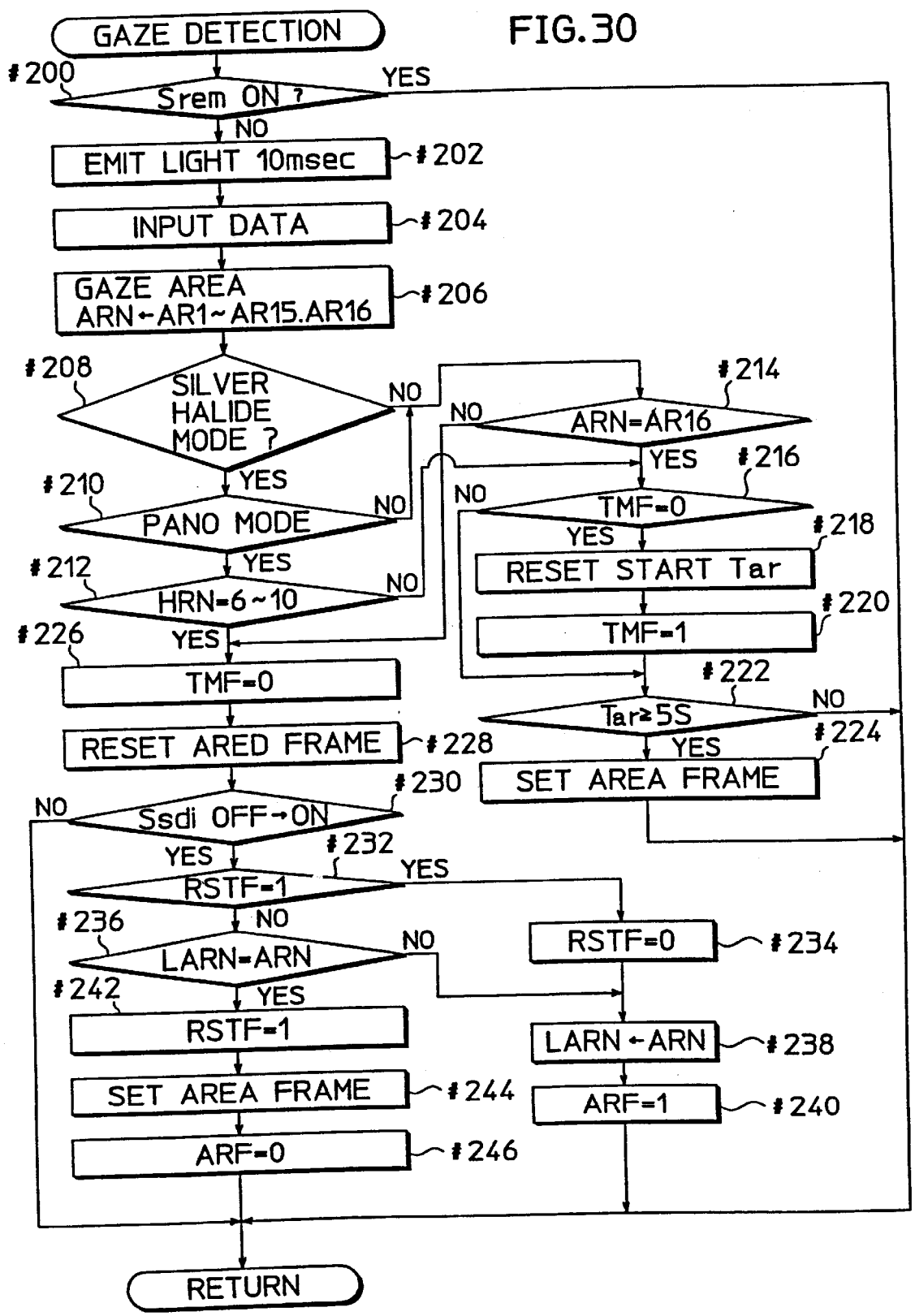
FIG. 30 is a flowchart showing a subroutine "Gaze Detection"

A subroutine "Gaze Detection" in Step #180 is described with reference to FIG. 30.

In the gaze detection, it is first discriminated whether the switch Srem of the transceiver TX is on (Step #200). If the switch Srem is on, i.e. the remote control is executed, this subroutine returns since the camera operator does not view through the viewfinder. In other words, since the image is displayed in the liquid crystal display R8, the function of the gaze detection is unnecessary in this case. If the switch Srem is off, this subroutine proceeds to Step #202 to conduct the gaze detection since the camera operator will view through the viewfinder so as to confirm an image displayed in the monitor 47.

The light emitter (infrared LED) in the gaze detecting circuit 2 is turned on for 10 msec. (Step #202) and the light reception data is read (Step #204) on the assumption that the emitted light is reflected by the eye of the camera operator viewing through the viewfinder 28 and is received by the infrared area sensor. The gaze area upon which the gaze of the camera operator falls is detected based on the light reception data and the detected gaze area is read as an area ARN (where N=1 to 16) (Step #206).

Subsequently, it is discriminated whether the silver-halide still image photographing mode is set (Step #208). If this mode is set, it is discriminated whether the set aspect mode is Pano-mode (Step #210). If the Pano-mode is set, it is discriminated whether the detected gaze area is one of the areas AR6 to AR10 (Step #212). If the silver-halide still image photographing mode is not set or the Pano-mode is not set although the silver-halide still image photographing mode is set, it is discriminated whether the detected gaze area is AR16 (Step #214). If the detected gaze area is not one of the areas AR6 to AR10 or the detected gaze area is AR16, this subroutine proceeds to Step #216 upon judgment that no gaze area has been detected. In Step #216, it is discriminated whether a timer flag TMF indicative of the setting of a timer Tar for measuring this period is set. If the timer flag TMF is not set, this flag is set (Step #220) after the timer Tar is reset and started (Step #218). If the timer flag TMF is set (YES in Step #216), this subroutine proceeds directly to Step #222 so as not to interrupt the time measuring operation of the timer Tar. In Step #222, it is discriminated whether 5 seconds have elapsed following the start of the timer Tar. This subroutine returns unless 5 seconds have elapsed (NO in Step #222). Upon the lapse of 5 seconds (YES in Step #222), a data for displaying the gaze detection area frame 19 is set (Step #224) and this subroutine returns.

On the other hand, if the detected gaze area is one of the areas AR6 to AR10 (YES in Step #212), or the detected gaze area is AR16 (NO in Step #214), the timer flag TMF is reset (Step #226) and the data for displaying the gaze detection area frame 19 is reset (Step #228). In this way, the light measurement, the AF and the flash light adjustment in conformity with the set silver-halide still image photographing mode can be performed.

In Step #230, it is discriminated whether the state of the switch Ssdi for setting or resetting the area ARN upon which the gaze falls has been changed from OFF to ON. If the discrimination result is in the negative, this subroutine returns. If the discrimination result in Step #230 is in the affirmative, it is discriminated whether an area reset flag RSTF is set (Step #232). If the area reset flag RSTF is set, this flag is reset (Step #234); the presently detected area ARN is set as a designated area LARN (Step #238); and an area flag ARF indicative of the gaze area setting is set (Step #240). Then, this subroutine returns.

On the other hand, if the area reset flag RSTF is not set in Step #232, it is discriminated whether the designated area LARN is the presently detected area ARN (Step #236). If LARN=ARN, it is judged that the switch Ssdi has been operated to cancel the designated area LARN and the area reset flag RSTF is set (Step #242). Subsequently, the data for displaying the gaze detection area frame 19, which is displayed when the power supply is turned on, is set (Step #244) and the area flag ARF is reset in Step #246 since the gaze area is reset. Then, this subroutine returns. If LARN≠ARM (NO in Step #236), the operations in Steps #238 and #240 are executed on the assumption that the switch Ssdi has been operated to set the gaze area and this subroutine returns.

Figure 31:
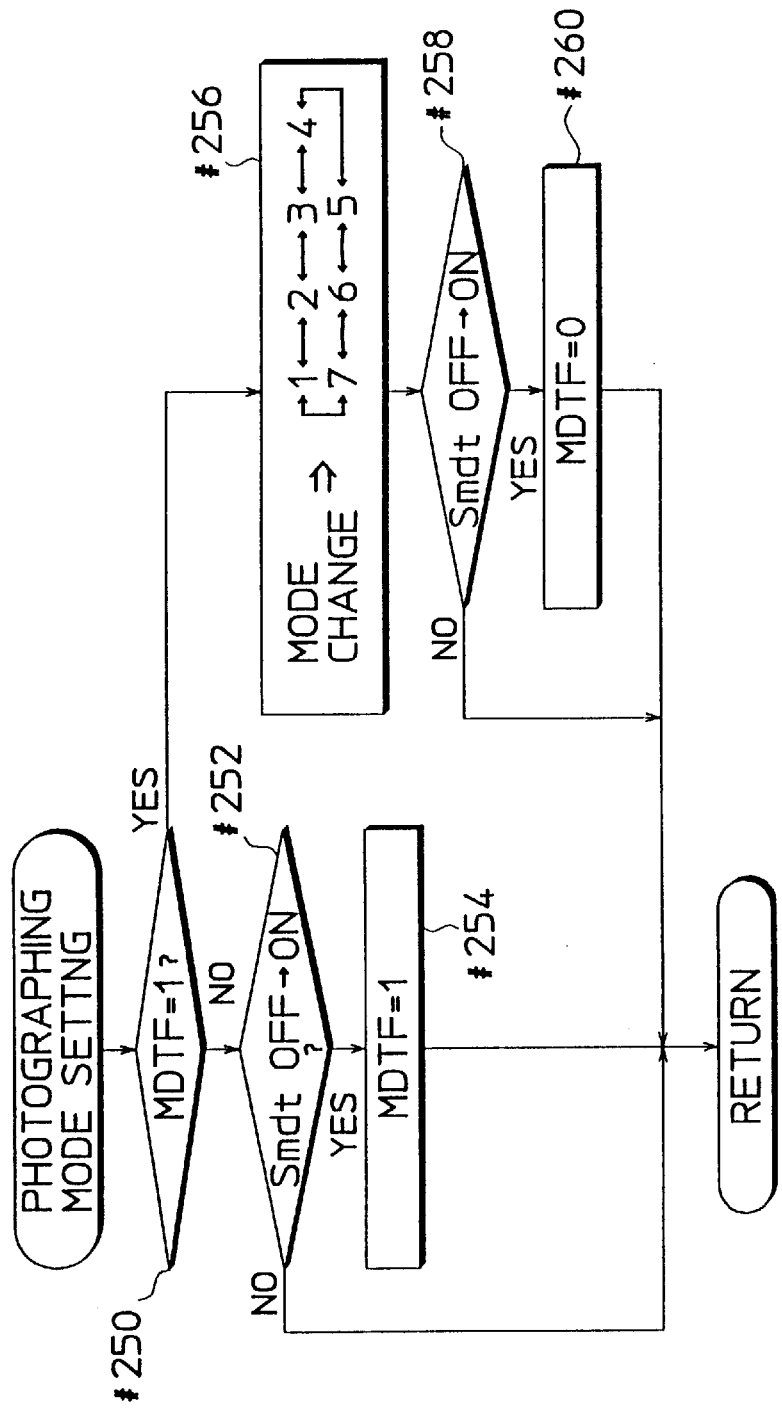
FIG. 31 is a flowchart showing a subroutine "Photographing Mode Setting"
Figure 32:
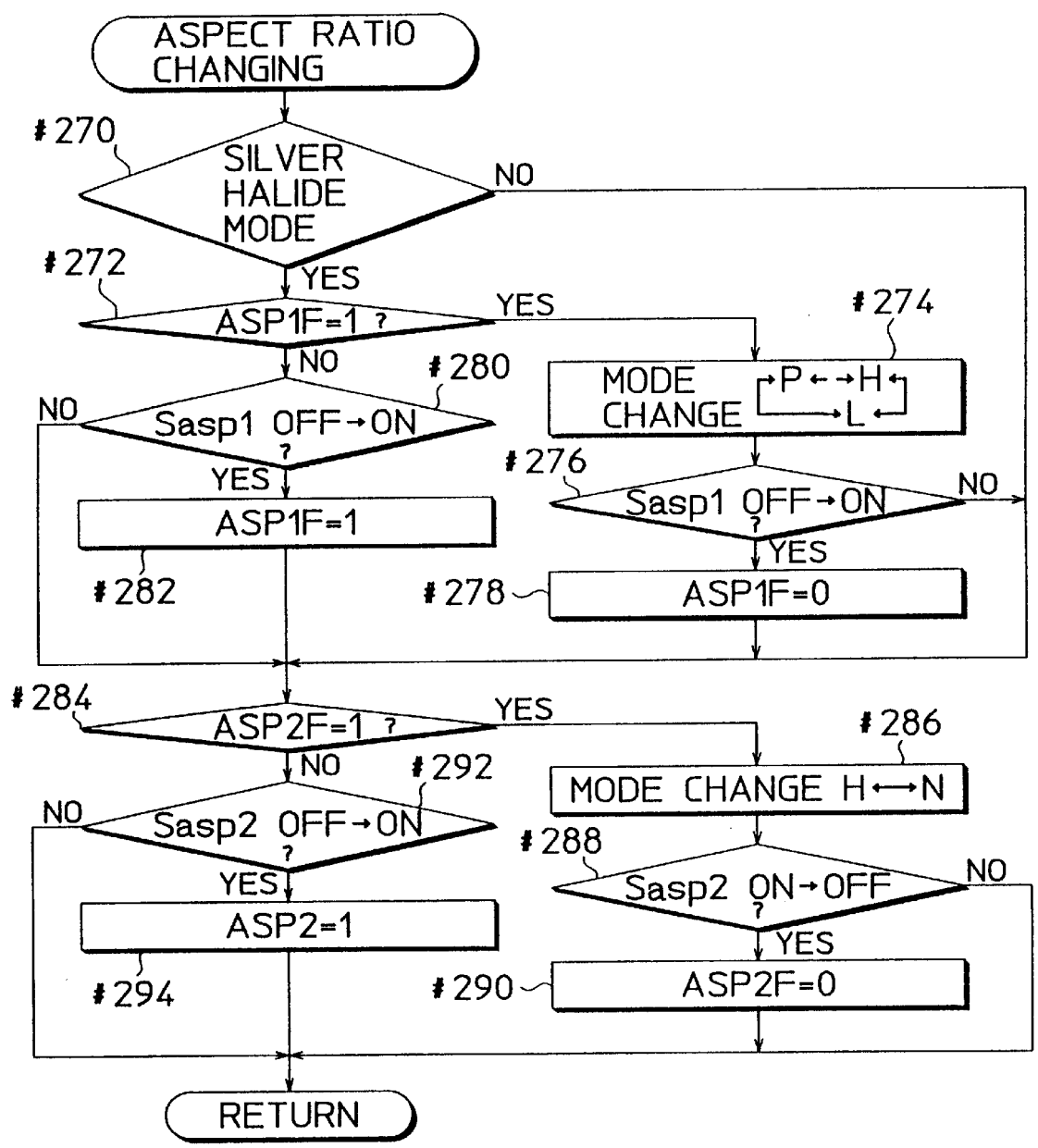
FIG. 32 is a flowchart showing a subroutine "Aspect Ratio Changing"
Figure 33:
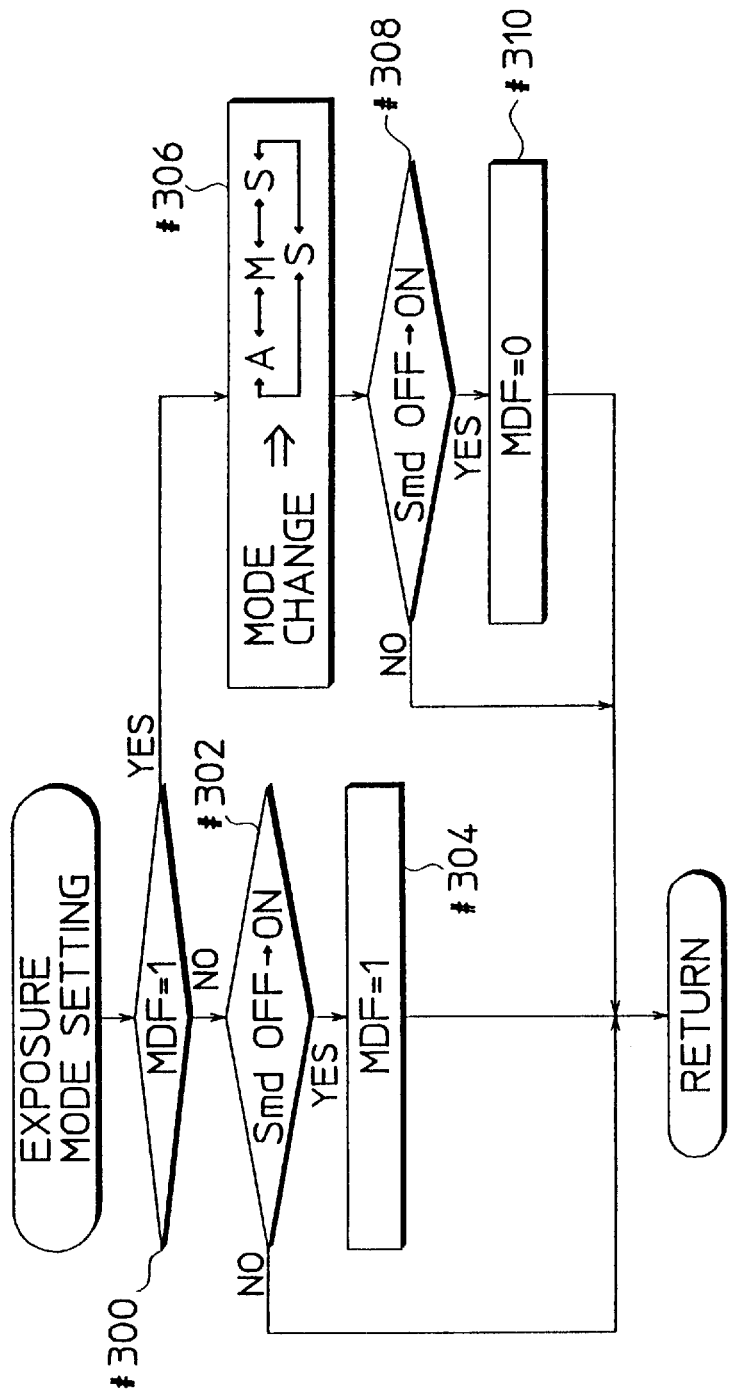
FIG. 33 is a flowchart showing a subroutine "Exposure Mode Setting"
Figure 34:
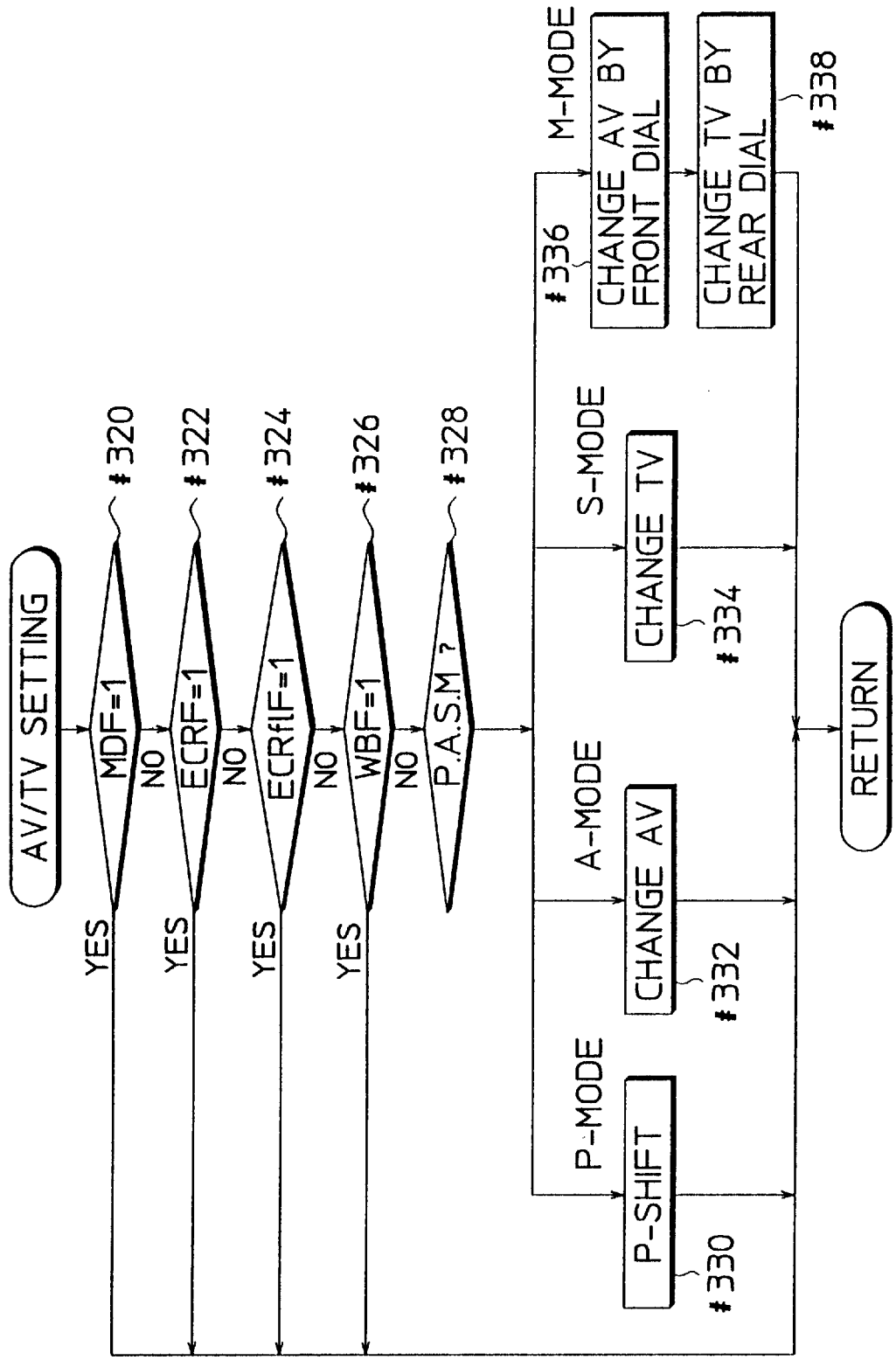
FIG. 34 is a flowchart showing a subroutine "AV/TV Setting"
Figure 35:
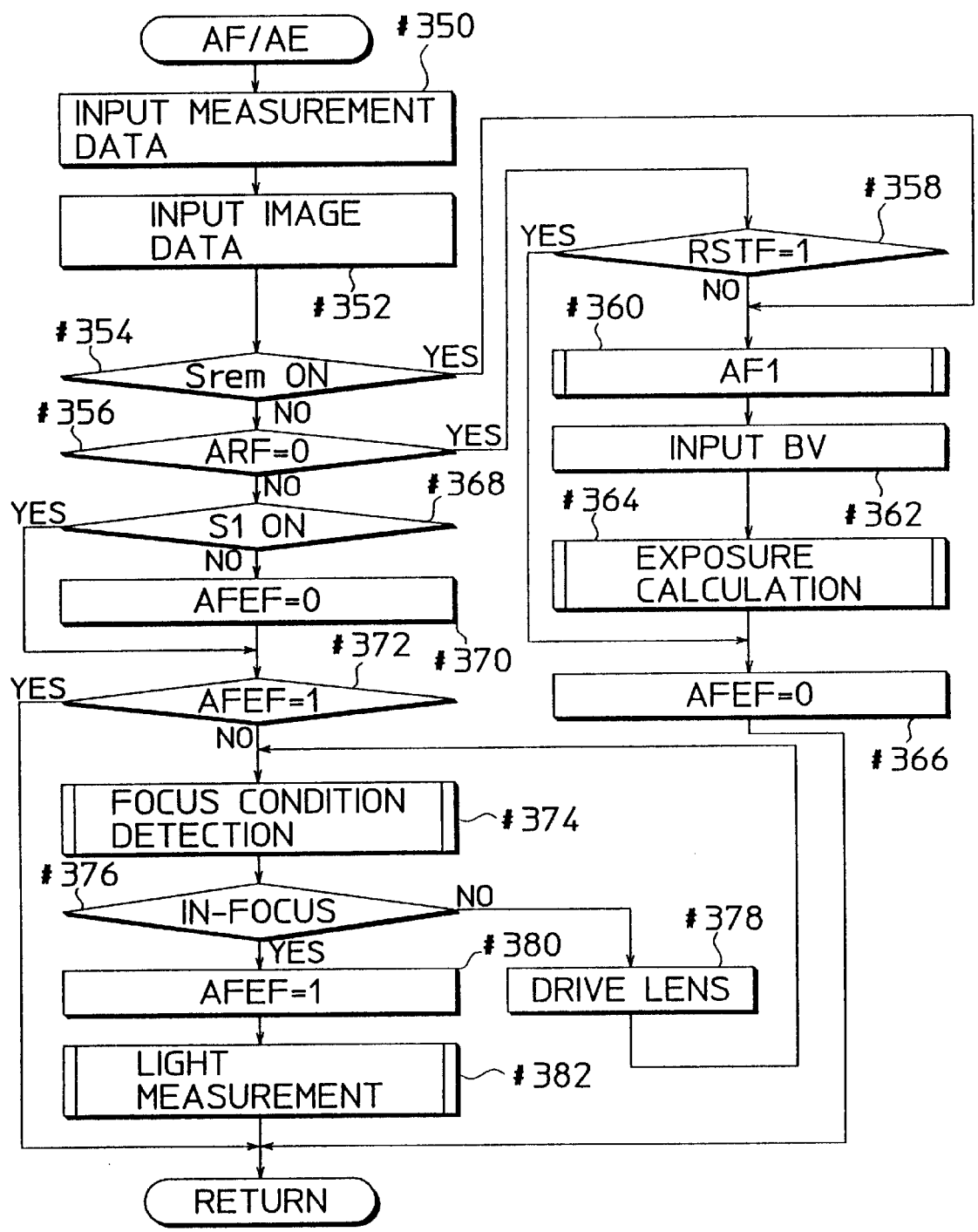
FIG. 35 is a flowchart showing a subroutine "AF/AE"

Subsequently, a subroutine "Photographing Mode Setting" in Step #184 is described with reference to FIG. 31.

First, it is discriminated whether a flag MDTF indicative of the photographing mode setting is set (Step #250). If this flag is not set, it is discriminated whether the photographing mode changeover switch Smdt has been switched to ON (Step #252). If the discrimination result is in the affirmative, this subroutine returns after flag MDTF is set on the assumption that the photographing mode has been set (Step #254). If the discrimination result is in the negative, this subroutine directly returns. If the flag MDTF is set in Step #250, the photographing mode is cyclically changed from 1 to 7 according to the rotation of the front or rear control dial 33 or 34 (Step #256).

TABLE 2 shows whether the motion image photographing, electronic still image photographing, and the silver-halide still image photographing are possible in the respective photographing modes 1 to 7.

TABLE 2

|   | MOTION IMAGE | ELECTRONIC STILL | SILVER-HALIDE STILL |
| --- | --- | --- | --- |
| 1 | ○ | X | X |
| 2 | X | ○ | X |
| 3 | X | X | ○ |
| 4 | ○ | ○ | X |
| 5 | ○ | X | ○ |
| 6 | X | ○ | ○ |
| 7 | ○ | ○ | ○ |

(○: Possible, X: Impossible)

When the photographing mode changeover switch Smdt has been switched to ON (Step #258), the flag MDTF is reset (Step #260) on the assumption that the camera exited the photographing mode setting mode and this subroutine returns. If the discrimination result in Step #258 is in the negative, this subroutine directly returns.

Subroutines "Aspect Ratio Changing", "Exposure Mode Setting", "AV/TV Setting" and "AF/AE" are described with reference to FIGS. 32, 33, 34 and 35, respectively.

In the subroutine "Aspect Ratio Changing", it is first discriminated whether the silver-halide still image photographing mode is set (Step #270). If this mode is not set, this subroutine proceeds to Step #284. If this mode is set, it is discriminated whether a flag ASP1F is set (Step #272). The flag ASP1F indicates that the aspect mode is to be changed in the silver-halide still image photographing mode. If this flag ASP1F is set, the aspect mode is cyclically changed in the order of P-mode, H-mode, and L-mode according to the rotation of the front or rear control dial 33 or 34 (Step #274). It is then discriminated whether a switch Sasp1 which is operated to change the mode has been switched to ON (Step #276). If the switch Sasp1 has been switched to ON, the flag ASP1F is reset (Step #278) upon judgment that the camera is to exit from this mode changing routine and this subroutine proceeds to Step #284. Unless the switch Sasp1 has been switched to ON, this subroutine directly proceeds to Step #284. If the flag ASP1F is not set in Step #272, it is discriminated whether the switch Sasp1 has been switched to ON (Step #280). If the switch Sasp1 has been switched to ON, the flag ASP1F is set (Step #282) upon judgment that the aspect mode is to be changed and this subroutine proceeds to Step #284. This subroutine directly proceeds to Step #284 unless the switch Sasp1 has been switched to ON.

In Step #284, it is discriminated whether a flag ASP2F is set. The flag ASP2F indicates that the aspect mode is to be changed in the electronic still image photographing mode or motion image photographing mode. If this flag ASP2F is set, the aspect mode is alternately changed between H-mode and N-mode according to the rotation of the front or rear control dial 33 or 34 (Step #286). It is then discriminated whether a switch Sasp2 which is operated to change the aspect mode has been switched to ON (Step #288). If the switch Sasp2 has been switched to ON, the flag ASP2F is reset (Step #290) upon judgment that the camera is to exit from this mode changing routine and this subroutine returns. Unless the switch Sasp1 has been switched to ON, this subroutine directly returns. If the flag ASP2F is not set in Step #284, it is discriminated whether the switch Sasp2 has been switched to ON (Step #292). If the switch Sasp2 has been switched to ON, the flag ASP2F is set (Step #294) upon judgment that the aspect mode is to be changed and this subroutine returns. This subroutine directly returns unless the switch Sasp2 has been switched to ON.

In the subroutine "Exposure Mode Setting", it is first discriminated whether the flag MDF indicative of the setting of the exposure mode is set (Step #300). If the flag MDF is not set, it is discriminated whether the exposure mode changeover switch Smd has been switched to ON (Step #302). If the switch Smd has been switched to ON, (YES in Step #302) the flag MDF is set (Step #304) on the assumption that the camera has entered the exposure mode setting mode. If the discrimination result in Step #302 is in the negative, this subroutine directly returns. If the flag MDF is set (YES in Step #300), the exposure mode is cyclically changed in the order of A-mode, M-mode, S-mode and P-mode according to the rotation of the front or rear control dial 33 or 34 (Step #306). It is then discriminated whether the exposure mode changeover switch Smd has been switched to ON (Step #308). If the switch Smd has been switched to ON, the flag MDF is reset (Step #310) on the assumption that the operation has been performed to leave this setting mode. If the discrimination result in Step #308 is in the negative, this subroutine directly returns.

In the subroutine "AV/TV Setting", it is discriminated whether the flag MDF, a flag ECRF which indicates that the exposure correction is to be conducted under the ambient light, a flag ECRf1F which indicates that the exposure correction is to be conducted with the assist of the flash light, and a flag WBF which indicates that the white balance correction is to be conducted are set (Steps #320 to #326). If any of these flags is set, this subroutine returns on the assumption that the camera is in the corresponding mode. If none of these flags is set, the presently set exposure mode is detected (Step #328). If the set exposure mode is P-mode, such a control is executed that the shutter speed TV changes in inverse proportion to the aperture value, i.e., a so-called Program Shift control is carried out (Step #330). If the presently set exposure mode is A-mode, the aperture value AV is changed (Step #332). If the presently set exposure mode is S-mode, the shutter speed TV is changed (Step #334). If the presently set exposure mode is M-mode, the aperture value AV is changed according to the rotation of the front control dial 33 and the shutter speed TV is changed according to the rotation of the rear control dial 34 (Steps #336 and #338). Thereafter, this subroutine returns.

In the subroutine "AF/AE", the light measurement data is first input (Step #350) and the green data (G-data) of the color image data of R, G and B is input from the microcomputer 100 (Step #352). It is then discriminated whether the switch Srem of the transceiver TX is on (Step #354). If the switch Srem is on, the provisional focus condition detection AF1 is performed (Step #360) since the gaze detection is not necessary as described above; the light measurement value BV is read (Step #362); and the exposure calculation is performed (Step #364). If the switch Srem is off, it is discriminated whether the area flag ARF is not set in response to the operation of the switch Ssdi (gaze area setting switch 30) (Step #356).

If the area flag ARF is not set (YES in Step #356), it is discriminated whether the area reset flag RSTF is set (Step #358). If the area reset flag RSTF is set (YES in Step #358), this subroutine proceeds to Step #366 skipping Steps #360 to #364 to lock the AF and AE operations until the gaze area AR is set in the next run. This is because it cannot be decided to which area ARN the AF and AE operations are applied when the area reset flag RSTF is set. In Step #366, an in-focus flag AFEF indicative of the attainment of the in-focus condition is reset and this subroutine returns. If the area reset flag RSTF is not set (NO in Step #358), it means that the gaze area AR has never been set after the power supply is turned on. In this case, it is thought to be better not to lock the AF and AE operations so that the AF and AE operations can be carried out anytime to various objects. Accordingly, the provisional focus condition detection AF1 is carried out repeatedly (continuous AF); the light measurement value BV is read each time the detection AF1 is made; and the exposure calculation is conducted (Steps #360 to #364). Thereafter, the in-focus flag AFEF is reset in Step #366 and this subroutine returns.

On the other hand, if the area flag ARF is set (NO in Step #356), it is discriminated whether the switch S1 is on (Step #368). If the switch S1 is off, the flag AFEF is reset to set the continuous AF mode on the assumption that the photographing is carried out while viewing through the viewfinder 28 or in the recorded image photographing mode (Step #370). If the switch S1 is on, this subroutine directly proceeds to Step #372.

In Step #372, it is discriminated whether the in-focus flag AFEF is set. If the in-focus flag AFEF is set, i.e. the in-focus condition has been already attained (YES in Step #372), this subroutine returns without carrying out the focus condition detection again (single AF). If the infocus flag AFEF is not set (NO in Step #372), the focus condition is detected (Step #374) and it is discriminated whether the in-focus condition has been already attained based on the detected focus condition (Step #376). If the in-focus condition has not been already attained, the taking lens 211 is driven, by a focus lens driving circuit LEM I designated by reference number 7 in FIG. 1, based on the detected focus condition (Step #378) and this subroutine returns to Step #374. Upon attainment of the in-focus condition (YES in Step #376), the in-focus flag AFEF is set (Step #380); the light measurement is conducted (Step #382); and this subroutine returns.

Figure 36:
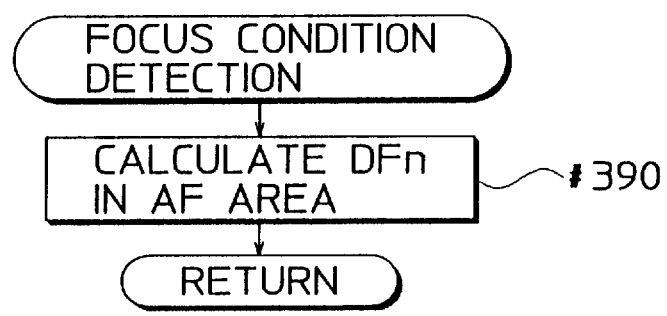
FIG. 36 is a flowchart showing a subroutine "Focus"Condition Detection"
Figure 37:
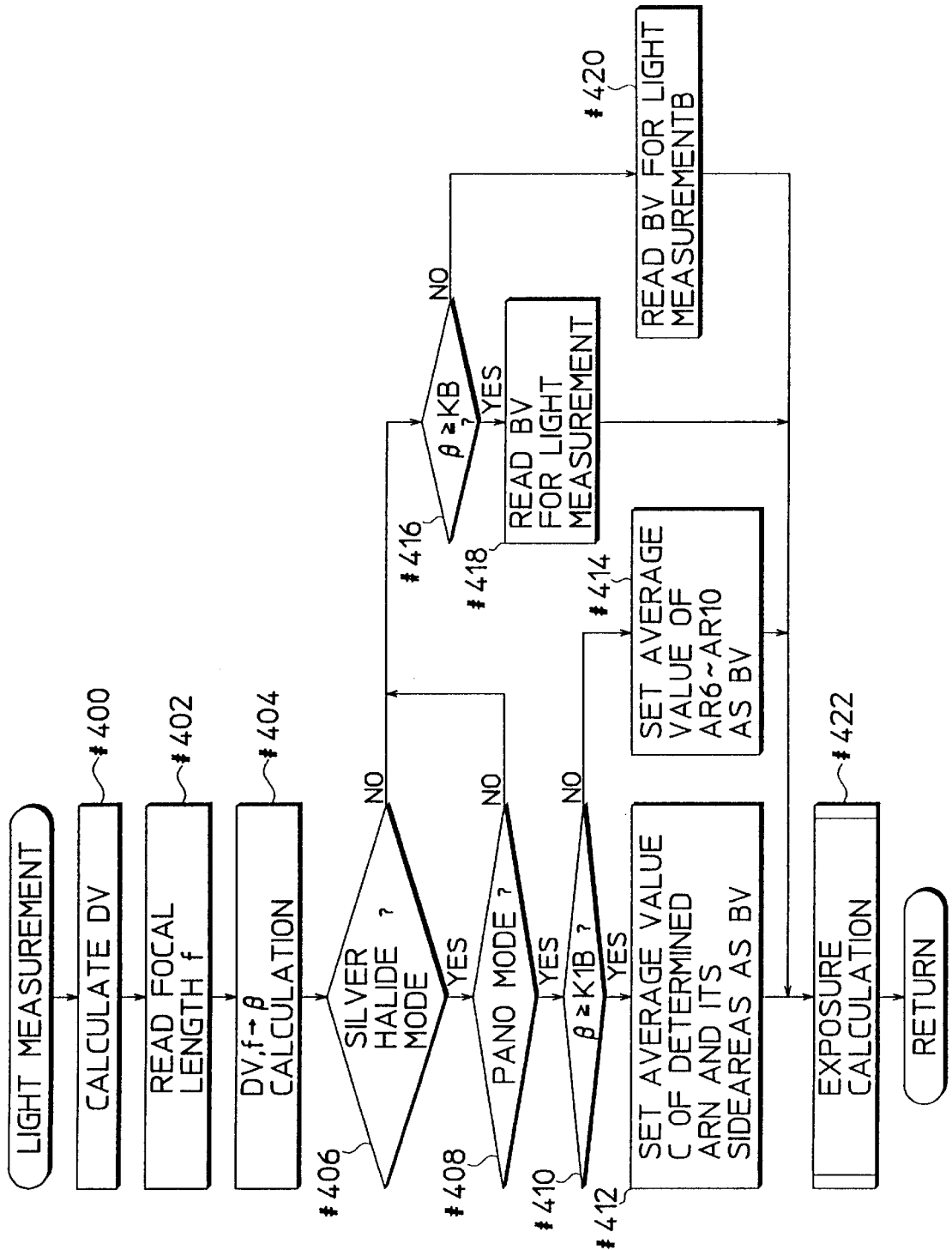
FIG. 37 is a flowchart showing a subroutine "Light Measurement"

Subroutines "Focus Condition Detection" and "Light Measurement" are described with reference to FIGS. 36 and 37, respectively.

In the subroutine "Focus Condition Detection," a defocus amount DFn in the area AF corresponding to the set gaze area ARN is first calculated (Step #390) and this subroutine returns.

Next, the subroutine "Light Measurement" is described. TABLE 3 below shows the relationship between the detected gaze area and the light measurement data.

TABLE 3

| GAZE AREA | LIGHT MEASUREMENT B | LIGHT MEASUREMENT A |
|---|---|---|
| AR1 | MEAN OF AR1, AR2, AR6, AR7 | AR1 |
| AR2 TO AR4 | MEAN OF AR(N − 1) TO AR(N + 1), AR(N + 4) TO AR(N + 6) | AR(N) |
| AR5 | MEAN OF AR4, AR5, AR9, AR10 | AR4 |
| AR6 | MEAN OF AR1, AR2, AR6, AR7, AR11, AR12 | AR6 |
| AR7 TO AR9 | MEAN OF AR(N − 6) TO AR(N − 4), AR(N − 1) TO AR(N + 1), AR(N + 4) TO AR(N + 6) | AR(N) |
| AR10 | MEAN OF AR4, AR5, AR9, AR10, AR14, AR15 | AR10 |
| AR11 | MEAN OF AR6, AR7, AR11, AR12 | AR11 |
| AR12 TO AR14 | MEAN OF AR(N − 6) TO AR(N − 4), AR(N − 1) TO AR(N + 1) | AR(N) |
| AR15 | MEAN OF AR9, AR10, AR14, AR15 | AR15 |

The light measurement B is conducted when $\beta$ (image magnification)<Kb (specified value) and the value thereof is a mean of values obtained in the gaze areas specified in its column. The light measurement A is conducted when a $\beta \geq Kb$ and the value thereof is the value obtained in the gaze area specified in its column.

In the subroutine "Light Measurement," an object distance DV is first calculated based on the lens shift amount in Step #400 and a focal length f is read in Step #402. A image magnification $\beta$ is calculated based on the object distance DV and the focal length f in Step #404.

It is then discriminated whether the silver-halide still image photographing mode is set (Step #406). If this mode is set, it is discriminated whether the set aspect mode is Pano-mode (Step #408). If the Pano-mode is set, it is discriminated whether the image magnification $\beta$ is not smaller than a specified value K1B (Step #410). This value K1B is determined in consideration of a print magnification used when a print is made from the developed film. The value K1B is set such that the print magnification is about four times as large as the one used in the L-mode, and therefore it is smaller than an image magnification to be described later.

If $\beta \geq K1B$, an average value C of the light measurement values obtained in the three areas, namely the determined area ARN and its two opposite side areas is set as a light measurement value Bv (Step #412) and the exposure calculation is performed based on this value (Step #422). On the other hand, if $\beta < K1B$, an average value of the light measurement values obtained in the areas AR6 to AR10 is set as a light measurement value Bv (Step #414) and the exposure calculation is performed based on this value (Step #422).

If the silver-halide still image photographing mode is not set or if the Pano-mode is not set although the silver-halide still image photographing mode is set, it is discriminated whether the obtained magnification $\beta$ is not smaller than a specified value Kb (Step #416). If $\beta \geq Kb$, the light measurement data corresponding to the gaze area specified for the light measurement A in TABLE 3 is read from the CCD/monitor/recorder unit 10 (Step #418), and the exposure calculation is performed based on the data (Step #422).

Conversely, if β<Kb (NO in Step #416), the light measurement data corresponding to the gaze areas specified for the light measurement B in TABLE 3 are read from the CCD/monitor unit 10 (Step #420), and the exposure calculation is performed based on the data (Step #422).

In this way, an entire object such as a landscape can be suitably photographed by averaging the light measurement data corresponding to a plurality of gaze areas when the image magnification β is small.

Referring back to FIG. 25, it is discriminated whether the switch S1 is on after the photography preparation has been carried out (Step #82). If the switch S1 is on, a subroutine "S1 ON" is executed (Step #84) and it is further discriminated whether the grip switch Sg is on (Step #86). If the grip switch Sg is off, this subroutine proceeds to Step #66 (Step #88). In Step #66, the flag SGRF is reset to exit the subroutine "Eye Detection". If the switch S1 is off (NO in Step #82), it is discriminated whether the switch Srec for starting the recording of the motion images is on (Step #90). If the switch Srec is on, a subroutine "Recording" is executed to record the images (Step #92). If the switch Srec is off, a subroutine "Reproduction" is carried out (Step #94).

Figure 38:
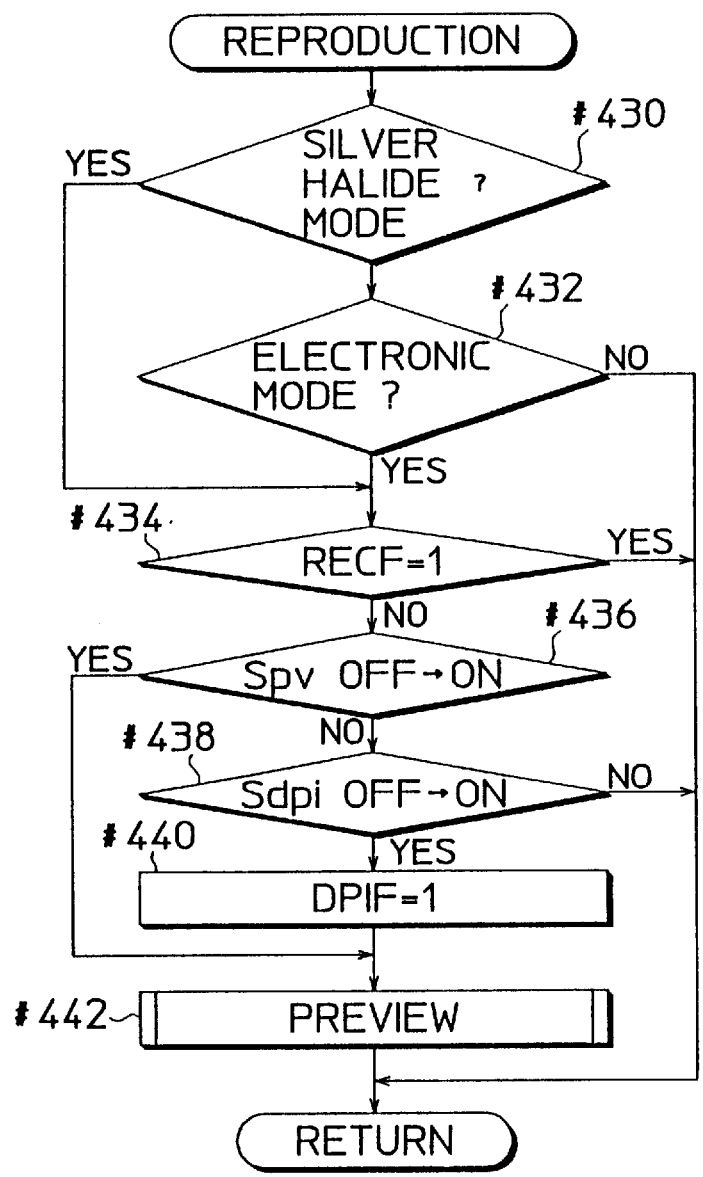
FIG. 38 is a flowchart showing a subroutine "Reproduction"

The subroutine "Reproduction" is described with reference to FIG. 38.

It is first discriminated whether either the silver-halide still image photographing mode or the electronic still image photographing mode is set (Steps #430 and #432). If neither of them is set (NO in Steps #430 and #432), this subroutine returns after prohibiting a control for the preview (pre-operation) and post-operation confirmation. If either of the above two modes is set, this subroutine proceeds to Step #434 to execute a control for the preview and the post-operation. In Step #434, it is discriminated whether a flag RECF is set. If this flag is set, i.e., the images are being recorded, this subroutine returns to prohibit the display of the preview images and confirmation images on the monitor 47. If the images are not being recorded, it is discriminated whether the switch Spv has been switched to ON (Step #436). If the discrimination result in Step #436 is in the affirmative, this subroutine returns after a subroutine "Preview" is carried out (Step #442). If the discrimination result in Step #436 is in the negative, it is discriminated whether the switch Sdpi has been switched ON to display the image stored in the internal memory 129 or the frame memory (Step #438). If the switch Sdpi has been switched ON, the flag DPIF is set (Step #440); the subroutine "Preview" is carried out (Step #442); and this subroutine returns. Unless the switch Sdpi has been switched ON, this subroutine directly returns.

Referring back to FIG. 25, it is discriminated whether the grip switch Sg is on (Step #86). If the grip switch Sg is off, this subroutine returns to Step #66 to reset the flag SGRF and exits the subroutine "Eye Detection". If the grip switch sg is on, this subroutine returns to Step #80.

Figure 39:
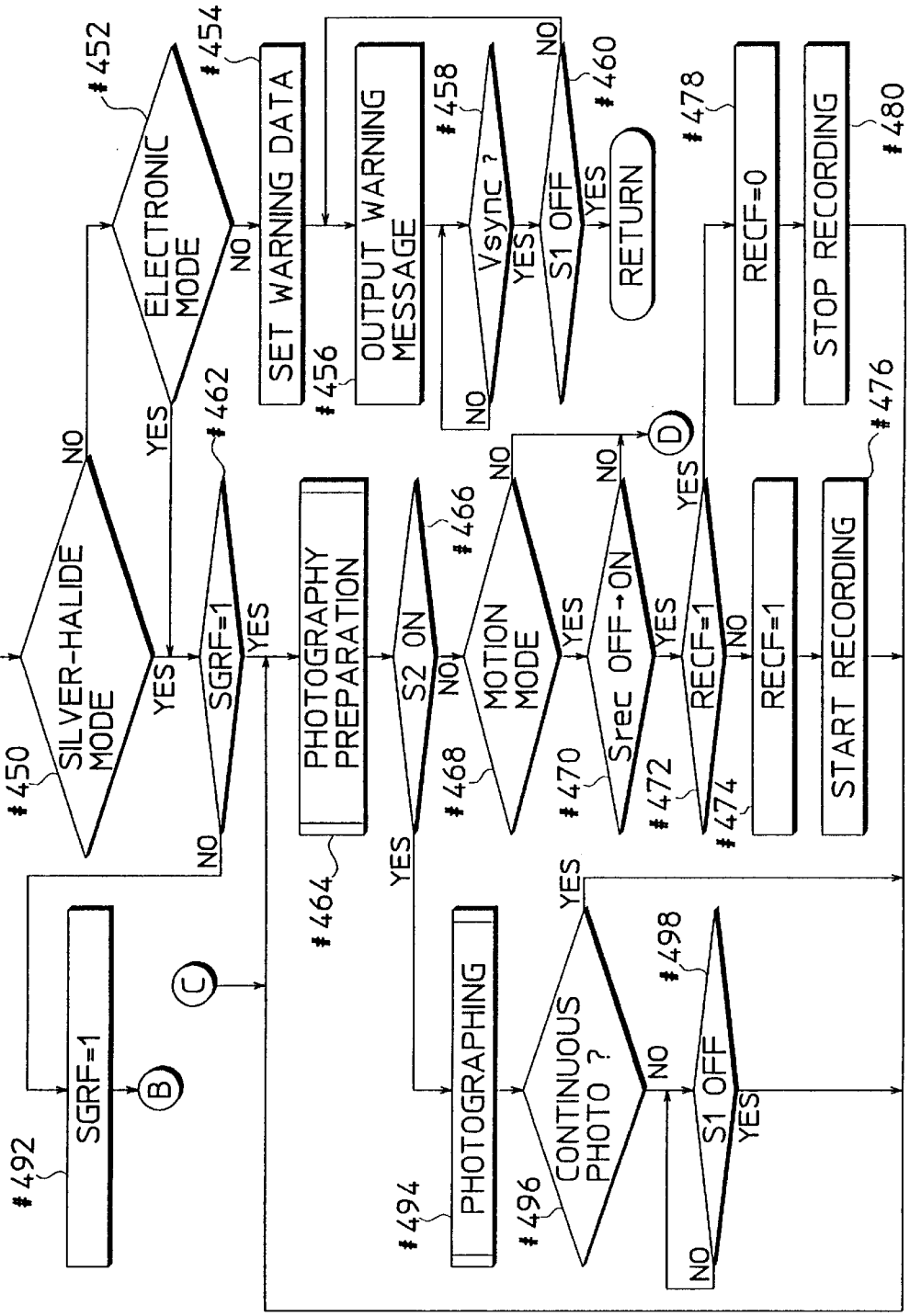
FIGS. 39 and 40 are parts of a flowchart showing a subroutine "S1 ON"
Figure 40:
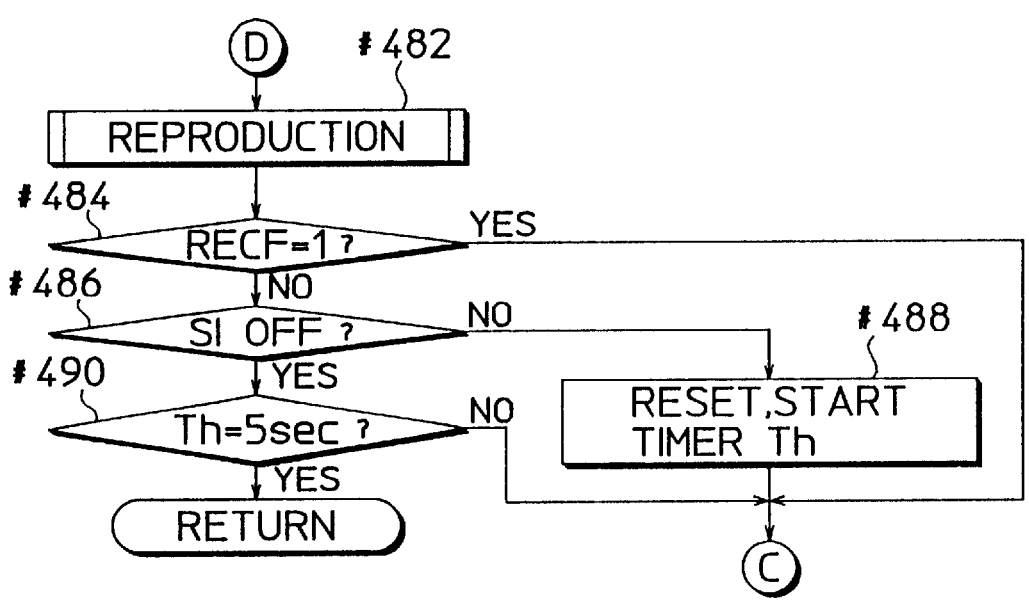

The subroutine "S1 ON" is described with reference to FIGS. 39 and 40.

When the switch S1 is turned on, it is first discriminated whether either the silver-halide still image photographing mode or the electronic still image photographing mode is set (Steps #450 and #452). If neither of them is set (NO in Steps #450 and #452), a warning data is set (Step #454) and output to display a warning message (Step #456). It is waited until a vertical synchronization signal Vsync is input (Step #458). Upon receipt of this signal, it is discriminated whether the switch S1 is off (Step #460). This subroutine returns if the switch S1 is off while returning to Step #456 if the switch S1 is on.

If either one of the silver-halide and the electronic still image photographing modes is set (YES in Step #450 or #452), it is discriminated whether the flag SGRF indicative of eye detection is set (Step #462). If the flag SGRF is set, the photography preparation is conducted (Step #464). It is then discriminated whether the switch S2 is on (Step #466). If the switch S2 is off, it is discriminated whether the motion image photographing mode is set (Step #468). If this photographing mode is set, it is discriminated whether the switch Srec has been switched to ON (Step #470). If the discrimination result in Step #470 is in the affirmative, it is judged that an operation has been carried out to photograph the motion images and it is discriminated whether the flag RECF is set (Step #472). If the flag RECF is not set, it is set on the assumption that the switch Srec has been operated to start the recording (Step #474) and data for instructing the start of the recording is output to the CCD/monitor/recorder unit 10 (Step #476). Then, this subroutine returns to Step S464. If the flag RECF is set (YES in Step #472), the flag RECF is reset on the assumption that the switch Srec has been operated to stop the recording operation (Step #478) and a data for instructing the stop of the recording is output to the CCd/monitor/recorder unit 10 (Step #480). Then, this subroutine returns to Step S464.

If the motion image photographing mode is not set (NO in Step #468) or if the switch Srec has not been switched to ON (NO in Step #470), this subroutine proceeds to Step #482. The subroutine "Reproduction" is carried out in Step #482 and it is then discriminated based on the state of the flag RECF whether the images are being recorded (Step #484). If the images are being recorded, this subroutine returns to Step #464 and the recording is continued. Unless the images are being recorded, it is discriminated whether the switch S1 has been switched to OFF (Step #486). If the discrimination result is in the negative (NO in Step #486), a timer Th is reset and started (Step #488) and this subroutine returns to Step #464. If the switch S1 has been switched OFF (YES in Step #486), it is discriminated whether the timer Th has measured 5 seconds (Step #490). This subroutine returns to Step #464 until 5 seconds elapse, while returning upon lapse of 5 seconds. If the eye flag SGRF is not set in Step #462, this subroutine proceeds to Step #68 (see FIG. 25) after setting this flag (Step #492).

If the switch S2 is on (YES in Step #466), a subroutine "Photographing" is carried out (Step #494).

Figure 41:
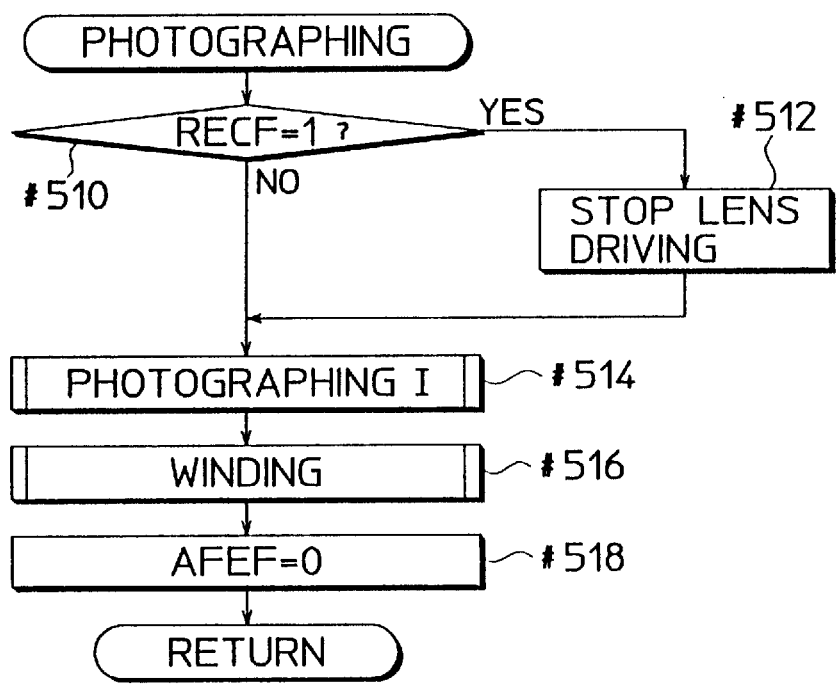
FIG. 41 is a flowchart showing a subroutine "Photographing"

The subroutine "Photographing" is described with reference to FIG. 41.

It is first discriminated based on the flag RECF whether the images are being recorded (Step #510). If the images are being recorded, the driving of the lens is stopped if the silver-halide still image photographing mode or the electronic still image photographing mode is set (Step #512). Unless the images are being recorded, this subroutine proceeds to Step #514. In Step #514, a control (photographing I) necessary for the photographing is executed. The film is wound (Step #516). The flag AFEF indicating that the in-focus condition has been attained is reset (Step #518) and this subroutine returns.

Figure 42:
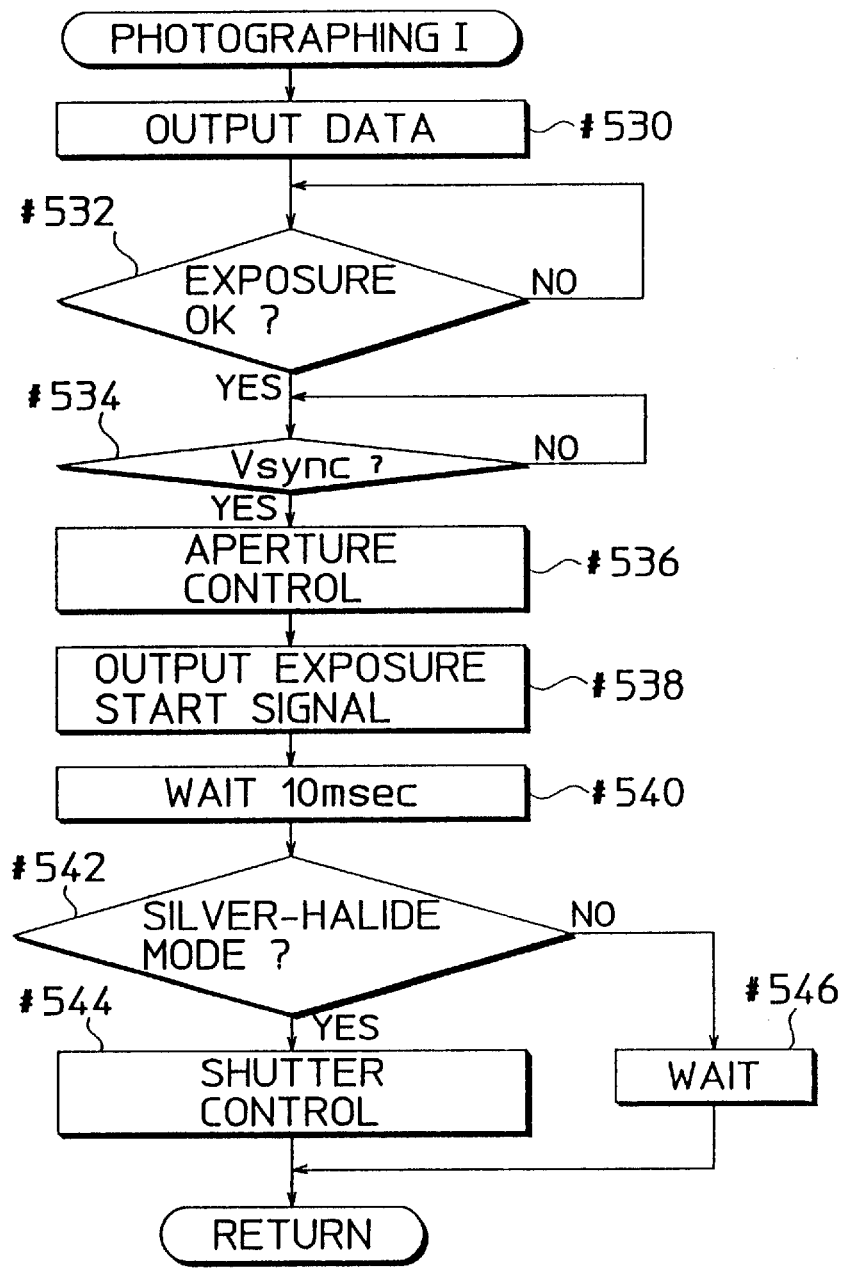
FIG. 42 is a flowchart showing a subroutine "Photographing I"

The subroutine "Photographing I" is described with reference to FIG. 42.

A data representing that the switch S2 is on is output to the CCD/monitor/recorder unit 10 (data output) in Step #530. This subroutine waits for an exposure OK signal from the unit 10 (Step #532). Upon receipt of this signal, this subroutine waits for the vertical synchronization signal Vsync (Step #534). Upon receipt of the signal Vsync, an aperture control in conformity with the required aperture value is executed (Step #536). Subsequently, an exposure start signal is output to the unit 10 (Step #538) and this subroutine waits for 10 msec until the aperture is stably set (Step #540). It is then discriminated whether the silver-halide still image photographing mode is set (Step #542). If this mode is set (YES in Step #542), an exposure control, i.e., a shutter control, is carried out is controlled (Step #544). If the silver-halide still image photographing mode is not set, the shutter control is unnecessary and therefore this subroutine waits so that the diaphragm is not driven during the exposure control by the CCD 43 (Step #546). The aperture control and the shutter control are designated by reference numbers 4a and 4b, respectively, and collectively by reference number 4 in FIG. 1.

Figure 43:
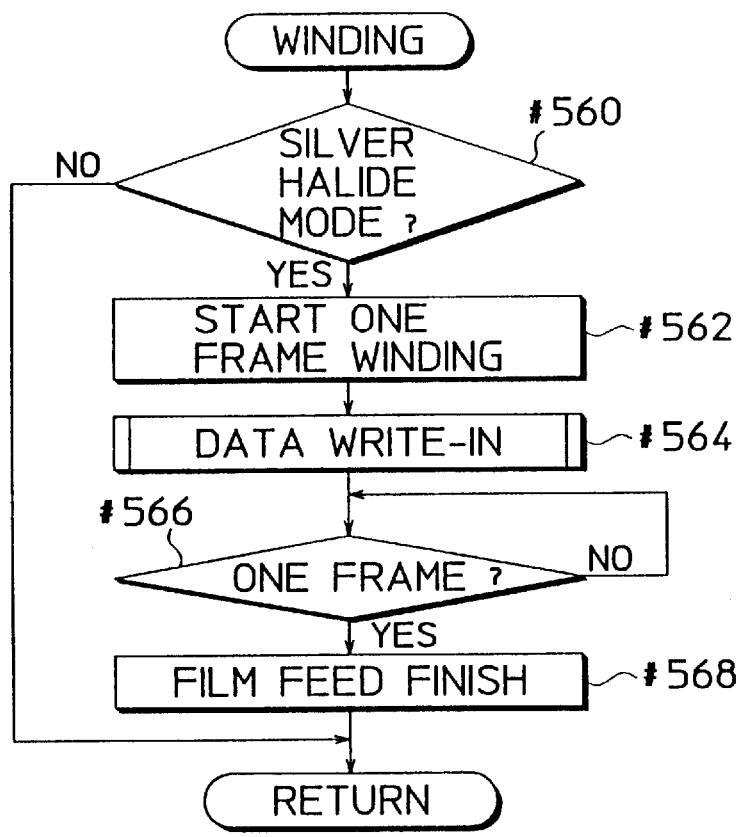
FIG. 43 is a flowchart showing a subroutine "Winding"

The subroutine "Winding" carried out after the exposure is described with reference to FIG. 43.

First, it is discriminated whether the silver-halide still image photographing mode is set (Step #560). If this mode is not set, this subroutine returns because it is not necessary to wind the film and to set the shutter to its initial position. If this mode is set, the winding of one frame of the film 45 is started (Step #562) and, during the winding, the necessary data are written in the magnetic recording portion 453 at a specified timing as described with reference to FIG. 5 (Step #564). Upon completion of the winding of one frame (YES in Step #566), the feeding of the film is finished (Step #568) and this subroutine returns.

Figure 44:
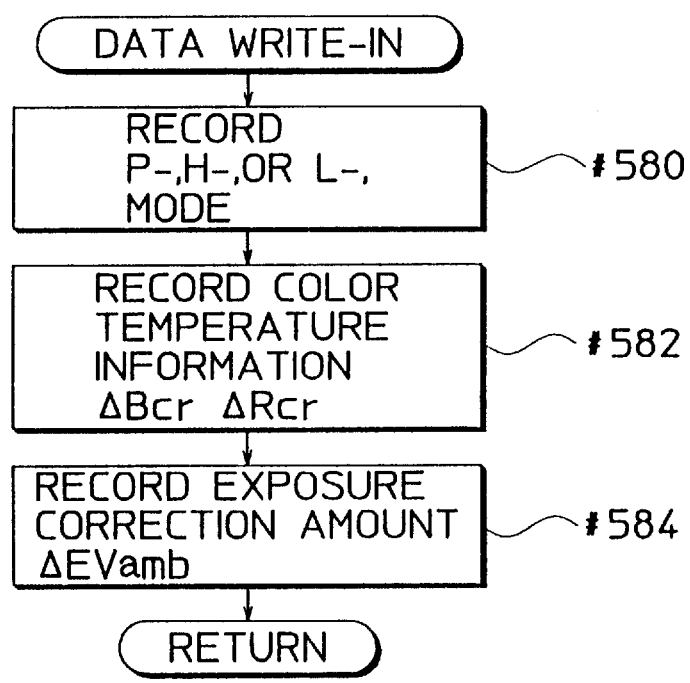
FIG. 44 is a flowchart showing a subroutine "Data Write-In"

A subroutine "Data Write-In" is described with reference to FIG. 44.

First, the selected aspect mode, i.e., one of the P-mode, H-mode, and L-mode, is recorded (Step #580). Subsequently, the color temperature information ΔBcr, ΔRcr and the exposure correction amount ΔEVamb are recorded (Steps #582 and #584) and this subroutine returns.

Referring back to FIG. 39, it is discriminated whether the continuous photographing is being carried out (Step #496). If the continuous photographing is being carried out, this subroutine returns to Step #464. This makes the motion images visible to the camera operator by obtaining new data for the integration by the CCD 43 and the AF and AE operations. On the other hand, unless the continuous photographing is being carried out (NO in Step #496), this subroutine waits until the switch S1 is turned off (Step #498). This subroutine returns to Step #464 when the switch S1 is turned off.

Figure 45:
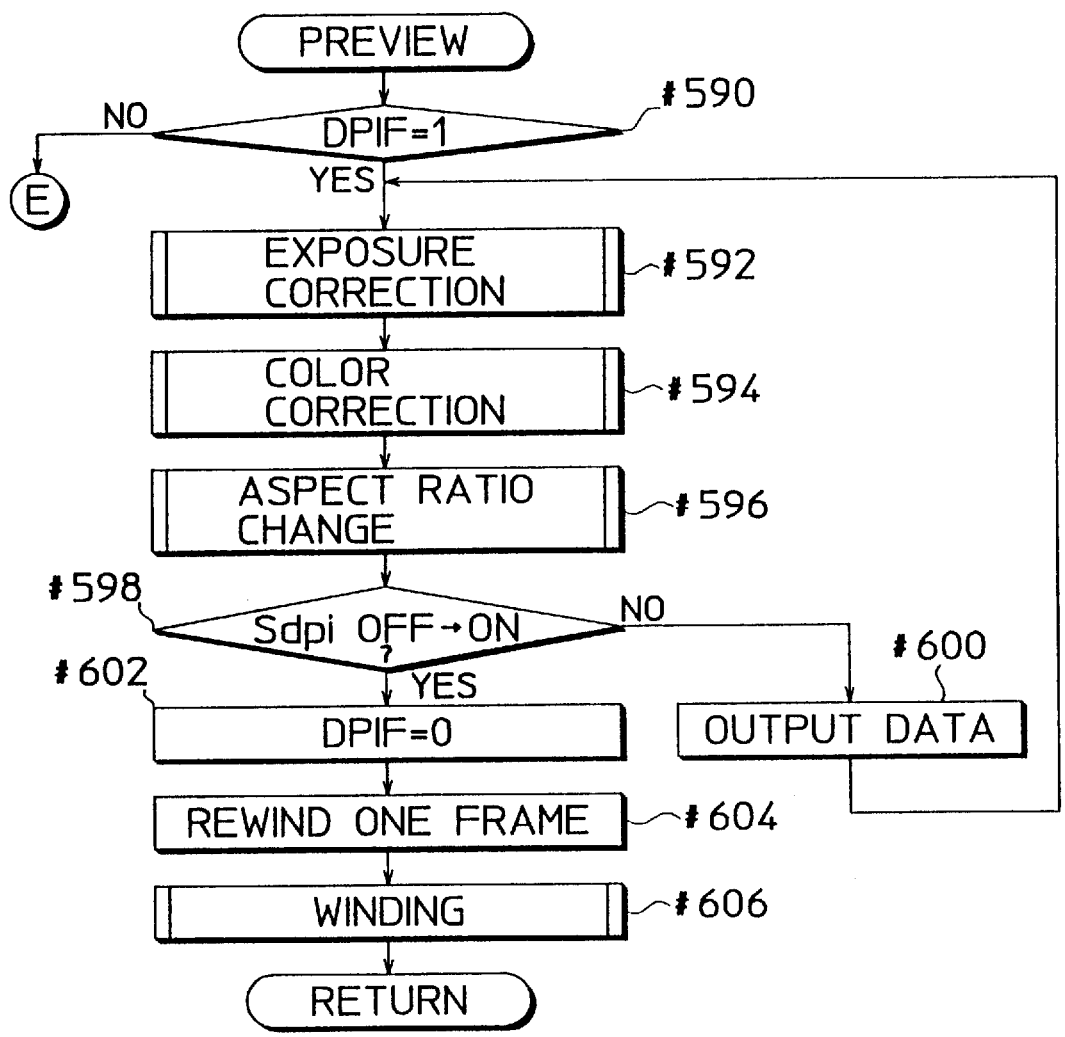
FIGS. 45 and 46 are parts of a flowchart showing a subroutine "Preview"
Figure 46:
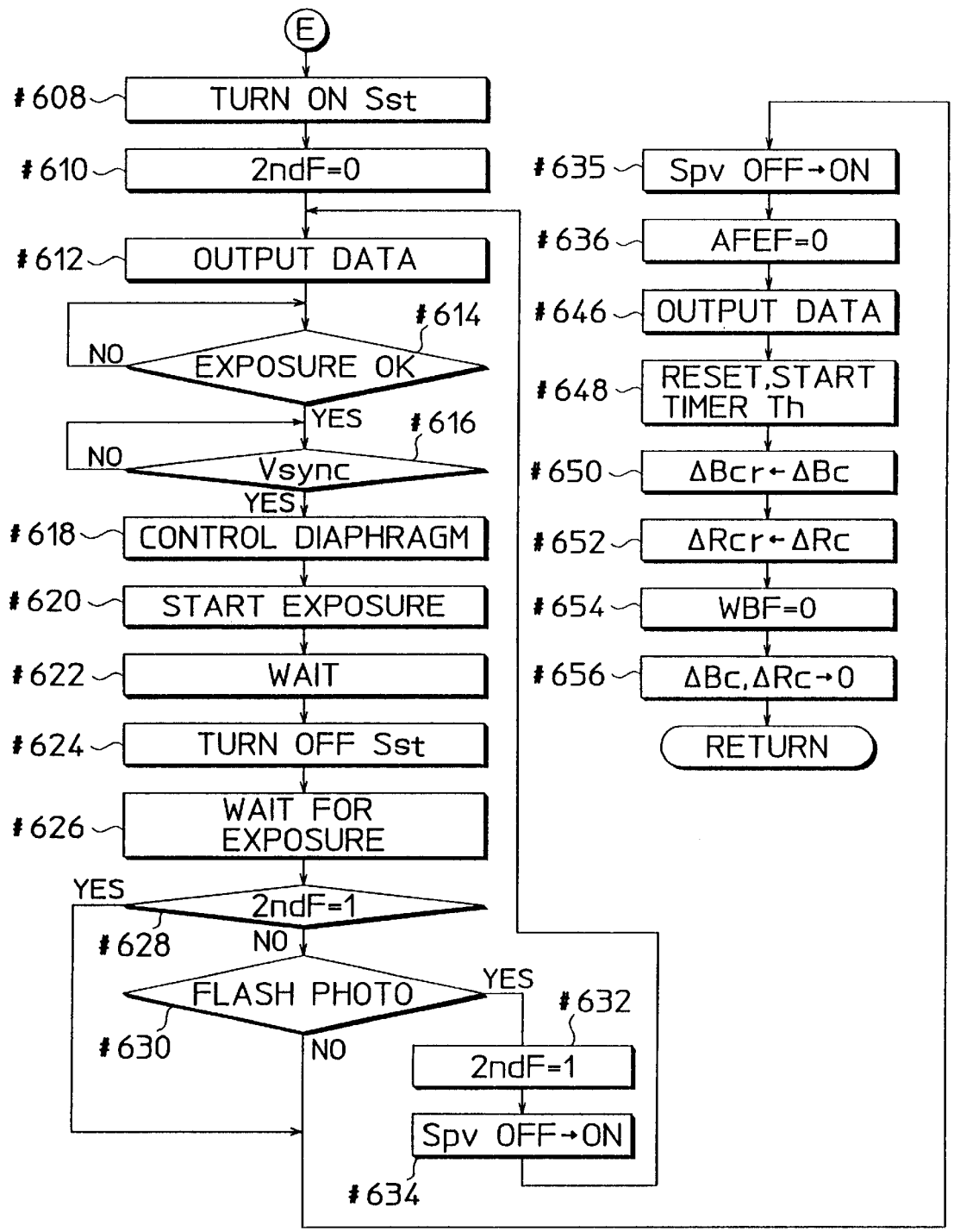
Figure 48A:
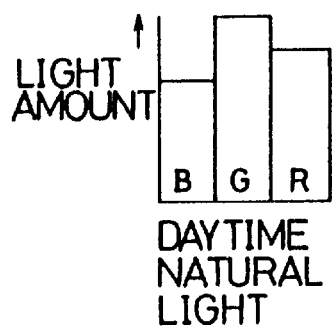
FIGS. 48A to 48D are bar diagrams showing spectral characteristic of the respective light sources.
Figure 48B:
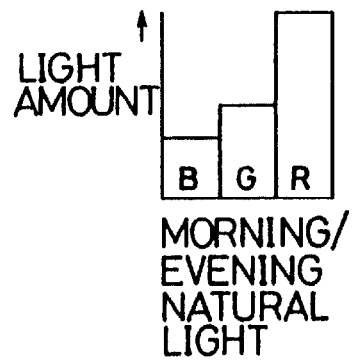
Figure 48C:
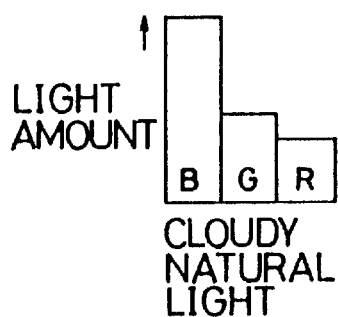
Figure 48D:
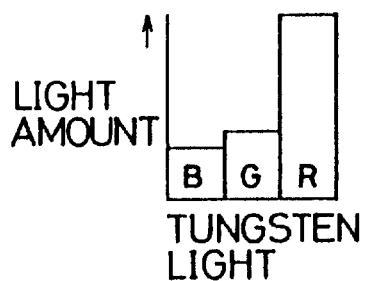

The subroutine "Preview" is described next with reference to FIGS. 45 and 46.

It is first discriminated whether the flag DPIF is set (Step #590). The flag DPIF is set when the image stored in the internal memory 129 or the frame memory 122 is displayed according to the operation of the switch Sdpi. If the flag DPIF is set, i.e., an image in a specified frame is being displayed, the exposure correction, the color correction, and the aspect mode change are performed to the displayed image (Steps #592, #594 and #596). It is then discriminated whether the switch Sdpi has been switched to ON (Step #598). Unless the switch Sdpi has been switched to ON, the changed data are output to the microcomputer 100 (Step #600) and this subroutine returns to Step #592.

If the switch Sdpi has been switched to ON, the flag DPIF is reset (Step #602) upon judgment that this switched was operated to exit from this loop (Steps #592 to #600). Subsequently, the film is rewound by one frame by the film feeding device 5 so as to record the data changed in Steps #592, #594 and #596 in the magnetic recording portion 453 (Step #604). The subroutine "Winding" is carried out (Step #606) and this subroutine returns.

If the flag DPIF is not set (NO in Step #590), the flash light adjustment start switch Sst is turned on (Step #608) and a flag 2ndF is reset (Step #610). The flag 2ndF is indicative of the second photographing operation. The data representative of the state of the switch Spv is output to the CCD/monitor/recorder unit 10 (data output) in Step #612. It is waited until the exposure OK signal is input from the CCD/monitor/recorder unit 10 (Step #614).

Upon receipt of the exposure OK signal, it is waited until the vertical synchronization signal Vsync is input (Step #616). Upon receipt of the signal Vsync, the diaphragm is controlled in accordance with the control aperture value (Step #618) and the exposure start signal is sent to the CCD/monitor/recorder unit 10 (Step #620).

It is then waited until the aperture is stably set (Step #622) and a signal is output to turn the flash light adjustment start switch Sst off (Step #624). It is waited for a period of time corresponding to an exposure time (Step #626). It is then discriminated whether the flag 2ndF is set (Step #628). If the flag 2ndF is not set, it is discriminated whether the photographing is carried out with the assist of the flash light (Step #630). If the flash photographing is carried out, the flag 2ndF is set to carry out the second photographing (Step #632) and accordingly the switch Spv is turned on (Step #634). A data representing the change in state of the switch Spv is output to the CCD/monitor/recorder unit 10 (Step #635) and is used to control the monitor 47. Unless the flag 2ndF is set (YES in Step #560) or unless the flash photographing is carried out (NO in Step #630), the switch Spv is switched to ON to exit from the preview mode (#635) and the in-focus flag AFEF is reset (Step #636).

The subroutine "Exposure Correction" is described with reference to FIG. 47.

It is discriminated whether the flag ECRF indicative of the exposure correction mode is set (Step #670). If the flag ECRF is not set, it is discriminated whether the exposure correction switch S(±)amb has been switched to ON (Step #672). If the discrimination result in Step #672 is in the negative, this subroutine proceeds to Step #682. If the discrimination result in Step #672 is in the affirmative, the flag ECRF is set (Step #674) on the assumption that the exposure correction mode is set and this subroutine returns to Step #670. If the flag ECRF is set in Step #670, the exposure correction amount ΔEVamb is set according to an operated amount of the control dial 33 or 34 (Step #676) and it is discriminated whether the switch S(±)amb has been switched to ON (Step #678). This subroutine directly returns if the discrimination result in Step #678 is in the negative, while returning after resetting the flag ECRF (Step #680) if the discrimination result in Step #678 is in the affirmative.

In Step #682, it is discriminated whether the flag ECRf1F indicative of the flash light amount correction mode is set. This subroutine proceeds to Step #684 if the flag ECRf1F is not set, while proceeding to Step #688 if the flag ECRf1F is set. No description will be given for operations performed in Steps #684 to #692 since they are similar to those performed in Steps #672 to #680. It will be appreciated that ΔFvfl in Step #688 is an exposure correction amount when the photographing is carried out with assist of the flash light.

There will be next described the control executed for the color correction. This color correction is performed according to the type of the loaded film to be described hereafter.

Figure 49A:
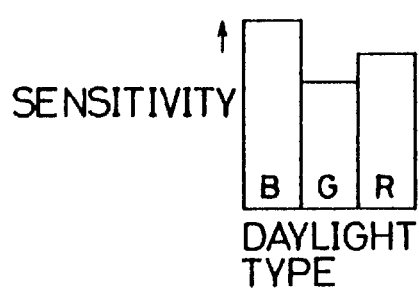
FIGS. 49A and 49B are bar diagrams exemplarily showing the spectral sensitivity of films of daylight type and of tungsten type.
Figure 49B:
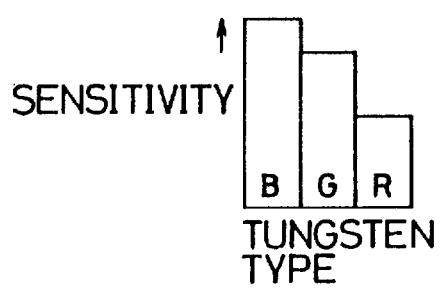

These exist a variety of light sources used for the picture taking operation. FIGS. 48A to 48D show spectral characteristics of some of these light sources. Not a great deal of spectral variation is found in the natural light during the daytime, but the tungsten light has a spectral characteristic of concentrating definitely in a red color region. However, having the vision adaptable to the colors, the human beings can recognize accurately the color of an object illuminated by the tungsten light. On the other hand, the color film includes three photosensitive layers each having the sensitivity to one of three colors; blue (B), green (G) and red (R). All the colors are produced by changing the ratio of B, G, R. The spectral sensitivities of these three layers to the light are roughly divided into two types. One of the types is a daylight type which is balanced so that the normal colors are reproducible when the photographing operation is conducted under the natural light during the daytime or with the assist of the flash light. The other type is a tungsten type which is balanced so that the normal colors are reproducible when the photographing operation is conducted under the tungsten light. FIGS. 49A and 49B show examples of the spectral sensitivities of both types. As seen from these graphs, the film of the daylight type has higher sensitivity to the red light than the film of the tungsten type. Accordingly, when a picture is taken under the tungsten light having a high concentration of red light components, the developed picture is tinged with red. This is because, unlike the human beings, the color film has no adaptation to the colors. It is necessary to confirm beforehand how the developed picture will look like by correcting the chromatic difference in the developed picture according to the film type.

Figure 50:
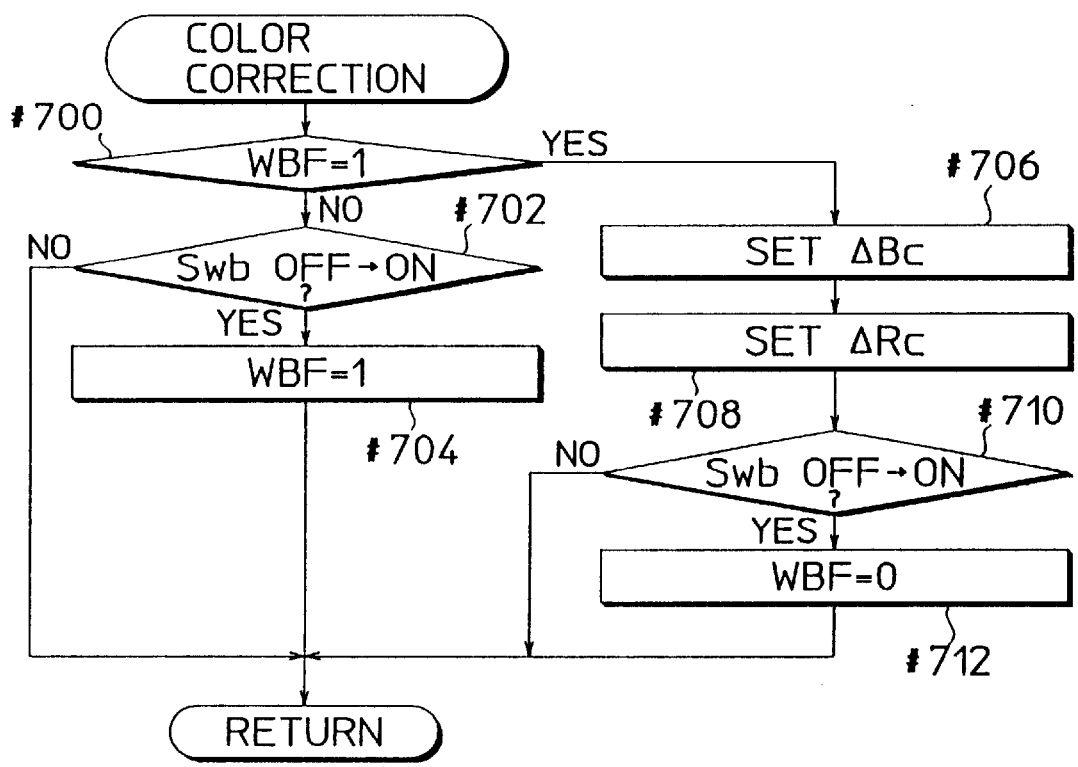
FIG. 50 is a flowchart showing a subroutine "Color Correction"

The subroutine "Color Correction" is described next with reference to FIG. 50.

It is first discriminated whether the flag WBF indicative of the color correction mode is set (Step #700). If the flag WBF is not set, it is discriminated whether the color correction switch Swb has been switched to ON (Step #702). If the switch Swb has been switched to ON, the flag WBF is set to set the color correction mode (Step #704) and this subroutine returns. If the switch Swb has been switched to OFF, this subroutine directly returns. If the flag WBF is set in Step #700, color correction amounts ΔBc, ΔRc of blue and red are set according to the operated amounts of the front and rear control dials 33 and 34 (Steps #706, #708). It is then discriminated whether the color correction switch Swb has been switched to ON (Step #710). This subroutine returns after resetting the flag WBF to exit the color correction mode (#712) if the switch Swb has been switched to ON, while directly returning unless otherwise.

Referring back to FIG. 46, the switch data of this switch Spv is output to the CCD/monitor/recorder unit 10 by means of the data output (Step #646), and the timer Th is reset and started (Step #648). Subsequently, the color correction amounts ΔRc, ΔBc are stored as ΔRcr, ΔBcr respectively (Steps #650, #652). The flag WBF is reset (Step #654); the color correction amounts ARc, ABc are reset (Step #656); and this subroutine returns.

Figure 51:
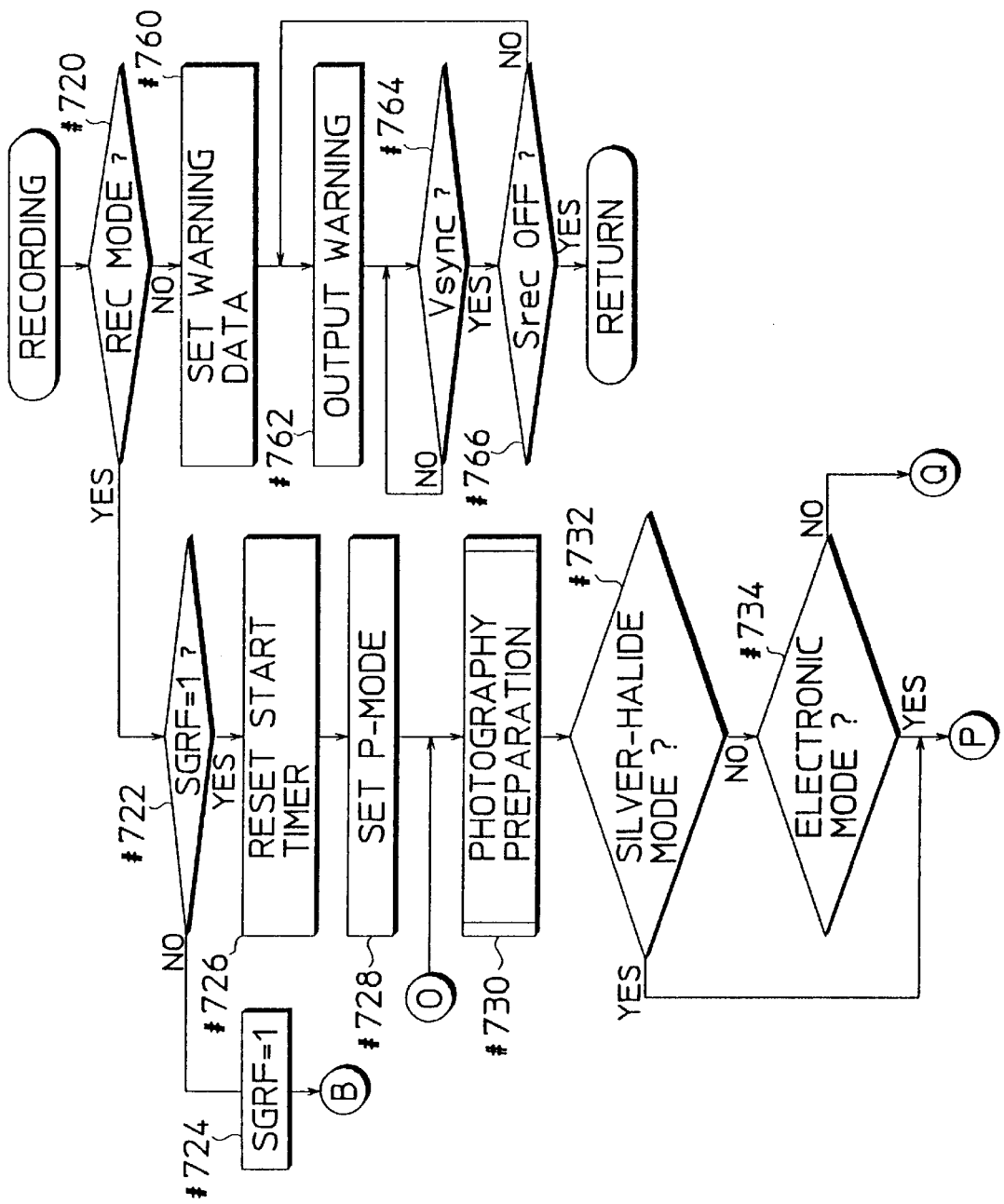
FIGS. 51 and 52 are parts of a flowchart showing a subroutine "Recording"
Figure 52:
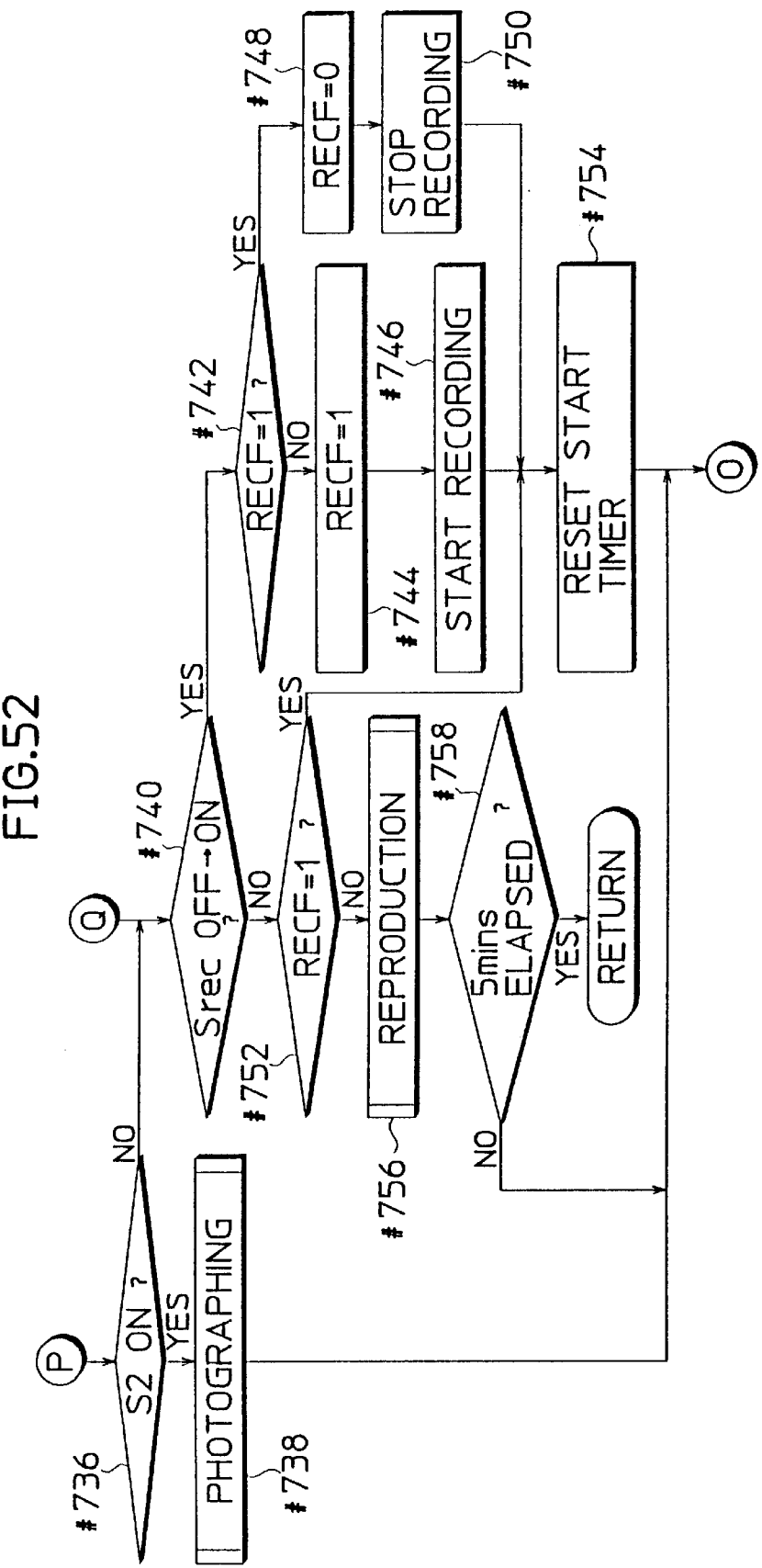

The subroutine "Recording" executed in Step #92 is described with reference to FIGS. 51 and 52.

It is first discriminated based on the flag RECF whether the recording mode (REC mode) is set, i.e., the (motion) images are being recorded (Step #720). If the REC mode is not set, the data representing a warning message is set (Step #760) and output to display a warning (Step #762). It is waited until the vertical synchronization signal Vsync is input (Step #764). Upon receipt of this signal Vsync, it is discriminated whether the switch Srec is off (Step #766). This subroutine returns if the switch Srec is off, while returning to Step #762 if the switch Srec is on.

If the REC mode is set (YES in Step #720), it is discriminated whether the eye flag SGRF is set (Step #722). If the flag SGRF is not set, this subroutine returns to Step #68 (FIG. 25) after the flag SGRF is set (Step #724). If the flag SGRF is set, the timer is reset and started (Step #726) and the P-mode is set as an exposure mode (Step #728). Subsequently, the photography preparation is performed (Step #730). It is then discriminated whether either one of the silver-halide still image photographing mode and the electronic still image photographing mode is set (Steps #732 and #734). If either one of those modes is set, it is discriminated whether the switch S2 is on (Step #736). If the switch S2 is on, the photographing is carried out in the set photographing mode (Step #738) and this subroutine returns to Step #730. If neither one of those modes is set or if the switch S2 is off, it is discriminated whether the recording start switch Srec has been switched to ON (Step #740). If the switch Srec has been switched to ON, it is discriminated based on the state of the flag RECF whether the images are being recorded (Step #742). If the images are being recorded, the flag RECF is reset (Step #748) and the recording stop signal is output (Step #750). Further, the timer Th is reset and started (Step #754) and Step #730 follows. If the image are not being recorded (NO in Step #742), the flag RECF is set (Step #744) and the recording start signal is output (Step #746). Further, the timer Th is reset and started (Step #754) and this subroutine returns to Step #730.

Unless the recording start switch Srec has been switched to ON (NO in Step #740), it is discriminated based on the state of the flag RECF whether the images are being recorded (Step #752). Unless the images are being recorded, the image is reproduced, i.e., the still image is displayed as a preview image (before the photographing operation) or as a confirmation image (after the photographing operation) (Step #756). It is discriminated whether 5 minutes have elapsed after the start of the timer in the case where the images are not recorded and no operation is being carried out (Step #758). This subroutine returns upon lapse of 5 minutes, while returning to Step #730 until lapse of 5 minute. If the images are being recorded in Step #752, the timer Th is reset and started (Step #754) and this subroutine returns to Step #730.

When the data is transmitted from the microcomputer 140 of the transceiver TX during the remote control, a control is executed in response to this data interrupt.

Figure 53:
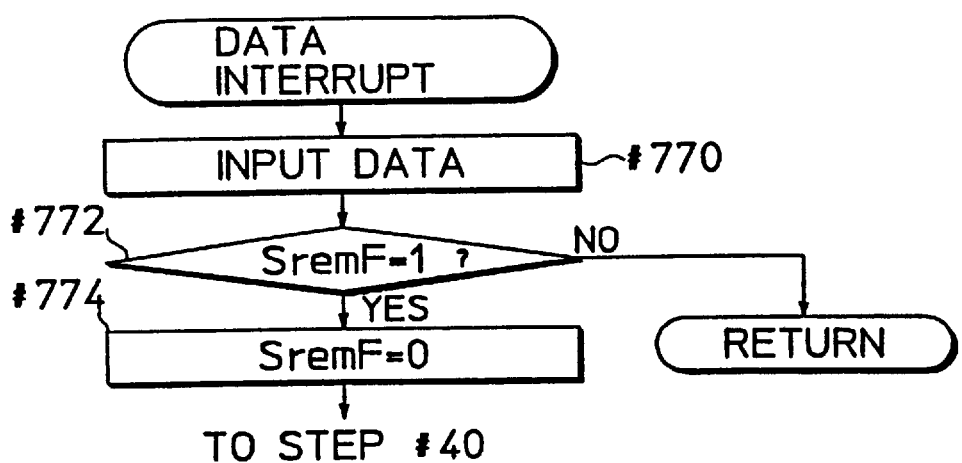
FIG. 53 is a flowchart showing a subroutine "Data Interrupt"

A subroutine "Data Interrupt" will be described with reference to FIG. 53.

In this subroutine, after receipt of a signal representative of the data interrupt from the microcomputer 140, the data transmitted from the transceiver RX through the microcomputer 140 during the remote control or the other transmitted data are input to the microcomputer 1 (Step #770). It is then discriminated whether a flag SremF indicative of a remote control mode is set (Step #772). Unless the flag SremF is set, this subroutine returns on the assumption that the remote control switch Srem has not been turned on to set the remote control mode. If the flag SremF is set, the flag SremF is reset (Step #774) and this routine returns to Step #40 (FIG. 24) in which the remote control is executed.

FIGS. 54 to 64 are flowcharts showing an operation sequence in the CCD/monitor/recorder unit 10 and these operations are controlled by the microcomputer 100.

Figure 54:
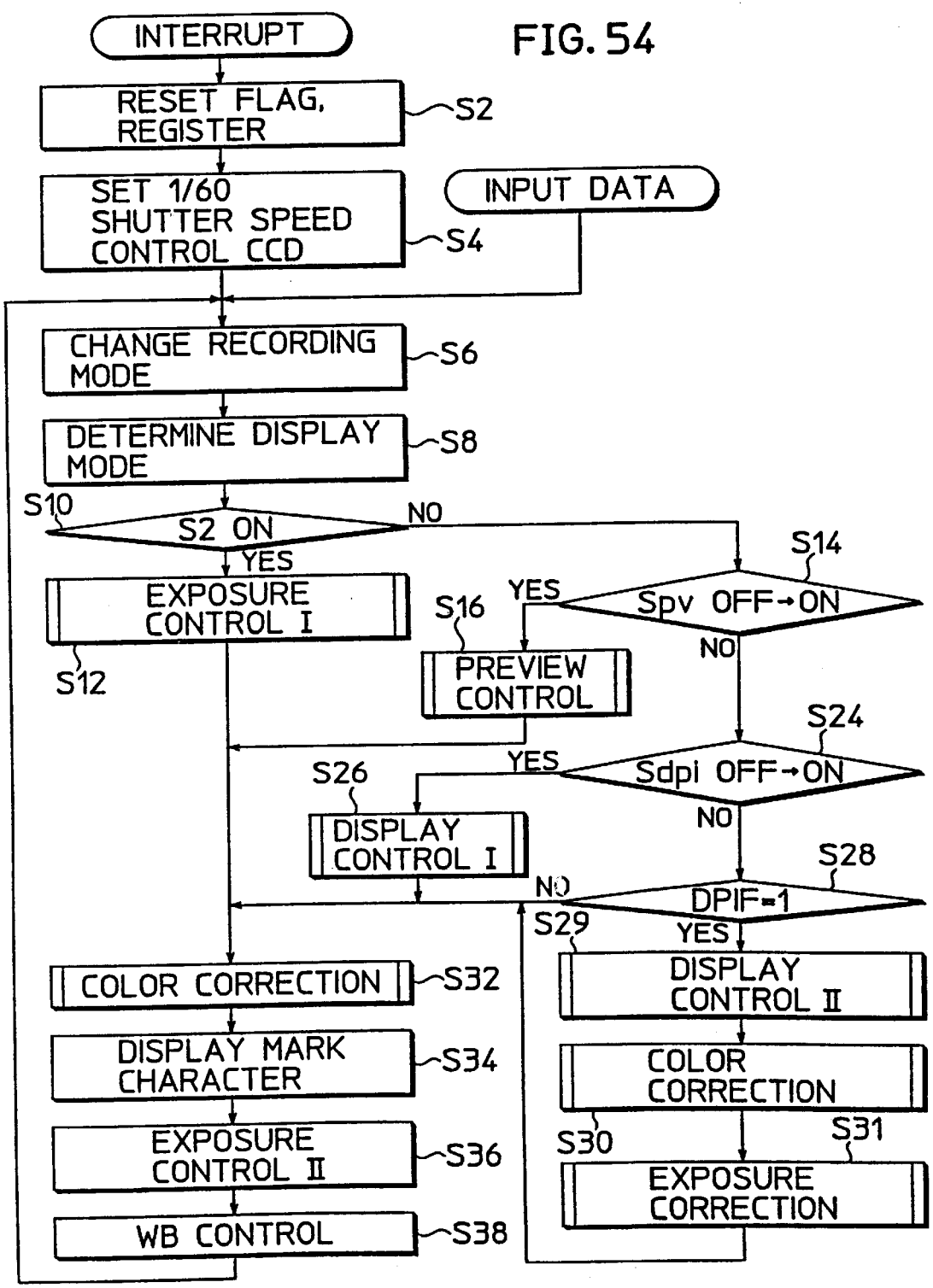
FIG. 54 is a flowchart showing a routine "Interrupt (Power Supply)"

FIG. 54 is a flowchart showing an interrupt routine executed when the power supply is turned on or when the data is input from the microcomputer 1.

When power is supplied to the microcomputer 100, all flags, registers and the like are reset to their initial states (Step S2). In this state, the data from the frame memory 121 are displayed, but no image is displayed since no motion image is stored in the frame memory 121 when the power supply is turned on. The display of the images is started after the exposure is made to the CCD 43 and several frames of image are stored in the frame memory 121. Subsequently, the shutter speed TV of the CCD 43 is set at 1/60 second and a timing signal is generated by the timing signal generator 101 in accordance with the set shutter speed TV to control the CCD 43 (Step S4). The interrupt executed in response to the data input from the microcomputer 1 starts from Step S6 in which the change of the recording mode is instructed to the digital modulator 116 based on the posture data from the microcomputer 1. Subsequently, the display mode is determined in accordance with the aspect mode selected in each photographing mode and is output to the microcomputer 120 (Step S8).

It is then discriminated whether the switch S2 is ON (Step S10). If the switch S2 is on, a subroutine "Exposure Control I" is carried out (Step S12). Unless the switch S2 is off it is discriminated whether the switch Spv has been switched to ON (Step 14). If the switch Spv has been switched to ON, a preview control is executed (Step S16). Unless the switch Spv has been switched to ON, it is discriminated whether the switch Sdpi has been switched to ON to display a still image (Step S24). If the switch Sdpi has been switched to ON, a display control is executed to display the still image (Step S26). Unless otherwise, it is discriminated whether the flag DPIF is set (Step S28). If the flag DPIF is set, a display control II, the color correction (manual correction and correction based on the film type) and the exposure correction (under the ambient light and with the assist of the flash light) are performed (Steps S29, S30 and S31). If the flag DPIF is not set, this subroutine directly proceeds to Step S32.

In Step S32, a subroutine "Color Correction" is executed. Subsequently, the aforementioned marks and the character indicative of the photographing mode are displayed (Step S34). In order to display the shutter speed TV, the photographing mode, etc., the display data from the microcomputer 1 are output to the microcomputer 120 for processing the display data; the aperture value used in recording the motion images is calculated in accordance with the input image data (R, G, B); and the exposure control is executed in accordance with the calculated aperture value (Step S36). Further, a White Balance (WB) control is executed in accordance with a WB control data obtained from the input image data (R, G, B) in Step S38. This routine returns to Step S6.

Figure 55:
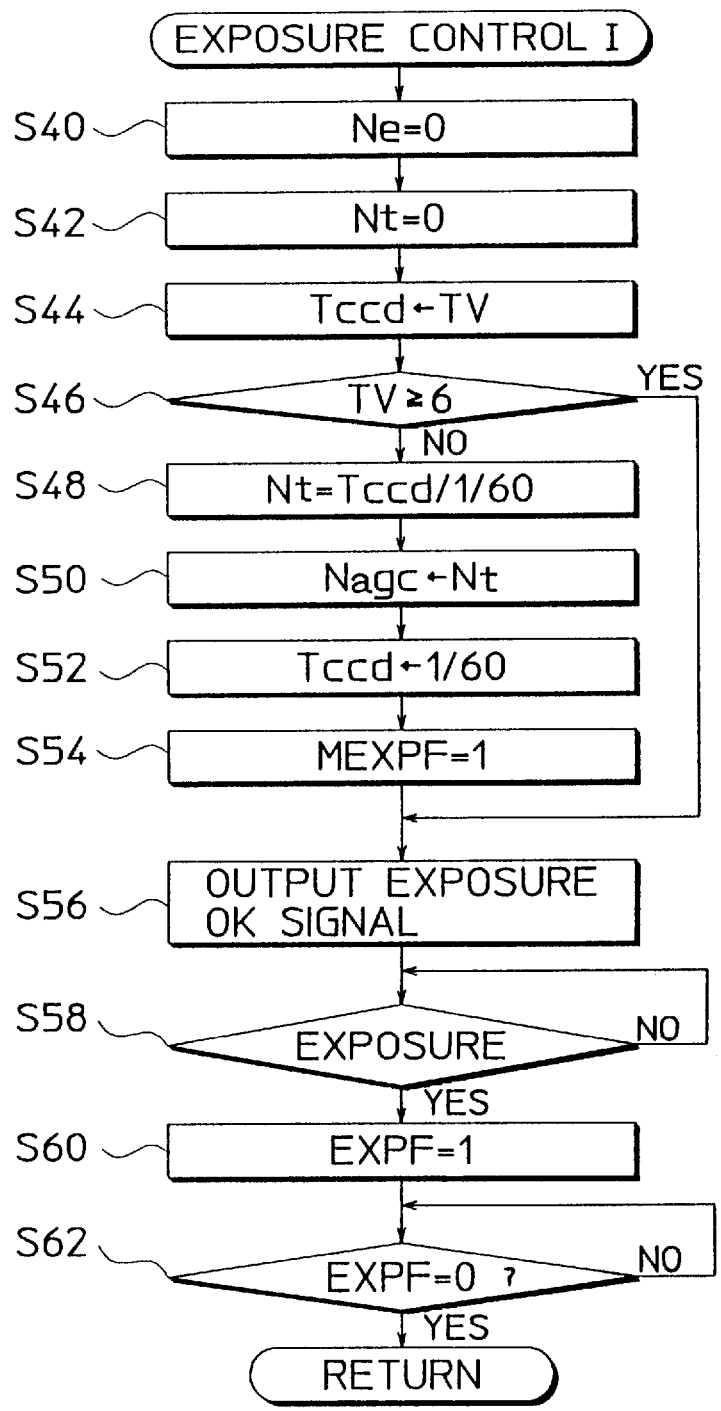
FIG. 55 is a flowchart showing a subroutine "Exposure Control I"

The subroutine "Exposure Control I" is described with reference to FIG. 55.

First, variables Ne and Nt are reset (Steps S40 and S42). The variable Ne is indicative of the number of exposures carried out every 1/60 second during one photographing operation, whereas the variable Nt is indicative of the number of necessary exposures carried out every 1/60 seconds during one photographing operation.

Subsequently, the shutter speed TV from the microcomputer 1 is converted into an actual time Tccd (Step S44) and it is then discriminated whether the shutter speed TV is not smaller than 6 (corresponding to the shutter speed of not greater than 1/60 second) (Step S46). If TV≧6, this subroutine directly proceeds to Step S56. If the TV<6, the variable Nt is set to Tccd/1/60 (Step S48) and is set as Nagc (Step S50).

Further, an exposure time is set at 1/60 second which corresponds to a field time (Step S52) and a flag MEXPF is set (Step S54). The flag MEXPF indicates that the exposure is repeated Nt times during a period of 1/60 second.

The camera of this embodiment is capable of photographing both the motion images and the still images (hereinafter, the still image photographing refers to both the silver-halide still image photographing and the electronic still image photographing). In the motion image photographing, one field of images are picked up and recorded every 1/60 second. In the still image photographing, the exposure time is arbitrarily determined depending upon the brightness, particularly when the exposure mode is P-mode or A-mode. If the exposure time is longer than 1/60 second, the image pick-up operation is repeated every 1/60 second in the motion image photographing and the AGCII 109 regulates the gain in accordance with Nagc so as to deal with the exposure time longer than 1/60 second. On the other hand, in the still image photographing, a plurality of images obtained by the exposures carried out every 1/60 second are added to deal with the exposure time longer than 1/60 second.

The flag MEXPF is reset (Step S54) and the exposure OK signal is sent to the microcomputer 1 (Step S56). The microcomputer 1 starts the exposure control in accordance with the set photographing method. Subsequently, it is waited until the exposure start signal is input from the microcomputer 1 (Step S58). Upon receipt of this signal, a flag EXPF is set (Step S60). The flag EXPF indicates that the exposure is being performed. This subroutine returns after waiting until the flag EXPF is reset (Step S62) after completion of the exposure.

A detection range when the exposure, the white balance correction and the shake detection are performed in the motion image photographing mode is an entire area defined by the gaze detection area frame 19 shown in FIG. 16. This detection range differs from the gaze detection range in the still image photographing mode for the following reason. When the brightness and the color change as the detection ranges for the exposure and the white balance correction change, the exposure and the color of the image frequently change accordingly. This makes it difficult to look at the screen when the motion images are displayed. Further, if the shake detection range is narrow, it becomes difficult to distinguish the camera shake from the movement of the object (moving object).

Figure 56:
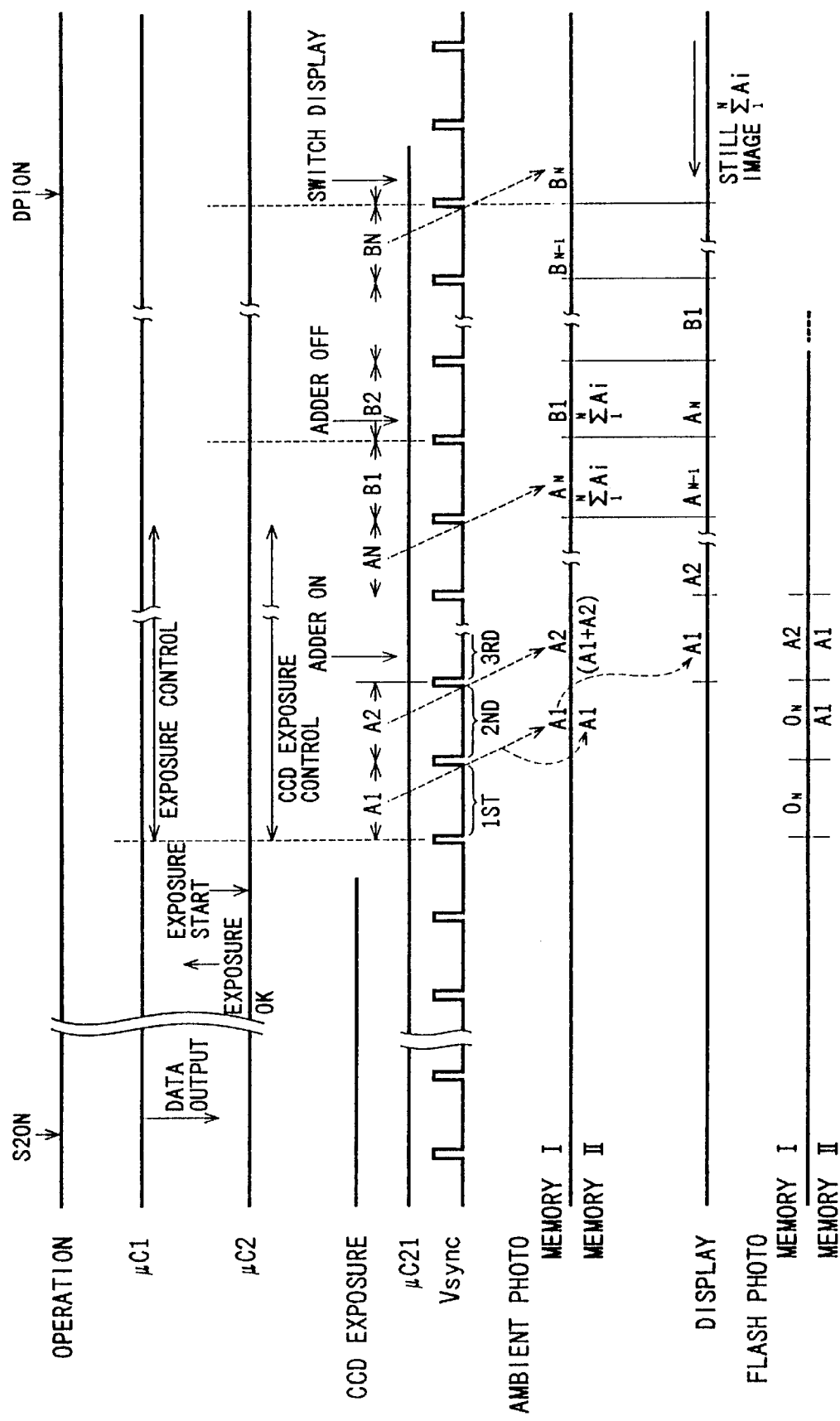
FIG. 56 is a timing chart summarily showing an operation of the CCD/monitor/recorder unit.

FIG. 56 is a timing chart for showing the operation of the CCD/monitor/recorder unit 10. Hereafter, the operation of the unit 10 is summarily described with reference to FIG. 56.

First, the operation of the unit 10 is described with respect to the case of the photographing under the ambient light.

In the "Operation" at the top of FIG. 56, when the release switch S2 is turned on, the data representing the photographing is output from the microcomputer 1 to the microcomputer 100 (data output). The microcomputer 1 executes a specified control for the photographing. On the other hand, after executing a specified control upon receipt of the above data, the microcomputer 100 sends the exposure OK signal to the microcomputer 1. Upon receipt of the exposure OK signal, the microcomputer 1 sends the exposure start signal to the microcomputer 100 and controls the aperture of the diaphragm after waiting until the vertical synchronization signal Vsync of next cycle is input. Thereafter, the microcomputer 1 controls the shutter 46. The microcomputer 100 controls the exposure to the CCD 43 upon receipt of the vertical synchronization signal Vsync of next cycle.

Let it be assumed that A1 denotes a first image picked up in accordance with each vertical synchronization signal Vsync during the exposure control, and likewise A2, A3, . . . An denote second, third, . . . , n-th images picked up during the exposure control. Upon the exposure, the microcomputer 120 applies a specified image processing to a signal representing the first image A1 (first cycle) in the second cycle in accordance with a signal from the microcomputer 100, and the processed signal is stored in the frame memories 121 and 122. The exposure control for the next image A2 is executed in the second cycle. If the exposure time for the proper exposure is assumed to be longer than $\frac{1}{60}$ second, the microcomputer 100 sends a control signal to the microcomputer 120 in the third cycle to turn the adder 124 on, adds the image A2 to the image A1 stored in the frame memory 121, and stores the added image in the frame memory 122. Thereafter, this operation is repeated until the completion of the exposure control (completion of the n-th cycle). In other words, the image picked up by the CCD 43 is stored in the frame memory 121 and the image $\Sigma$Ai successively added as described above is stored in the frame memory 122. At this stage, the motion images are obtained by successively displaying the image stored in the frame memory 121 in the next cycle. The displayed motion images tend to show insufficient exposure. However, upon operating the switch Sdpi, the microcomputer 100 sends a signal for instructing "Switching Display" to the microcomputer 120, with the result that the added still image $\Sigma$Ai is displayed while showing the proper exposure. On the other hand, if the exposure time is shorter than $\frac{1}{60}$ second, the image Ai is stored in the frame memory 122 with a delay of one cycle. The image Bi in the next exposure control is similarly processed.

A memory control in the flash firing photographing operation is described next. The exposure time in this case is shorter than $\frac{1}{60}$ second. The picked up image A1 is stored in the frame memory 122. At this stage, the previously stored image On is still stored in the frame memory 121 and this image is displayed. This is to prevent the problem that only the image obtained in the flash firing photographing operation of one cycle is included in the images obtained in the photographing operation under the ambient light, it looks as if a noise were included.

Figure 57:
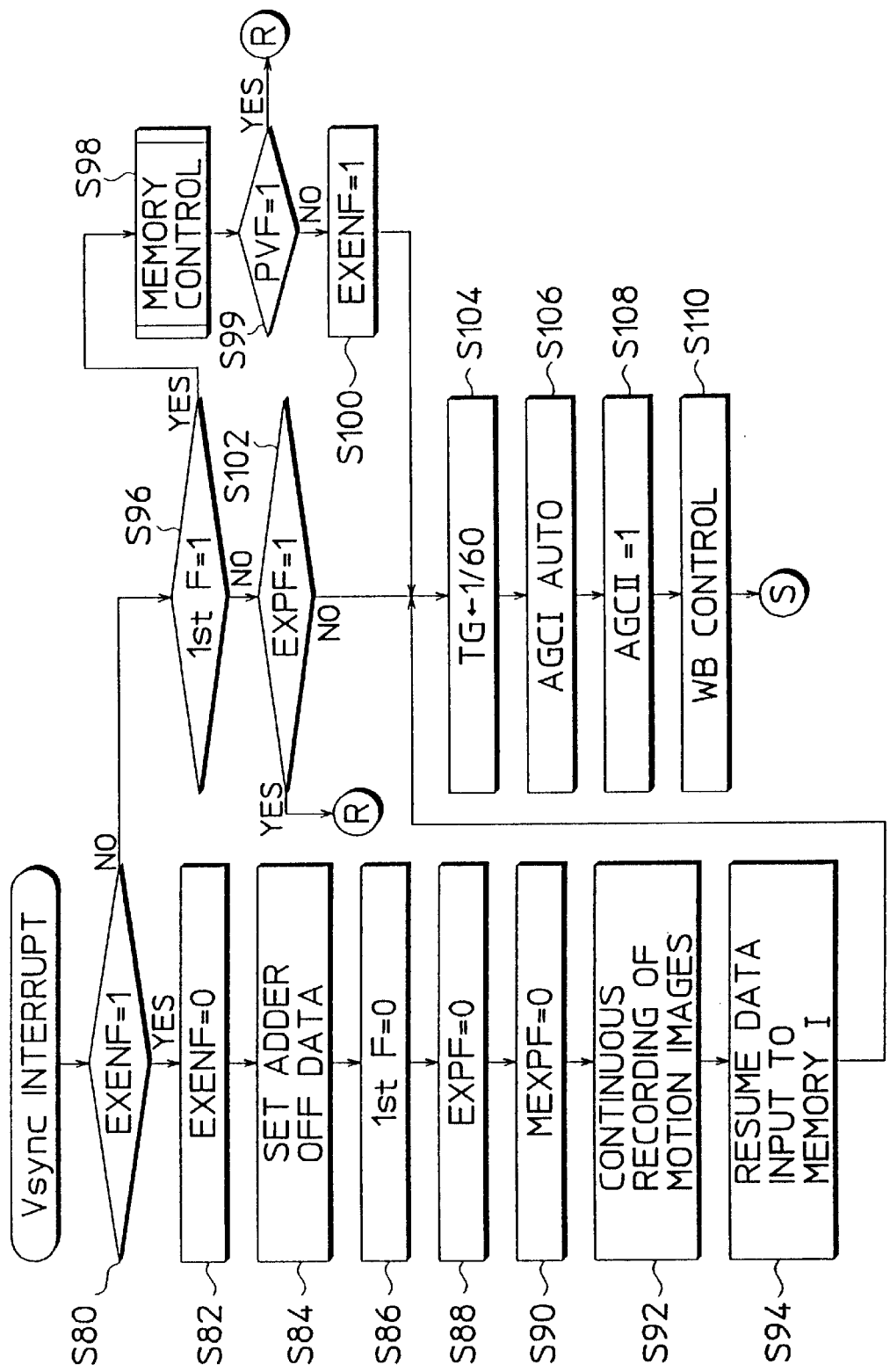
FIGS. 57 and 58 are parts of a flowchart showing a subroutine "Vsync Interrupt"
Figure 58:
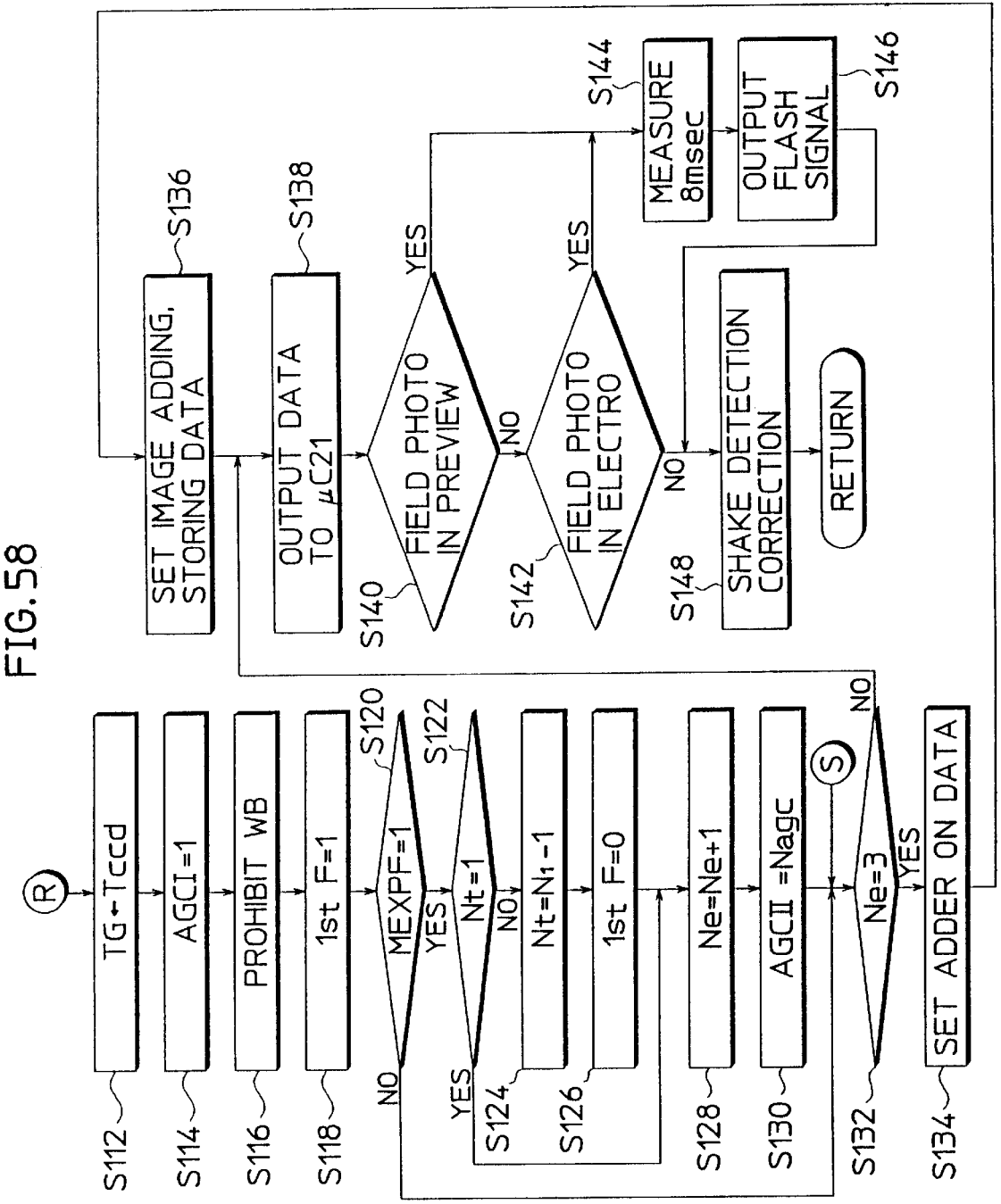

A routine "Vsync Interrupt" is described with reference to FIGS. 57 and 58.

Upon receipt of the vertical synchronization signal, it is discriminated whether a flag EXENF indicative of completion of the exposure is set (Step S80). If this flag is not set, it is discriminated whether a flag 1stF indicative of the last exposure is set (Step S96). If the flag 1stF is not set, it is discriminated whether the flag EXPF is set (Step S102). If the flag EXPF is set, the data representing the exposure time Tccd is output to the timing signal generator 101 (Step S112) and a control signal is sent to the AGCI 105 to set the gain of the AGCI 105 at 1 (=no amplification) (Step S114). Subsequently, the white balance correction is prohibited (Step S116) and the flag 1stF is set (Step S118). It is then discriminated based on the state of the flag MEXPF whether the control requires a plurality of exposures (Step S120). If a plurality of exposures are necessary, it is discriminated whether the variable Vt is set at 1 (Step S122). If Nt=1, this routine proceeds to Step S128 because this is the last exposure. On the other hand, if Nt≠1, the variable Nt is decremented by 1 (Step S124) and this routine proceeds to Step S128 after resetting the flag 1stF (Step S126) because this is at least not the last exposure.

The variable Ne is incremented by 1 (Step S128) and the gain of the AGCI 105 is set at Nagc to make the exposure proper (Step S130). It is then discriminated whether the variable Ne is equal to 3 (Step S132). If Ne=3, the data for turning the adder 124 on is set (Step S134). Subsequently, there is set data for instructing an operation of adding the latest image input from the microcomputer 120 to the image stored in the frame memory 121 and storing the added image in the frame memory 122 (Step S136). If Ne≠3, this routine directly proceeds to Step S138. In Step S138, the data set by the microcomputer 100 are output to the microcomputer 120. It is then discriminated based on the data from the microcomputer 1 whether the field photographing is currently conducted in the preview photographing or in the electronic still image photographing (Steps S140 and S142). If the current field photographing is conducted neither in the preview photographing nor in the electronic still image photographing, the shake detection is made based on the G (green) component data input for each field and a control is executed to correct the shake, by a circuit LEM II for driving a camera shake correction lens as shown at 8 in FIG. 1, in accordance with the detection result (Step S148) and this routine returns. If the current field photographing is conducted either in the preview photographing or in the electronic still image photographing, a specified time, e.g., 8 msec. is measured (Step S144); a flash firing signal EMT is output (Step S146); and this routine proceeds to Step S148.

Unless the exposure is being performed in the still image photographing mode in Step S102, a signal for setting the exposure time at $\frac{1}{60}$ second is output to the timing signal generator 101 (Step S104). Further, signals for causing the AGCI 105 to automatically operate and setting the gain of the AGCII 109 at 1 are output (Step S106 and S108); a WB control signal is output (Step 110); and this routine proceeds to Step S132.

If the last exposure has been already completed and the next field is being exposed (flag 1stF =1) in Step S96, a subroutine "Memory Control" is executed (Step S98). It is then discriminated whether the preview mode is set (Step S99). If the preview mode is not set, the flag EXENF indicative of the completion of the exposure control is set (Step S100); and this routine proceeds to Step S104. If the preview mode is set, this interrupt routine proceeds to Step S112 to perform the exposure again.

Figure 59:
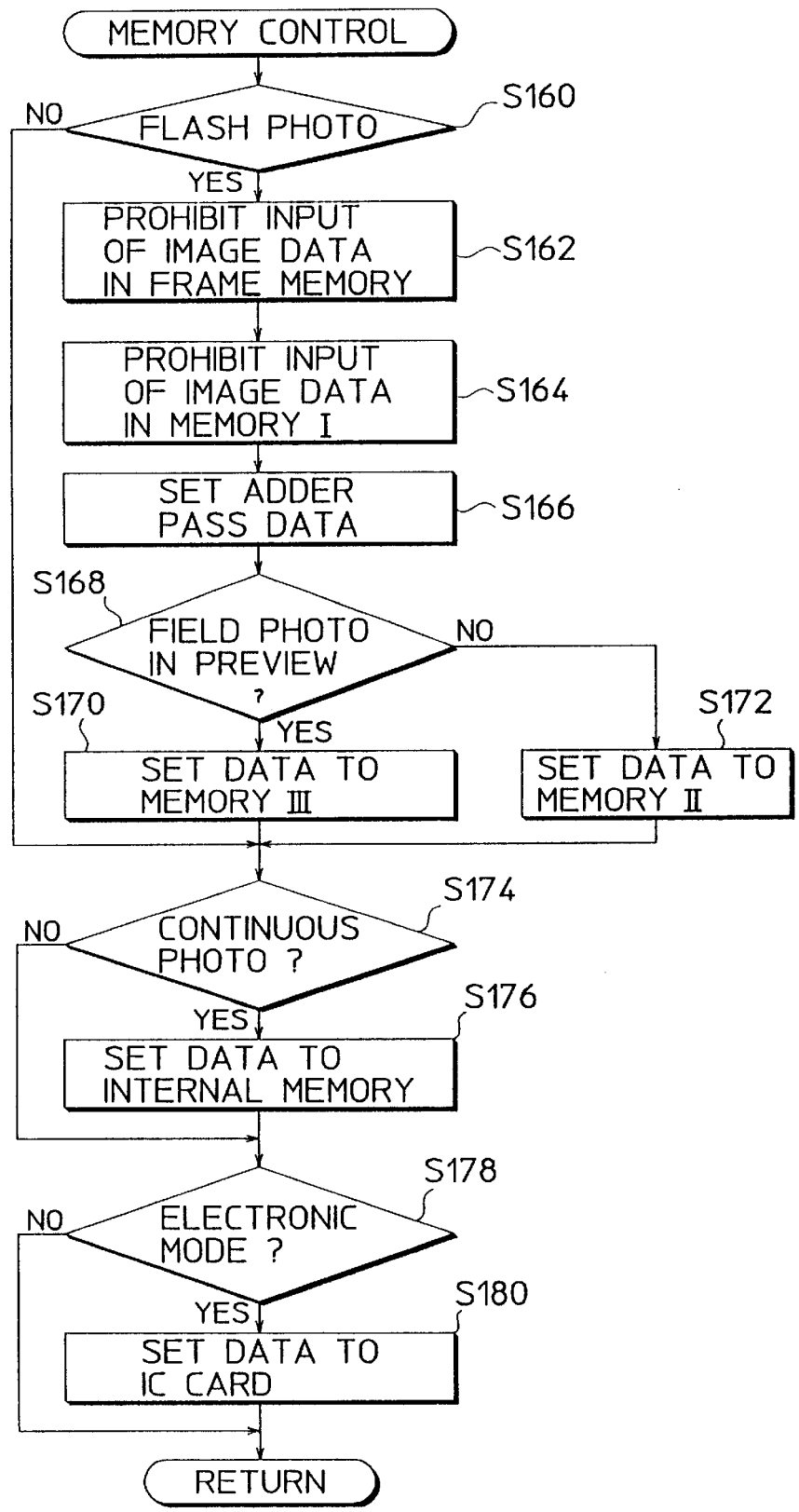
FIG. 59 is a flowchart showing a subroutine "Memory Control"

The subroutine "Memory Control" is described with reference to FIG. 59.

It is first discriminated based on the data input from the microcomputer 1 whether the field photographing is being conducted (Step S160). If the field photographing is being conducted, control signals for prohibiting the input of image data are output so as to prevent the stored content of the frame memories 111 and 121 used to store the motion images from being renewed (Step S162 and S164). In this way, by prohibiting the data renewal, storing and maintaining the image previously displayed on the screen (corresponding to an image On shown in FIG. 56), a noise display can be prevented which results from inclusion of one field of images obtained in the field photographing in the images continuously obtained in the photographing under the ambient light. On the other hand, if the discrimination result in Step S160 is in the negative, this routine directly proceeds to Step S174 without performing the above operations.

Subsequently, there is set a data for causing the adder 124 to pass the image data as it is (Step S166) and it is discriminated whether the field photographing is being conducted during the preview (Step S168). A data for storing the image data in the frame memory 123 are set (Step S170) if the discrimination result in Step S168 is in the affirmative, whereas data for storing the image data in the frame memory 122 are set (Step S172) if it is in the negative.

In Step S174, it is discriminated whether the continuous photographing mode is set. If the continuous photographing mode is set, data for temporarily storing the image in the internal memory 129 are set (Step S176) and this subroutine proceeds to Step S178. Unless otherwise, this subroutine directly proceeds to Step S178 in which it is discriminated whether the electronic still image photographing mode is set. Data for instructing the storage of the data in the IC card 51 are set (Step S180) and this subroutine returns if the electronic still image photographing mode is set, whereas this subroutine directly returns if this mode is not set.

Referring back to FIG. 57, if the flag EXENF is set in Step S80, this flag is reset on the assumption that the exposure control has been completed (Step S82). Subsequently, the data for turning the adder 124 on is set (Step S84), so that the input image data is stored in the frame memory 121 as it is. The flags 1stF, EXPF, MEXPF are reset, respectively (Steps S86 to S90). Further, data for enabling the continuous recording of the motion images and instructing the resumption of the data input to the frame memory 121 are set (Step S92 and S94). The operations of Steps S92 and S94 enable the data input again which was prohibited during the field photographing.

The subroutines "PV Control", "Exposure Correction" and "Color Correction" in the preview mode shown in FIG. 54 are described with reference to FIGS. 60 to 62.

Figure 60:
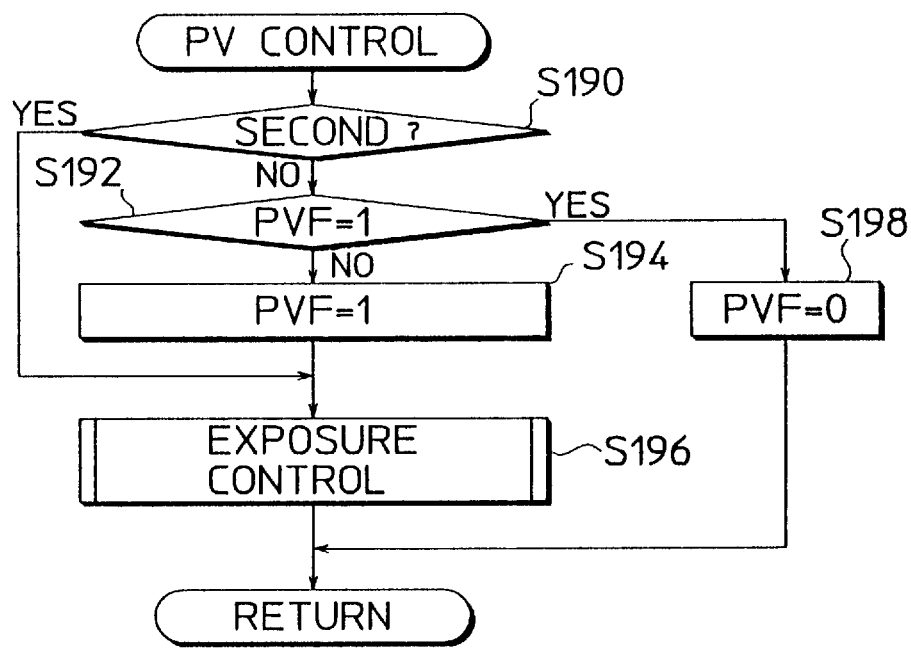
FIG. 60 is a flowchart showing a subroutine "PV Control"

In the subroutine "PV Control" of FIG. 60, it is first discriminated whether the currently conducted photographing is the second one of the continuous photographing in the preview mode, i.e., the flash firing photographing is being conducted (Step S190). If the discrimination result is in the negative, it is discriminated based on the state of the flag PVF whether the preview mode is set (Step S192). If the preview mode is set, this subroutine returns after resetting the flag PVF to exit the preview mode (Step S198). If the preview mode is not set, the flag PVF is set to enter this mode (Step S194) and this subroutine returns after executing the exposure control (Step S196). If the discrimination result in Step S190 is in the affirmative, this subroutine returns after executing the exposure control (Step S196).

Figure 61:
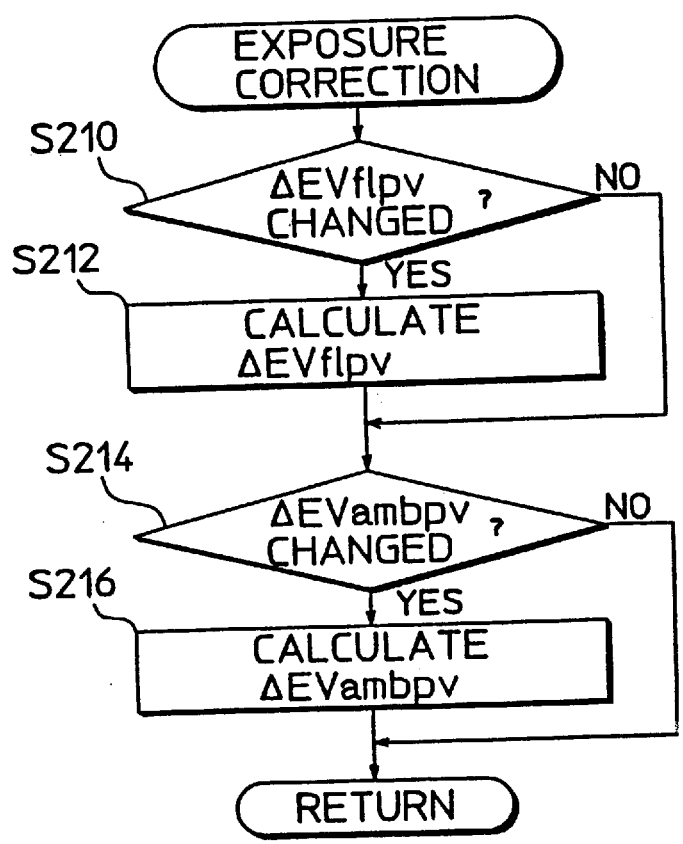
FIG. 61 is a flowchart showing a subroutine "Exposure Correction"

In the subroutine "Exposure Control" of FIG. 61, it is first discriminated whether the correction amount with the assist of the flash light which is input from the microcomputer 1 is at variance with the previously input value (Step S210). If this correction amount has been changed, a changed amount $\Delta$EVflpv is calculated and set (Step S212). Subsequently, it is discriminated whether the correction amount under the ambient light is at variance with the previously input value (Step S214). If this correction amount has been changed, a changed amount $\Delta$EVambpv is calculated and set (Step S216) and this subroutine returns.

The correction amount with the assist of the flash light is obtained as follows: {(memory 122)–(memory 121)}×($\Delta$EVflpv)+(memory 123). The obtained data are output as a data to be stored in the memory 122. The correction amount under the ambient light is obtained as follows: (memory 122)×($\Delta$EVambpv)+(memory 123)–(memory 122). The obtained data are output as data to be stored in the memory 122.

Figure 62:
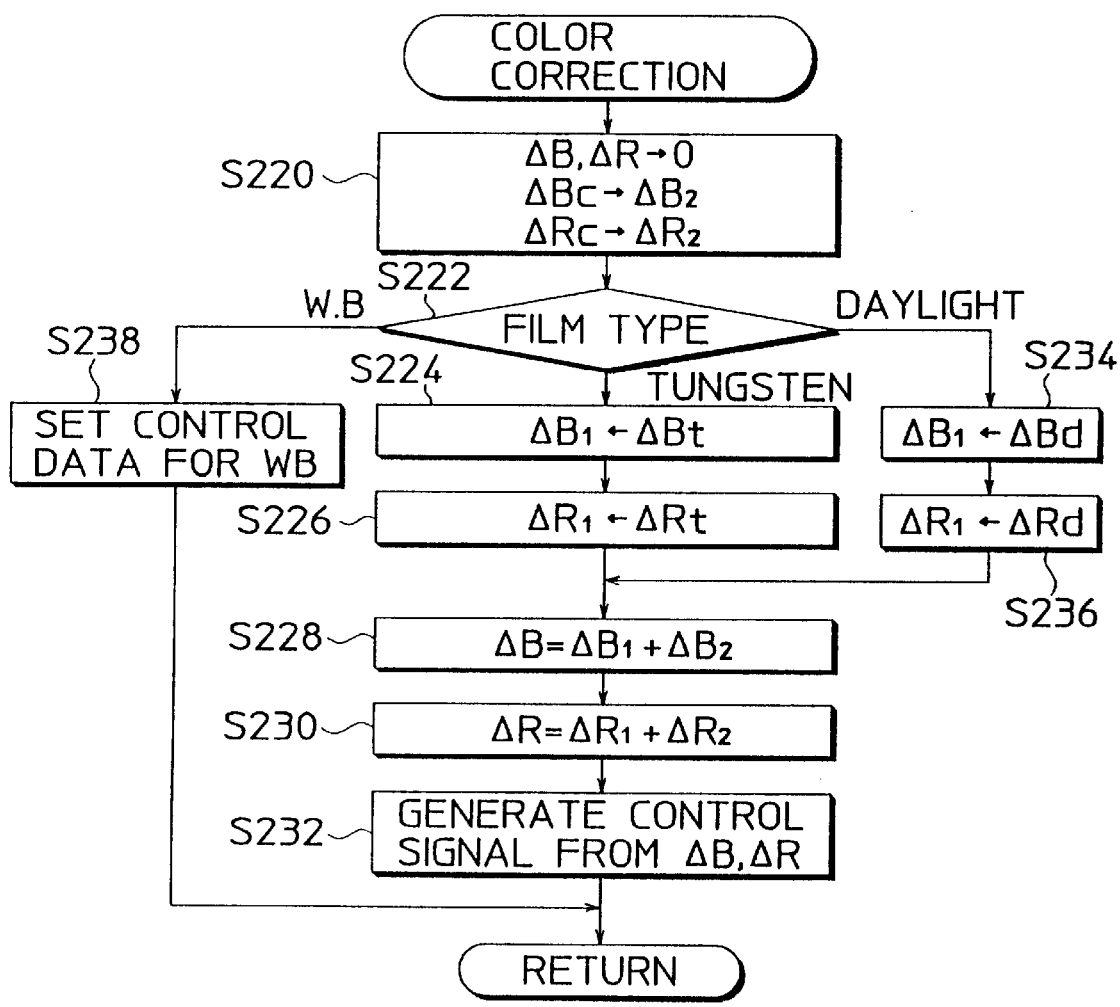
FIG. 62 is a flowchart showing a subroutine "Color Correction"

In the subroutine "Color Correction" of FIG. 62, color correction data $\Delta$B, $\Delta$R are both set at "0" and color correction amounts $\Delta$R2, $\Delta$B2 are obtained based on the color correction data $\Delta$Bc, $\Delta$Rc input from the camera main body 20 (Step S220). It is then discriminated whether the loaded film is of daylight type, of tungsten type, or of black-and-white type (Step S222). If the loaded film is of tungsten type, the color correction amounts $\Delta$B1, $\Delta$R1 in conformity with this film type are set as $\Delta$Bt, $\Delta$Rt (Steps S224, S226). If the loaded film is of daylight type, the color correction amounts $\Delta$B1, $\Delta$R1 in conformity with this film type are set as $\Delta$Bd, $\Delta$Rd (Steps S234, S236). The overall color correction amounts $\Delta$B, $\Delta$R are calculated: $\Delta$B=$\Delta$B1+$\Delta$B2, $\Delta$R=$\Delta$R1+$\Delta$R2 (Steps S228, S230). A control signal i is generated according to the thus obtained color correction amounts $\Delta$B, $\Delta$R and is sent to the color converting circuit 120 (Step S232). If the film is of the black-and-white type, a control data for deleting the information concerning colors is generated (Step S238) and this subroutine returns.

The subroutines "Display Control I" and "Display Control II" are described with reference to FIGS. 63 and 64.

Figure 63:
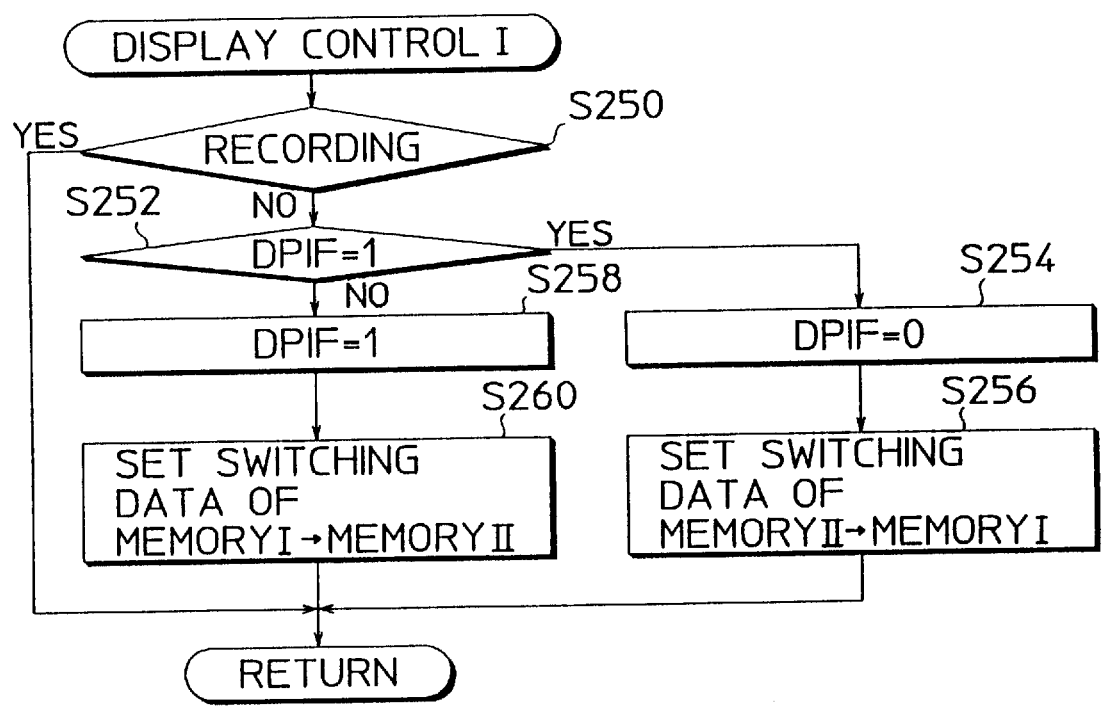
FIG. 63 is a flowchart showing a subroutine "Display Control I"

In the subroutine "Display Control I" in FIG. 63, it is first discriminated based on the input data from the microcomputer 1 whether the images are being recorded (Step S250). This subroutine directly returns if the images are being recorded, while proceeding to Step S252 unless otherwise. In Step S252, it is discriminated whether the flag DPIF indicative of display of the still image is set. If the flag DPIF is set, this flag is reset to exit the still image display mode (Step S254). Subsequently, data for switching the storage medium for a display instructing data from the frame memory 122 to the frame memory 121 are set (Step S256) and this subroutine returns. If the flag DPIF is not set (NO in Step S252), this flag is set (Step S258). Subsequently, a data for switching the storage medium for display instructing data from the frame memory 121 to the frame memory 122 are set (Step S260) and this subroutine returns.

Figure 64:
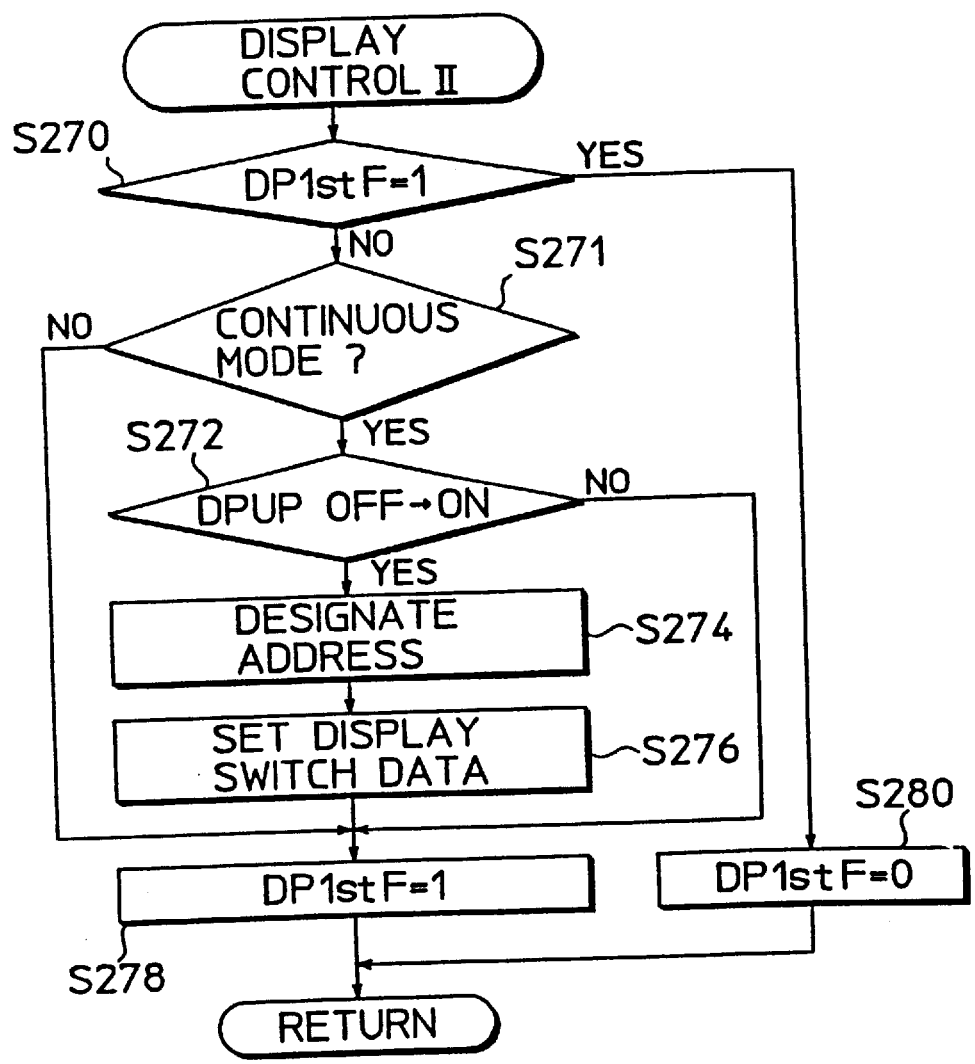
FIG. 64 is a flowchart showing a subroutine "Display Control II"

In the subroutine "Display Control II" of FIG. 64, it is discriminated based on the state of a flag DP1stF whether a main routine for changing the still image has already run once (Step S270). If this main routine has not yet run, it is discriminated whether the continuous photographing mode is set (Step S271). If the continuous photographing mode is set, it is discriminated whether any operation is made to change the still image, i.e., the switch DPup has been switched to ON (Step S272). Unless the switch DPup has been switched to ON, this subroutine returns after setting the flag DP1stF (Step S278). If the switch DPup has been switched to ON, the reading address of the currently displayed image in the internal memory 129 is incremented to designate an address (Step S274). A display switch data for transferring the image stored in the designated address of the internal memory 129 to the frame memory 122 is set (Step S276) and this subroutine returns to Step S278. The frame memory 122 outputs this image data while inputting a new image data from the internal memory 129, and this output image is displayed.

If the continuous photographing mode is not set in Step S271, this subroutine proceeds to Step S278 on the assumption that the image not from the internal memory 129 but from the frame memory 122 or 123 is to be displayed. If the flag DP1stF is set in Step S270, this subroutine returns after resetting this flag (Step S280).

The control executed by the microcomputer 120 is not described because it has already been described in connection with the microcomputer 100. The microcomputer 120 superimposes the characters on the monitor 47; adds, subtracts and color-converts the image data; controls the frame memories 121 and 122, the switching display, the adder 124, the switch 125, the IC card 51 and the internal memory 129; and performs a display control according to the selected aspect mode in the silver-halide still image photographing mode, the electronic still image photographing mode and the motion image photographing mode.

The controls executed by the microcomputers 140 and 150 of the transceiver TX and RX are described with reference to FIGS. 65A and 65B. FIG. 65A shows a control routine of the microcomputer 140, and FIG. 65B shows a control routine of the microcomputer 150.

The microcomputer 140 executes an interrupt routine "SremINT" when the switch Srem is switched to ON. Upon receipt of the vertical synchronization signal Vsync from the timing controller (Step #R2), the control data is wirelessly output to the transceiver RX (Step #R4) and one screen of image data is output (Step #R6). Subsequently, the switch data is wirelessly input from the transceiver RX (Step #R8), this data is output to the microcomputer 1 (Step #R10), and this routine returns to Step #R2.

When the interrupt is made by the control data wirelessly received from the transceiver TX, the microcomputer 150 receives the control data and then the image data (Steps #R20 and #R22). Subsequently, after detecting the states of various switches and storing the detections results in the internal RAM (Step #R24), the microcomputer 150 wirelessly output these switch data to the transceiver TX (Step #R26) and enters an interrupt waiting state (Step #R28). In this way, the transceiver RX does not perform any calculation in response to the operated switches. It only outputs the switch data to the transceiver TX, which performs the controls corresponding to the states of the switches.

In the foregoing embodiment, because the CCD (solid-state image pick-up device) is employed as an image pick-up sensor, the exposure is made proper by adding the image obtained every 1/60 second to the previous image when the exposure time is longer than 1/60 second in the still image photographing mode or by digitally gain-controlling the image obtained every 1/60 second. Alternatively, an image pick-up sensor shown in FIG. 59 may be employed. The sensor of this type is capable of reading the data every 1/60 second while storing electric charges obtained by photoelectrically converting light. Thus, the read data can be treated as an image and a properly exposed still image can be obtained if the exposure is made continuously.

Figure 66A:
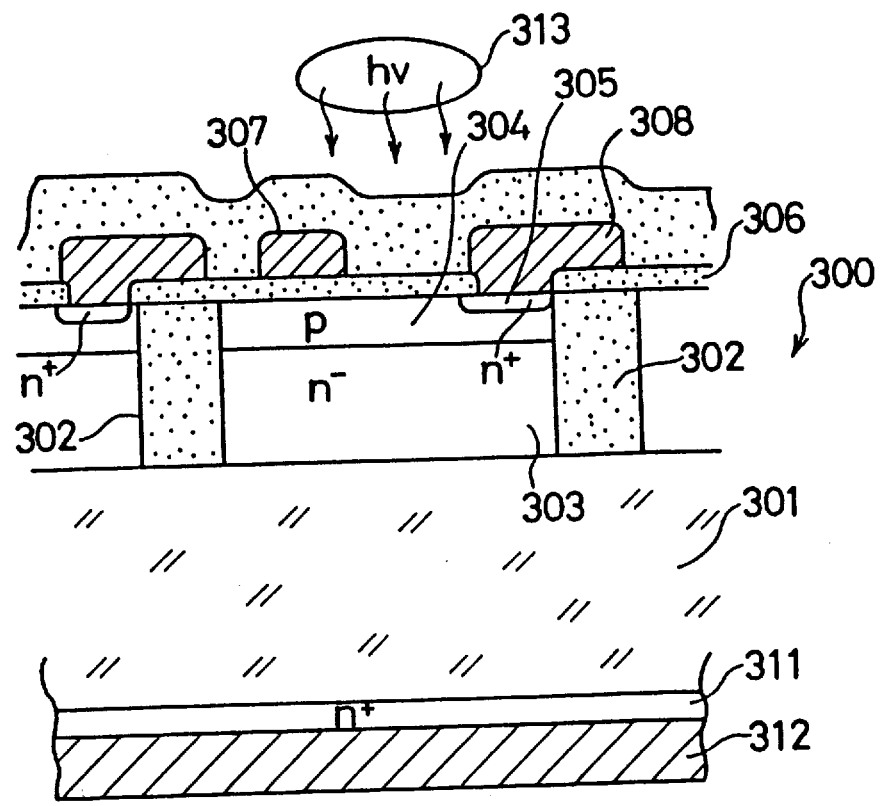
FIGS. 66A and 66B are schematic sectional views showing the construction of another image sensor for the image pick-up device and an equivalent circuit diagram of the sensor, respectively.
Figure 66B:
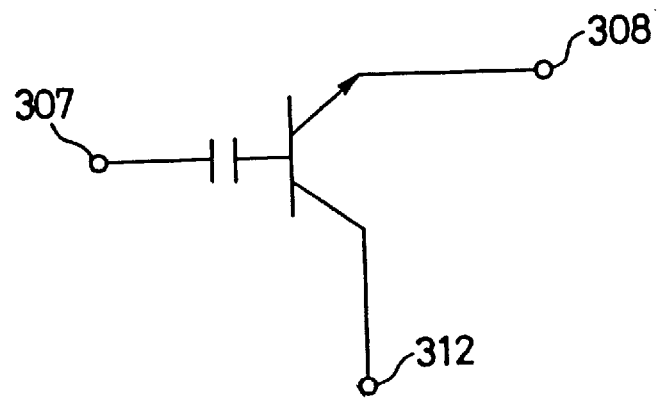

FIGS. 66A and 66B show the construction of the image pick-up sensor 300. FIG. 66A is a schematic section of the sensor 300, and FIG. 66B shows an equivalent circuit of the sensor 300.

The image pick-up sensor 300 includes photoelectric conversion cells arrayed in a matrix on an $n^+$-silicone substrate 301. The respective cells are electrically insulated from neighboring cells by separation regions 302 of polysilicone, etc. Each cell has the following structure. An $n^-$-region 303 having a low concentration of impurities are formed on the $n^+$-silicone substrate 301 by means of the epitaxial art. Impurities of p-type are doped on the region 304 to form a p-region 304. In the p-region 304, there is formed an $n^+$-region 305 by means of impurity diffusion or ion impregnation. The p-region 304 and the $n^+$-region 305 act as a base and an emitter of a bipolar transistor. An oxidation film 306 is formed on the region 304. A capacitor electrode 307 having a selected area is formed on the oxidation film 306. The capacitor electrode 307 is opposed to the p-region 304 with the oxidation film 306 therebetween. By applying a pulse voltage to the capacitor electrode 307, the potential of the p-region 304 brought into a floating state is controlled. There is also formed an emitter electrode 308 connected with the $n^+$-region 305, an $n^+$-region 311 having a high concentration of impurities and a collector electrode 312 for giving a potential to a collector of the bipolar transistor. The region 311 and the electrode 312 are formed on the underside of the substrate 301.

A basic operation of this image sensor 300 is next described. Let it be assumed that the p-regions 304, i.e., the base of the bipolar transistor, have a negative potential in its initial state. When a light 313 is incident upon the p-regions 304, the holes of pairs of electrons and holes which are generated by the incident light are stored in the p-regions 304 and the potential of the p-regions 304 increases in the positive direction by the stored holes (storing operation). Subsequently, a positive voltage pulse used to read the data is applied to the capacitor electrodes 307 and reading signals corresponding to a change of the base potential during the storing operation are output from the emitter electrodes 308 in their floating states (reading operation). The reading operation can be repeated since an amount of electric charges stored in the p-regions 304 acting as a base barely decreases. In order to remove the holes stored in the p-regions 304, the emitter electrodes 308 are grounded and a refresh pulse of positive voltage is applied to the capacitor electrodes 307. By applying this pulse, the p-regions 304 are biased in the forward direction with respect to the $n^+$-regions 305, with the result that the stored holes are removed. Upon fall of the refresh pulse, the p-regions 304 are returned to their initial states of negative potential (refreshing operation). Thereafter, the storing, the reading and the refreshing operations are repeated in a similar manner.

Another exposure method may be such that the exposure is performed only for 1/60 second. Further, the gain of the AGCI 105 may be set at 1 similarly as for the exposure of the normal motion images (the AGCII 109 is unnecessary), and it may be discriminated whether the exposure is proper with this gain. If the exposure is proper, this gain is suitable for the exposure of both the motion and still images. In this case, the degree of the image shake differs depending upon the shutter speed for the still images to be recorded on the silver-halide film. Accordingly, when the shutter speed is slow to the extent that the image shake cannot be overlooked any more, a warning message may be displayed to inform the camera operator thereof.

As described above, according to the invention, when a data input device is operated to input a data concerning a photographing condition, an image processing is applied to an image being displayed which was output from a storage device to a monitor and the thus processed image is again displayed on the monitor. Further, when a renewal designating device is operated, the data input from the data input device is written in an information recording area provided in a photosensitive medium by a data recording/reproducing device. Accordingly, the reproduced image after the change of the data concerning the photographing condition can be confirmed and thus a determination as to whether the changed data content is suitable or not can be made securely and easily. Furthermore, since the changed data can be renewably written in the information recording area of the photosensitive medium, an intended picture is always obtainable even if the photographing condition is changed.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:
    a photographic recording device which records on a photosensitive recording medium an image of an object;
    an image pick-up device which picks up an image of the object to generate an image signal;
    a storage device which stores the image signal;
    a photography data writing and reading device which writes and reads photography data on and from the photosensitive recording medium;
    a photography data setting device which sets new photography data desirably;
    a first display device which processes the image signal in accordance with the photography data written on the photosensitive recording medium:
        a second display device which processes the image signal in accordance with the photography data set by the setting device; and
        a renewal controller which controls the photography data writing and reading device to replace thus written photography data with the new photography data set by the setting device.

2. A camera as defined in claim 1, wherein the photography data are written at a portion of said photosensitive recording medium other than a portion of said photosensitive recording medium where an image is recorded.

3. A camera as defined in claim 2, wherein the photography data are magnetically written on said photosensitive recording medium.

4. A camera as defined in claim 1, further comprising a renewal directing device which activates the renewal controller.

5. A camera as defined in claim 4, wherein the photography data includes at least one of an aspect ratio, an exposure value, and color correction information.

6. A camera as defined in claim 1, wherein the photography data includes at least one of an aspect ratio, an exposure value, and color correction information.

7. A camera comprising:
    a photographic recording device which records on a photosensitive recording medium an image of an objects;
    an image pick-up device which picks up an image of the object to generate an image signal;
    a display device which displays a monitor image based on the image signal generated by the image pick-up device;
    an aspect ratio setting device which is capable of selectively setting an aspect ratio for the image to be recorded on the photosensitive recording medium; and
    a display controller which controls the display device to display the monitor image in accordance with the thus selectively set aspect ratio.

8. A camera as defined in claim 7, further comprising an aspect ratio recording device which records the selectively set aspect ratio on the photosensitive recording medium.

9. A camera as defined in claim 8, wherein the selectively set aspect ratio is recorded on the photosensitive recording medium at a portion of the photosensitive recording medium other than a portion of the photosensitive recording medium at which the image is recorded.

10. A camera as defined in claim 8, wherein the selectively set aspect ratio is magnetically recorded on the photosensitive recording medium.

11. A camera as defined in claim 7, further comprising an electronic recording device which records an image of the object on an electronic recording medium,
    wherein the aspect ratio setting device further selectively sets an aspect ratio for the image to be recorded on the electronic recording medium.

12. A camera as defined in claim 7, wherein the display device displays a monitor image having an indicia indicating an area of the image to be recorded at the selectively set aspect ratio.

13. A camera as defined in claim 12, further comprising an electronic recording device which records an image of the object on an electronic recording medium,
    wherein the aspect ratio setting device further selectively sets an aspect ratio for the image to be recorded on the electronic recording medium.

14. A camera comprising:
    a photographic recording device which records an image of an object on a recording medium;
    an image pick-up device which picks up an image of the object to generate an image signal;
    a display device which displays a monitor image based on the image signal generated by the image pick-up device;
    an aspect ratio setting device which selectively sets an aspect ratio for the image to be recorded on the recording medium; and
    a display controller which controls the display device to display the monitor image in accordance with the selectively set aspect ratio.

* * * * *

UNITED STATES PATENT AND TRADEMARK OFFICE
CERTIFICATE OF CORRECTION

PATENT NO. : 5,774,754

DATED : June 30, 1998

INVENTOR(S) : Hiroshi Ootsuka

It is certified that error appears in the above-identified patent and that said Letters Patent is hereby corrected as shown below:

Column 41, line 17, after medium delete " : " insert -- ; --

Signed and Sealed this

Ninth Day of February, 1999

Attest:

*Acting Commissioner of Patents and Trademarks*

Attesting Officer